United States Patent
Kaneoya et al.

(10) Patent No.: US 9,321,961 B2
(45) Date of Patent: *Apr. 26, 2016

(54) NEMATIC LIQUID CRYSTAL COMPOSITION

(71) Applicant: DIC Corporation, Tokyo (JP)

(72) Inventors: Masakazu Kaneoya, Kita-adachi-gun (JP); Kiyofumi Takeuchi, Kita-adachi-gun (JP); Masashi Osawa, Kita-adachi-gun (JP); Kenta Tojo, Kita-adachi-gun (JP); Tetsuo Kusumoto, Kita-adachi-gun (JP)

(73) Assignee: DIC CORPORATION (TOKYO), Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/425,267

(22) PCT Filed: Aug. 29, 2013

(86) PCT No.: PCT/JP2013/073127
§ 371 (c)(1),
(2) Date: Mar. 2, 2015

(87) PCT Pub. No.: WO2014/034772
PCT Pub. Date: Mar. 6, 2014

(65) Prior Publication Data
US 2015/0218451 A1    Aug. 6, 2015

(30) Foreign Application Priority Data

Sep. 3, 2012 (JP) .................................. 2012-193112

(51) Int. Cl.
| | |
|---|---|
| *C09K 19/32* | (2006.01) |
| *C09K 19/20* | (2006.01) |
| *C09K 19/30* | (2006.01) |
| *C09K 19/34* | (2006.01) |
| *C09K 19/54* | (2006.01) |
| *C09K 19/42* | (2006.01) |
| *C09K 19/02* | (2006.01) |
| *C09K 19/04* | (2006.01) |
| *G02F 1/00* | (2006.01) |

(52) U.S. Cl.
CPC ......... C09K 19/3402 (2013.01); C09K 19/0208 (2013.01); C09K 19/20 (2013.01); C09K 19/3059 (2013.01); C09K 19/3066 (2013.01); C09K 19/322 (2013.01); C09K 19/42 (2013.01); C09K 19/542 (2013.01); C09K 2019/0444 (2013.01); C09K 2019/0466 (2013.01); C09K 2019/3422 (2013.01); C09K 2019/548 (2013.01); G02F 1/0045 (2013.01)

(58) Field of Classification Search
CPC ............... C09K 19/0208; C09K 19/20; C09K 19/3059; C09K 19/3066; C09K 19/322; C09K 19/3402; C09K 19/42; C09K 19/542; C09K 2019/0444; C09K 2019/0466; C09K 2019/548; C09K 2019/3422; G02F 1/0045
See application file for complete search history.

(56) References Cited

U.S. PATENT DOCUMENTS

| | | | | |
|---|---|---|---|---|
| 9,039,929 | B2 * | 5/2015 | Kaneoya et al. | ......... 252/299.01 |
| 9,079,836 | B2 * | 7/2015 | Tojo et al. | |
| 2003/0197153 | A1 | 10/2003 | Heckmeier et al. | |
| 2006/0286308 | A1 | 12/2006 | Kirsch et al. | |
| 2015/0087847 | A1 * | 3/2015 | Tojo et al. | ...................... 549/427 |
| 2015/0124205 | A1 * | 5/2015 | Kaneoya et al. | ............... 349/108 |
| 2015/0159086 | A1 * | 6/2015 | Kaneoya et al. | ......... 252/299.62 |
| 2015/0184076 | A1 * | 7/2015 | Kaneoya et al. | ......... 252/299.61 |
| 2015/0203757 | A1 * | 7/2015 | Kaneoya et al. | ......... 252/299.63 |

FOREIGN PATENT DOCUMENTS

| | | |
|---|---|---|
| JP | 09-157202 A | 6/1997 |
| JP | 10-130187 A | 5/1998 |
| JP | 2001-019649 A | 1/2001 |
| JP | 2001-026560 A | 1/2001 |
| JP | 2003-183656 A | 7/2003 |
| JP | 2005-232214 A | 9/2005 |
| JP | 2005-250223 A | 9/2005 |
| JP | 2007-503487 A | 2/2007 |
| JP | 2008-222588 A | 9/2008 |
| JP | 2011-168530 A | 9/2011 |
| WO | 96/32365 A1 | 10/1996 |
| WO | 98/23564 A1 | 6/1998 |

OTHER PUBLICATIONS

International Search Report dated Nov. 26, 2013, issued in corresponding application No. PCT/JP2013/073127.

* cited by examiner

*Primary Examiner* — Shean C Wu
(74) *Attorney, Agent, or Firm* — Westerman, Hattori, Daniels & Adrian, LLP

(57) ABSTRACT

Provided is a liquid crystal composition having a positive dielectric anisotropy, the liquid crystal composition containing two or more compounds selected from compounds represented by general formula (LC0-1) to general formula (LC0-3), and one or more compounds selected from groups of compounds represented by general formula (LC1) to general formula (LC5). The liquid crystal composition has features of a large Δ∈ and a low viscosity, and provides a practical, highly reliable liquid crystal display element that can realize low-voltage driving and high-speed response. The liquid crystal composition is useful for an active matrix driving liquid crystal display element. The liquid crystal composition can be applied to a liquid crystal display element of an IPS mode or the like.

14 Claims, No Drawings

NEMATIC LIQUID CRYSTAL COMPOSITION

TECHNICAL FIELD

The present invention relates to a nematic liquid crystal composition that is useful as an electro-optical liquid crystal display material and has a positive dielectric anisotropy ($\Delta\varepsilon$).

BACKGROUND ART

Liquid crystal display elements are being used in not only watches and electronic calculators, but also various measuring devices, panels for automobiles, word processors, electronic notebooks, printers, computers, televisions, clocks, advertisement display boards, etc. Typical examples of liquid crystal display mode include a TN (twisted nematic) mode, an STN (super twisted nematic) mode, a VA (vertical alignment) mode characterized by vertical alignment, and an IPS (in-plane-switching) mode/FFS (fringe-field-switching) mode characterized by horizontal alignment, the VA mode and the IPS mode/FFS mode using thin-film transistors (TFTs). It is desirable that liquid crystal compositions used in these liquid crystal display elements be stable against external factors such as moisture, air, heat, and light, be in a liquid crystal phase over a temperature range as wide as possible around room temperature, have a low viscosity, and operate at a low driving voltage. Furthermore, liquid crystal compositions are constituted by several to several tens of compounds so as to optimize dielectric anisotropy ($\Delta\varepsilon$) and/or birefringence (i.e., refractive index anisotropy) ($\Delta n$), etc. for respective display elements.

In vertical alignment displays, a liquid crystal composition having a negative $\Delta\varepsilon$ is used. In horizontal alignment displays such as a TN mode, an STN mode, an IPS mode, or the like, a liquid crystal composition having a positive $\Delta\varepsilon$ is used. Recently, a driving mode has been reported with which a liquid crystal composition having a positive $\Delta\varepsilon$ is aligned vertically in the absence of applied voltage, and an IPS/FFS mode electric field is applied to perform display. Thus, the need for liquid crystal compositions having a positive $\Delta\varepsilon$ has been further increasing. Furthermore, low-voltage driving, high-speed response, and a wide operation temperature range are desirable in all driving modes. Specifically, a positive $\Delta\varepsilon$ having a large absolute value, a low viscosity ($\eta$), and a high nematic phase-isotropic liquid phase transition temperature ($T_{ni}$) are desirable. From the viewpoint of setting of $\Delta n \times d$, which is the product of $\Delta n$ and a cell gap (d), it is also necessary to adjust the $\Delta n$ of a liquid crystal composition to be in an appropriate range in accordance with the cell gap. In addition, high-speed response is important in the case where a liquid crystal display element is applied to a television or the like, and thus a liquid crystal composition having a low rotational viscosity $\gamma_1$ is desirable.

Liquid crystal compositions have been disclosed in which compounds represented by formulae (A-1) and (A-2), which are liquid crystal compounds each having a positive $\Delta\varepsilon$, are used as components thereof (PTL 1 to PTL 4). However, a sufficiently low viscosity has not been realized by any of these liquid crystal compositions.

[Chem. 1]

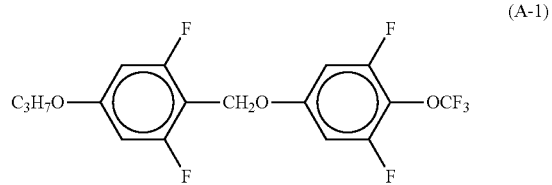

(A-1)

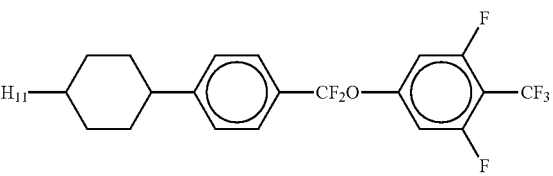

(A-2)

CITATION LIST

Patent Literature

PTL 1: WO96/032365
PTL 2: Japanese Unexamined Patent Application Publication No. 09-157202
PTL 3: WO98/023564
PTL 4: Japanese Unexamined Patent Application Publication No. 2003-183656

SUMMARY OF INVENTION

Technical Problem

An objet to be achieved by the present invention is to provide a liquid crystal composition which has a birefringence ($\Delta n$) adjusted to a desired value, in which a temperature range of the nematic phase is not degraded by suppressing a decrease in the nematic phase-isotropic liquid phase transition temperature ($T_{ni}$) and an increase in the lower limit temperature of the nematic phase, and which has a sufficiently low viscosity ($\eta$) and a positive dielectric anisotropy ($\Delta\varepsilon$).

Solution to Problem

The inventor of the present invention investigated various fluorobenzene derivatives, and found that the above object can be achieved by combining particular compounds. This finding resulted in the completion of the present invention.

The present invention provides a liquid crystal composition having a positive dielectric anisotropy, the liquid crystal composition containing compounds belonging to two or more groups selected from groups of compounds represented by general formula (LC0-1) to general formula (LC0-3), and one or more compounds selected from groups of compounds represented by general formula (LC1) to general formula (LC5). The present invention further provides a liquid crystal display element using the liquid crystal composition.

[Chem. 2]

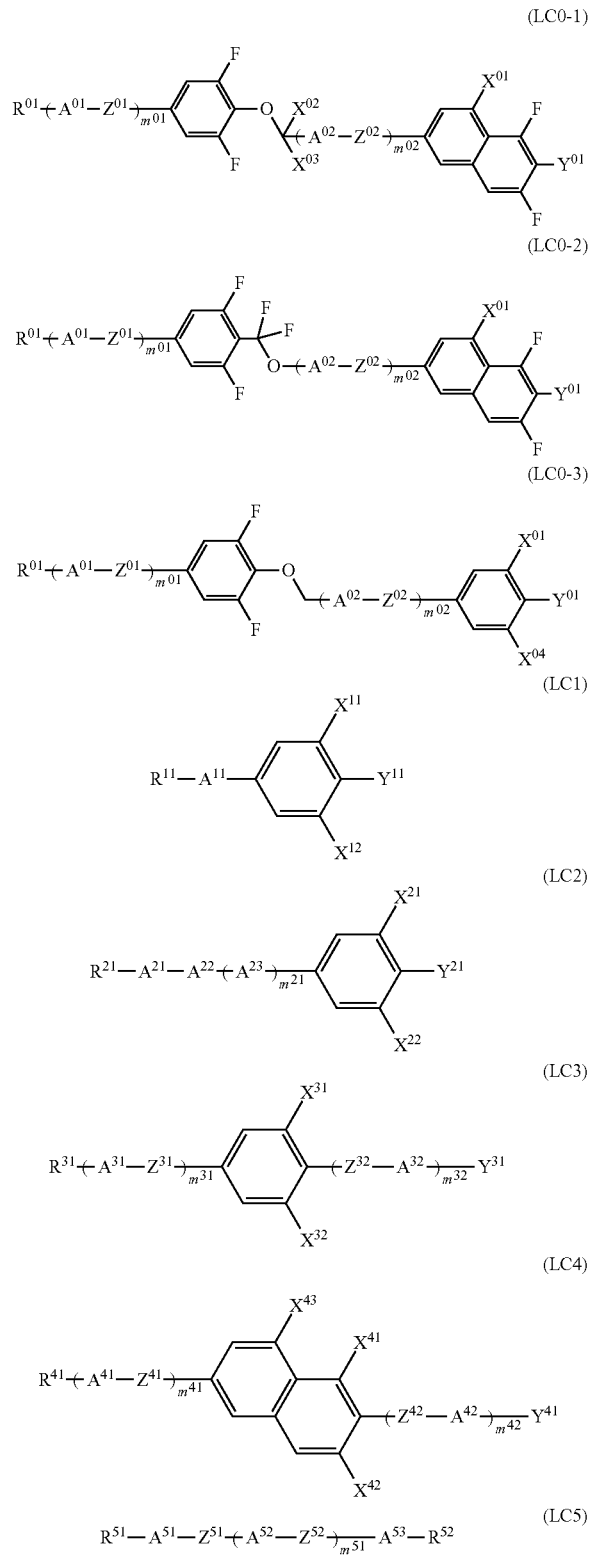

(In the formulae, $R^{01}$ to $R^{41}$ each independently represent an alkyl group having 1 to 15 carbon atoms where one or more —$CH_2$— in the alkyl group may each be substituted with —O—, —CH=CH—, —CO—, —OCO—, —COO—, —C≡C—, —$CF_2$O—, or —O$CF_2$— as long as oxygen atoms are not directly adjacent to each other, and one or more hydrogen atoms in the alkyl group may each be optionally substituted with a halogen; $R^{51}$ and $R^{52}$ each independently represent an alkyl group having 1 to 15 carbon atoms where one or more —$CH_2$— in the alkyl group may each be substituted with —O—, —CH=CH—, —CO—, —OCO—, —COO—, or —C≡C— as long as oxygen atoms are not directly adjacent to each other; $A^{01}$ to $A^{42}$ each independently represent any of the structures below:

[Chem. 3]

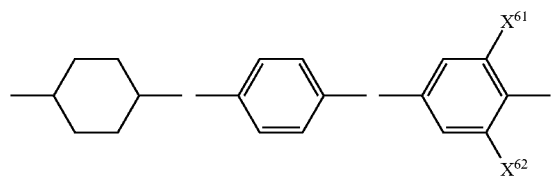

(where one or more —$CH_2$— in a cyclohexane ring in the structure may each be substituted with —O— as long as oxygen atoms are not directly adjacent to each other, one or more —CH= in a benzene ring in the structure may each be substituted with —N= as long as nitrogen atoms are not directly adjacent to each other, and $X^{61}$ and $X^{62}$ each independently represent —H, —Cl, —F, —$CF_3$, or —O$CF_3$); $A^{51}$ to $A^{53}$ each independently represent any of the structures below:

[Chem. 4]

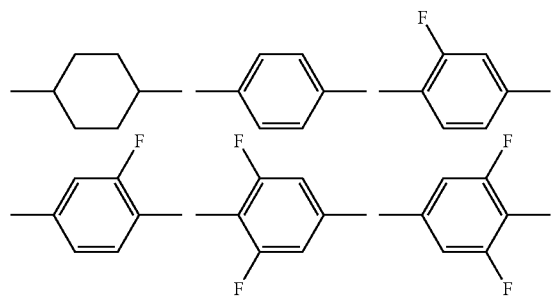

(In the formulae, one or more —$CH_2CH_2$— in a cyclohexane ring may each be substituted with —CH=CH—, —$CF_2$O—, or —O$CF_2$—, and one or more —CH= in a benzene ring may each be substituted with —N= as long as nitrogen atoms are not directly adjacent to each other); $X^{01}$ to $X^{03}$ each represent a hydrogen atom or a fluorine atom; $X^{11}$ to $X^{43}$ each independently represent —H, —Cl, —F, —$CF_3$, or —O$CF_3$; $Y^{01}$ to $Y^{41}$ each represent —Cl, —F, —$CF_3$, or —O$CF_3$; $Z^{01}$ and $Z^{02}$ each independently represent a single bond, —CH=CH—, —C≡C—, —$CH_2CH_2$—, —$(CH_2)_4$—, —O$CH_2$—, —$CH_2$O—, —O$CF_2$—, or —$CF_2$O—; $Z^{31}$ to $Z^{42}$ each independently represent a single bond, —CH=CH—, —C≡C—, —$CH_2CH_2$—, or —$(CH_2)_4$—, but $Z^{31}$ and $Z^{32}$ may each be independently —O$CF_2$— or —$CF_2$O—; when $m^{42}$ is 0, $Z^{41}$ and $Z^{42}$ may each be independently —O$CH_2$—, —O$CF_2$—, or —$CF_2$O—; and at least one of $Z^{31}$ and $Z^{32}$ that are present is not a single bond; $Z^{51}$ and $Z^{52}$ each independently represent a single bond, —CH=CH—, —C≡C—, —$CH_2CH_2$—, —$(CH_2)_4$—, —O$CH_2$—, —$CH_2$O—, —O$CF_2$—, of —$CF_2$O—; $m^{01}$ to $m^{51}$ each independently represent an integer of 0 to 3; $m^{31}+m^{32}$ and $m^{41}+m^{42}$ each independently represent 1, 2, 3, or 4; and when a plurality of $A^{01}$, $A^{02}$, $A^{03}$, $A^{23}$, $A^{31}$, $A^{32}$, $A^{41}$, $A^{42}$, $A^{52}$, $Z^{01}$, $Z^{02}$, $Z^{31}$, $Z^{32}$, $Z^{41}$, $Z^{42}$ and/or $Z^{52}$ are present, they may be the same of different.)

Advantageous Effects of Invention

The liquid crystal composition of the present invention has a feature that $\Delta\in$ is positive and the absolute value of the $\Delta\in$ can be made large. In addition, the liquid crystal composition has a low viscosity ($\eta$), a low rotational viscosity ($\gamma_1$), has good liquid crystal properties, and shows a stable liquid crystal phase over a wide temperature range. Furthermore, the liquid crystal composition is chemically stable against heat, light, water, etc., and has a good solubility, and thus has good phase stability at low temperatures. Thus, the liquid crystal composition of the present invention is a practical, highly reliable liquid crystal composition which can realize low-voltage driving.

DESCRIPTION OF EMBODIMENTS

A liquid crystal composition of the present invention including compounds belonging to two or more groups selected from groups of compounds represented by general formula (LC0-1) to general formula (LC0-3), and one or more compounds selected from groups of compounds represented by general formula (LC1) to general formula (LC5) shows a stable liquid crystal phase. Therefore, the liquid crystal composition of the present invention is a practical liquid crystal composition.

In general formula (LC0-1) to general formula (LC5), $R^{01}$ to $R^{41}$ each independently represent an alkyl group having 1 to 15 carbon atoms where one or more —$CH_2$— in the alkyl group may each be substituted with —O—, —CH=CH—, —CO—, —OCO—, —COO—, —C≡C—, —$CF_2O$—, or —$OCF_2$— as long as oxygen atoms are not directly adjacent to each other, and one or more hydrogen atoms in the alkyl group may each be optionally substituted with a halogen. $R^{01}$ to $R^{41}$ are each independently preferably an alkyl group having 1 to 8 carbon atoms, an alkenyl group having 2 to 8 carbon atoms, or an alkoxy group having 1 to 8 carbon atoms, and preferably a straight chain. $R^{51}$ and $R^{52}$ each independently represent an alkyl group having 1 to 15 carbon atoms where one or more —$CH_2$— in the alkyl group may each be substituted with —O—, —CH=CH—, —CO—, —OCO—, —COO—, or —C≡C— as long as oxygen atoms are not directly adjacent to each other. $R^{51}$ and $R^{52}$ are each independently preferably an alkyl group having 1 to 8 carbon atoms, an alkenyl group having 2 to 8 carbon atoms, or an alkoxy group having 1 to 8 carbon atoms, and preferably a straight chain. When any of $R^{01}$ to $R^{52}$ is an alkenyl group, the alkenyl group is preferably selected from groups represented by any of formula (R1) to formula (R5):

[Chem. 5]

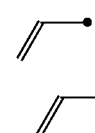
(R1)

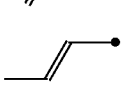
(R2)

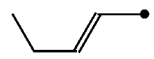
(R3)

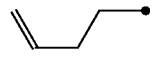
(R4)

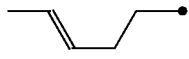
(R5)

(In the formulae, the black dot represents a point that bonds with a ring.)

$A^{01}$ to $A^{42}$ are each independently preferably a trans-1,4-cyclohexylene group, a 1,4-phenylene group, a 3-fluoro-1,4-phenylene group, a 3,5-diluoro-1,4-phenylene group, or a tetrahydropyran group. When at least one of $A^{01}$ to $A^{42}$ represents a tetrahydropyran group, at least one of $A^{01}$, $A^{11}$, $A^{21}$, and $A^{31}$ is preferably a tetrahydropyran group. $A^{51}$ to $A^{53}$ each independently represent a trans-1,4-cyclohexylene group, a 1,4-phenylene group, a 2-fluoro-1,4-phenylene group, or a 3-fluoro-1,4-phenylene group.

$X^{01}$ to $X^{03}$ are each preferably a hydrogen atom or a fluorine atom, and $X^{11}$ to $X^{43}$ are each independently preferably a hydrogen atom or a fluorine atom. $Y^{01}$ to $Y^{41}$ are each preferably —F, —$CF_3$, or —$OCF_3$. $Z^{01}$ and $Z^{12}$ are each independently preferably a single bond, —CH=CH—, —C≡C—, —$CH_2CH_2$—, —$(CH_2)_4$—, —$OCH_2$—, —$CH_2O$—, —$OCF_2$—, or —$CF_2O$—. When one of $Z^{01}$ and $Z^{02}$ that are present represents —CH=CH—, C≡C—, —$CH_2CH_2$—, —$(CH_2)_4$—, —$OCH_2$—, —$CH_2O$—, —$OCF_2$—, or —$CF_2O$—, the other preferably represents a singe bond. All of $Z^{01}$ and $Z^{02}$ more preferably represent single bonds. $Z^{31}$ to $Z^{42}$ are each independently preferably a single bond, —CH=CH—, —C≡C—, —$CH_2CH_2$—, —$(CH_2)_4$—, —$OCH_2$—, —$CH_2O$—, —$OCF_2$—, or —$CF_2O$—, and at least one of $Z^{31}$ and $Z^{32}$ that are present is not a single bond. When $m^{42}$ is 0, $Z^{41}$ each independently represents a single bond, —CH=CH—, —C≡C—, —$CH_2CH_2$—, or —$(CH_2)_4$—. $Z^{51}$ and $Z^{52}$ are each independently preferably a single bond, —CH=CH—, —C≡C—, —$CH_2CH_2$—, —$(CH_2)_4$—, —$OCH_2$—, —$CH_2O$—, —$OCF_2$—, or —$CF_2O$—, more preferably a single bond, —$CH_2CH_2$—, —$OCF_2$—, or —$CF_2O$—, and particularly preferably a single bond. $m^{01}$ and $m^{02}$ each independently preferably represent an integer of 0 to 2, and $m^{21}$ preferably represents an integer of 0 or 1. $m^{31}$ to $m^{42}$ each independently preferably represent an integer of 0 to 2, and $m^{31}+m^{32}$ and $m^{41}+m^{42}$ are each independently preferably 1, 2, or 3. $m^{51}$ preferably represents an integer of 1 or 2. When a plurality of $A^{01}$, $A^{02}$, $A^{23}$, $A^{31}$, $A^{32}$, $A^{41}$, $A^{42}$, $A^{52}$, $Z^{01}$, $Z^{02}$, $Z^{31}$, $Z^{32}$, $Z^{41}$, $Z^{42}$ and/or $Z^{52}$ are present, they may be the same of different.

The compounds represented by general formula (LC0-1) are more preferably compounds represented by general formulae (LC0-1-1) to (LC0-1-8) below. The compounds represented by general formula (LC0-2) are more preferably compounds represented by general formulae (LC0-2-1) to (LC0-2-4) below.

[Chem. 6]
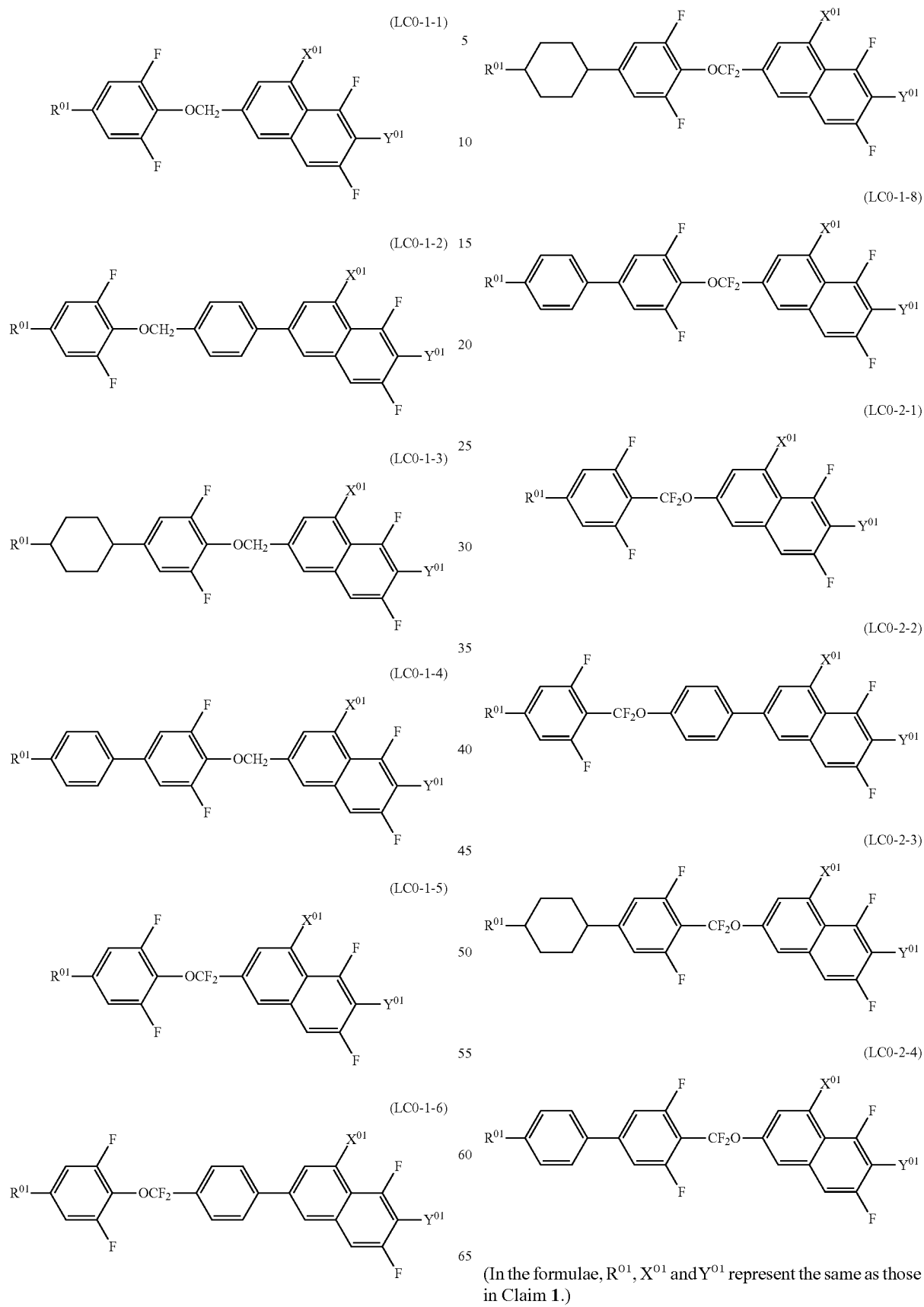
(In the formulae, $R^{01}$, $X^{01}$ and $Y^{01}$ represent the same as those in Claim 1.)

The compounds represented by general formula (LC0-3) are more preferably compounds represented by general formulae (LC0-3-1) to (LC0-3-99) below.
[Chem. 7]
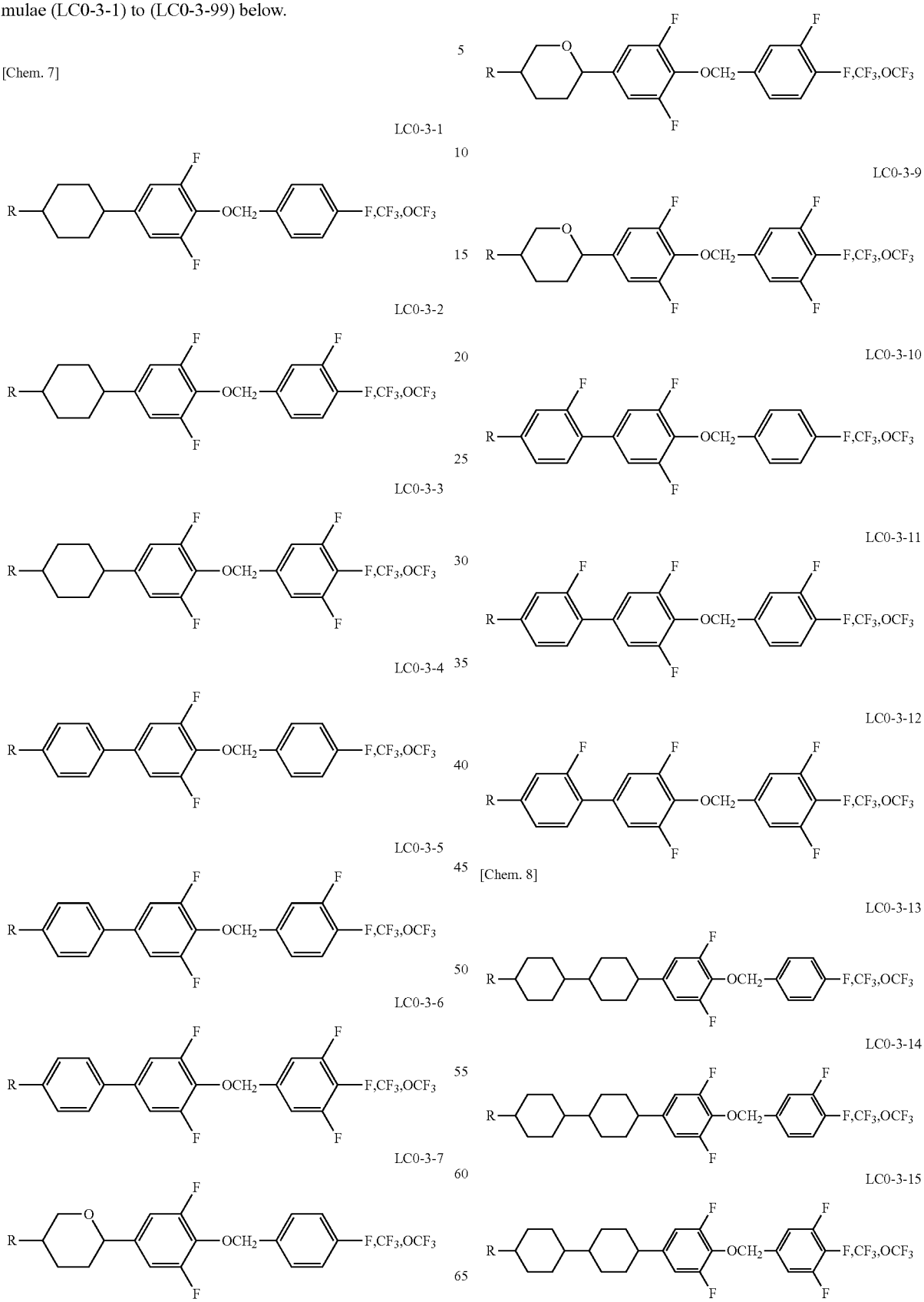

LC0-3-16
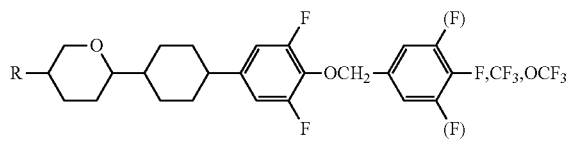
LC0-3-17
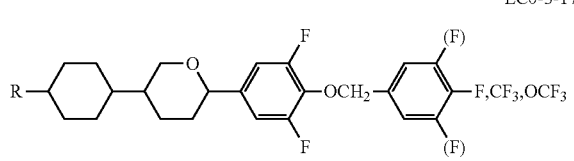
LC0-3-18
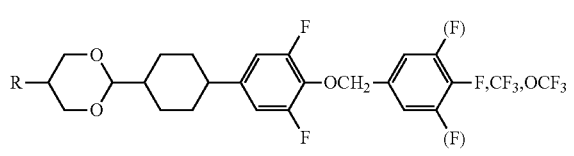
LC0-3-19
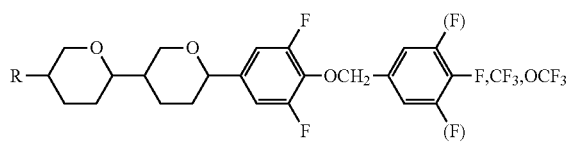
LC0-3-20
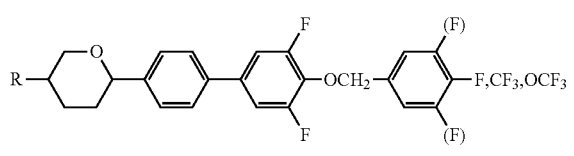
LC0-3-21
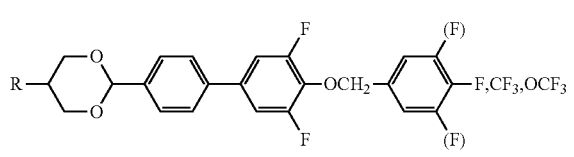
LC0-3-22
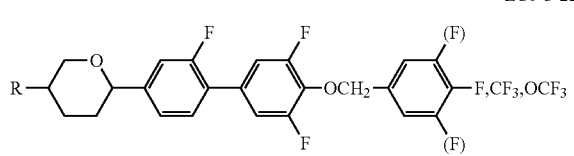
LC0-3-23
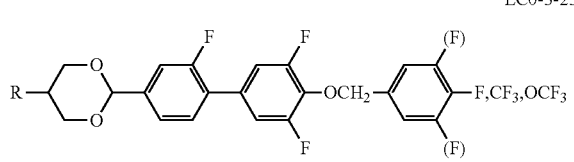
LC0-3-24
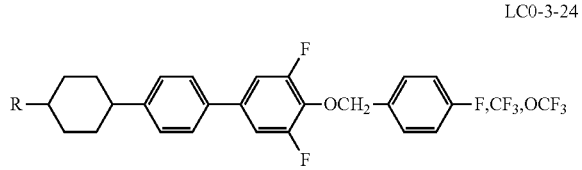
LC0-3-25
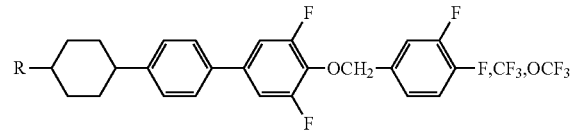
LC0-3-26
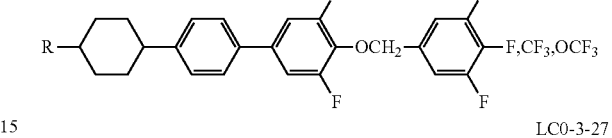
LC0-3-27
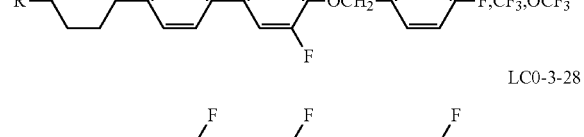
LC0-3-28
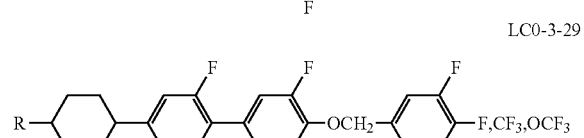
LC0-3-29
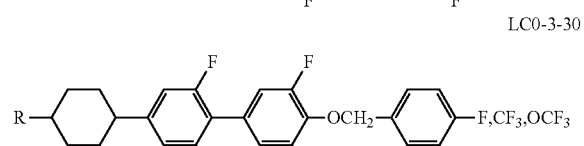
LC0-3-30
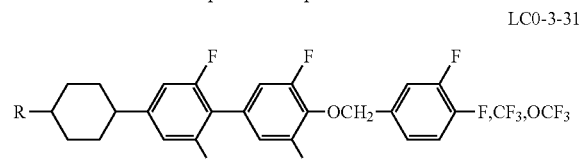
LC0-3-31
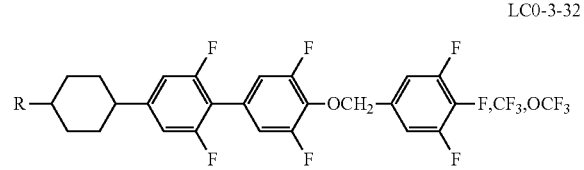
LC0-3-32
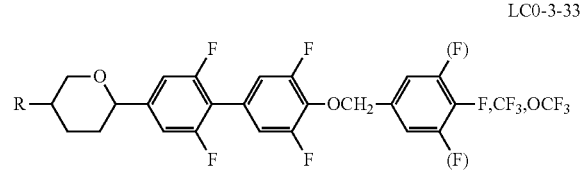
LC0-3-33
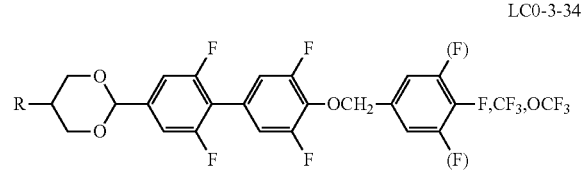
LC0-3-34

[Chem. 9]
LC0-3-35
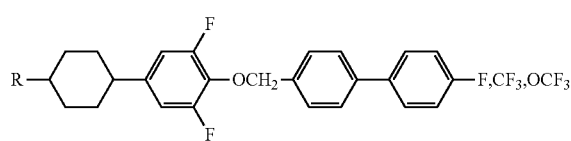
LC0-3-36
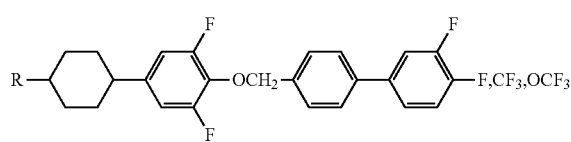
LC0-3-37
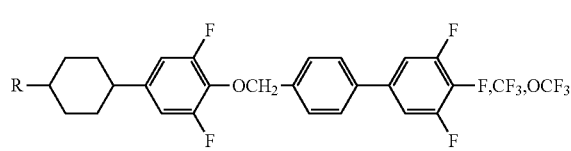
LC0-3-38
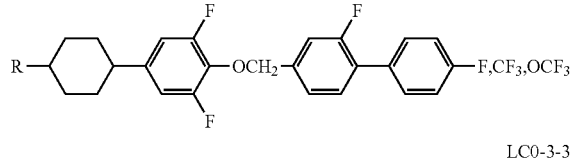
LC0-3-39
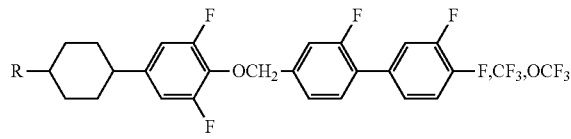
LC0-3-40
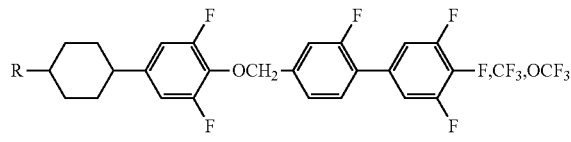
LC0-3-41
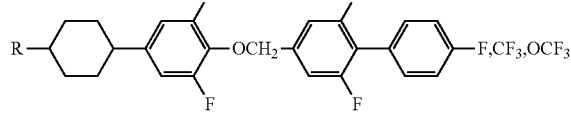
LC0-3-42
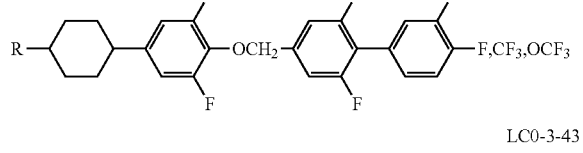
LC0-3-43
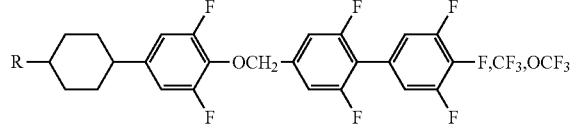
LC0-3-44
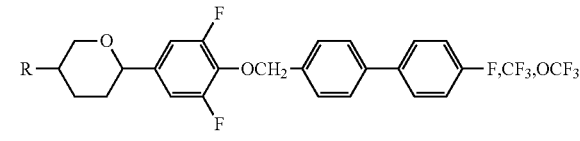
LC0-3-45
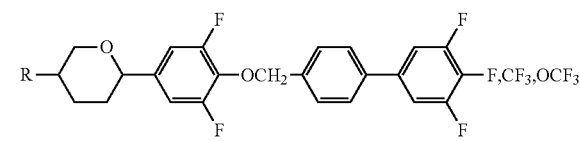
LC0-3-46
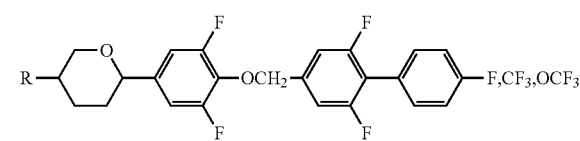
LC0-3-47
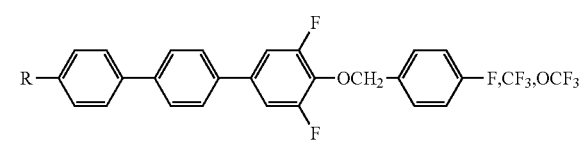
LC0-3-48
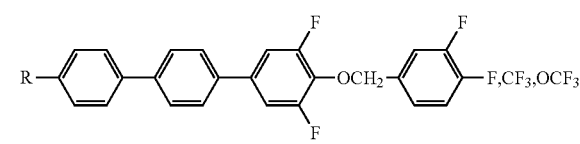
LC0-3-49
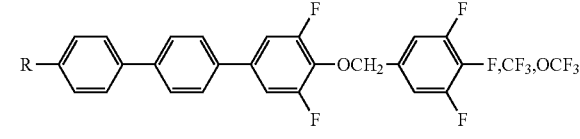
LC0-3-50
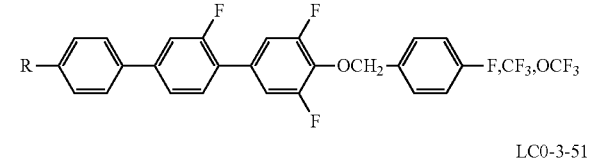
LC0-3-51
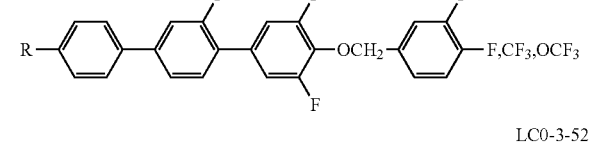
LC0-3-52
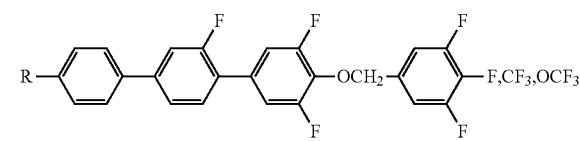

-continued
LC0-3-53
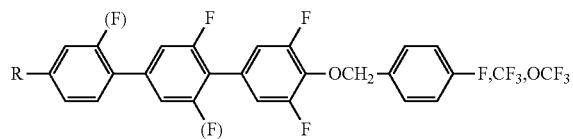
LC0-3-54
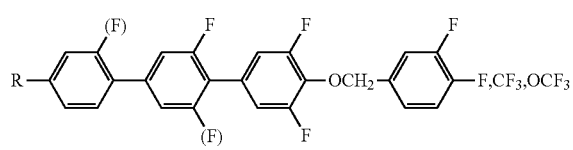
LC0-3-55
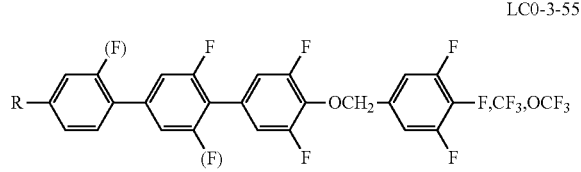
LC0-3-56
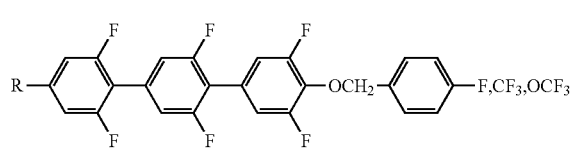
LC0-3-57
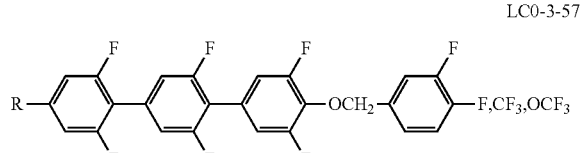
LC0-3-58
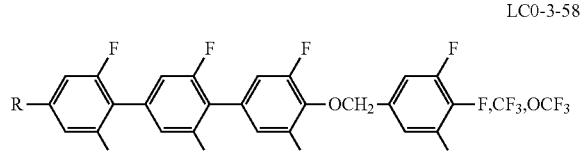
[Chem. 10]
LC0-3-59
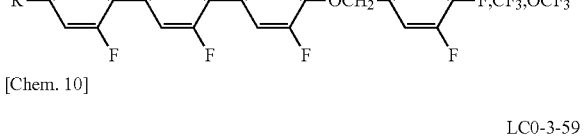
LC0-3-60
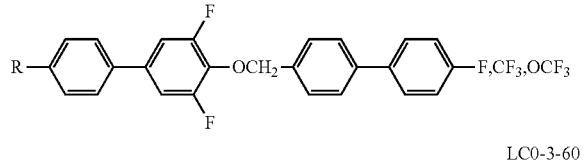
LC0-3-61
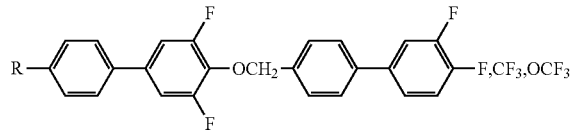
-continued
LC0-3-62
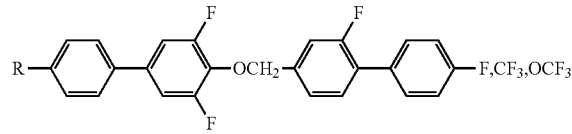
LC0-3-63
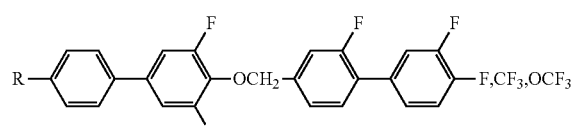
LC0-3-64
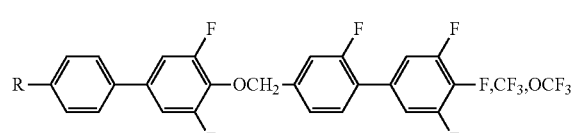
LC0-3-65
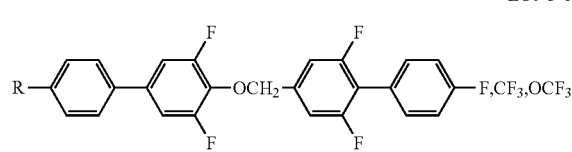
LC0-3-66
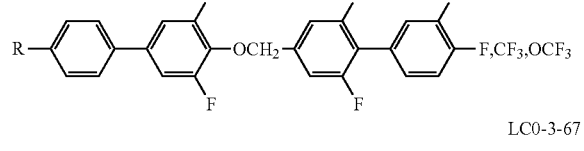
LC0-3-67
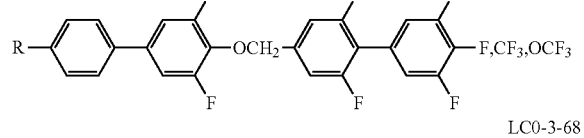
LC0-3-68
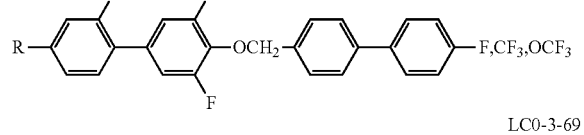
LC0-3-69
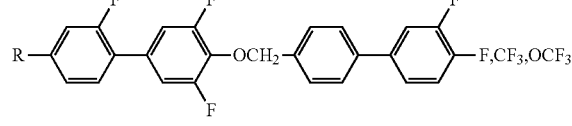
LC0-3-70
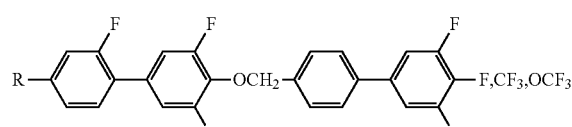
LC0-3-71
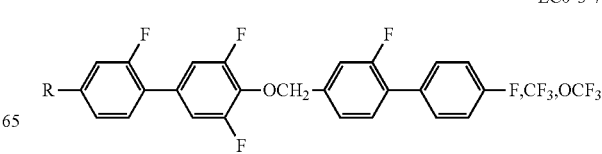

LC0-3-72
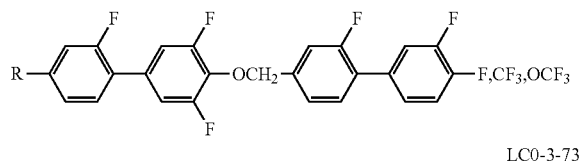
LC0-3-73
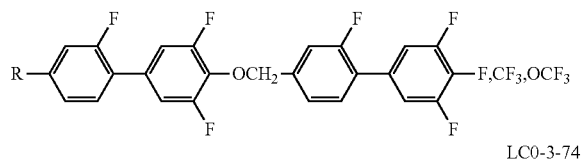
LC0-3-74
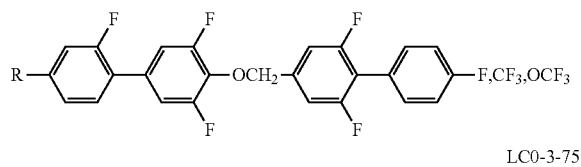
LC0-3-75
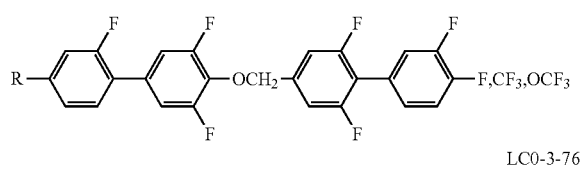
LC0-3-76
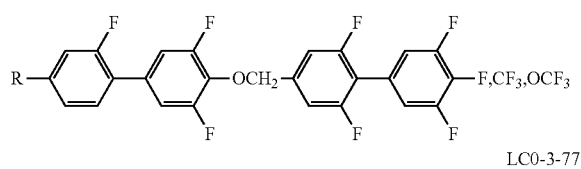
LC0-3-77
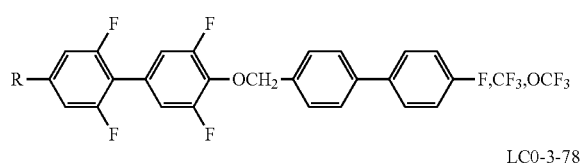
LC0-3-78
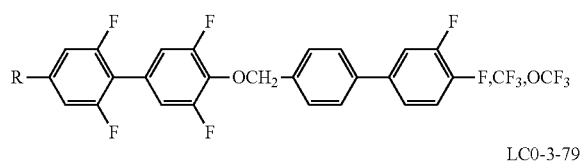
LC0-3-79
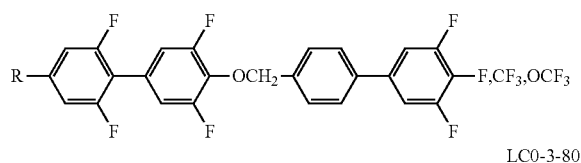
LC0-3-80
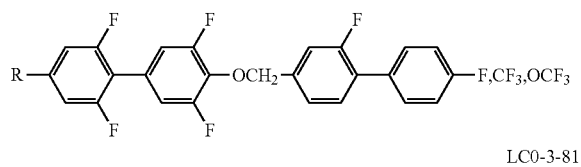
LC0-3-81
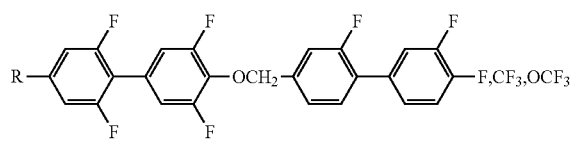
LC0-3-82
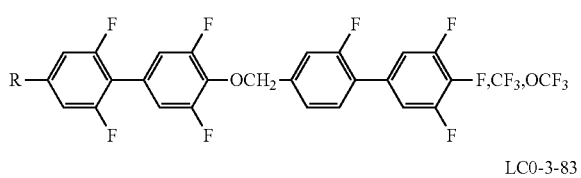
LC0-3-83
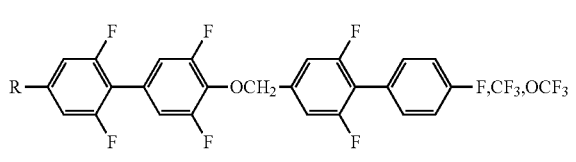
LC0-3-84
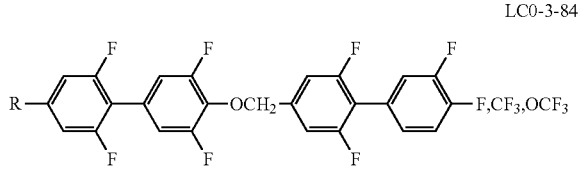
LC0-3-85
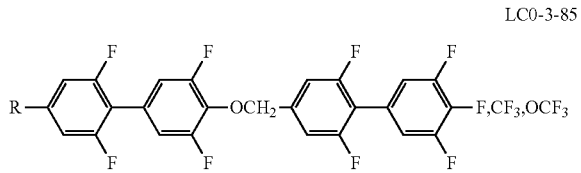
[Chem. 11]
LC0-3-86
LC0-3-87
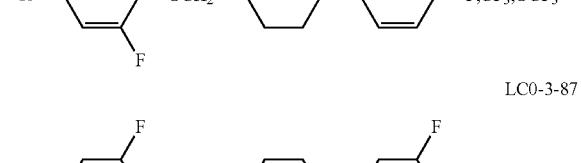
LC0-3-88
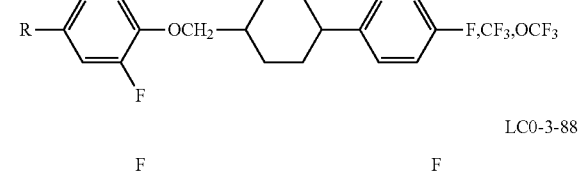
LC0-3-89
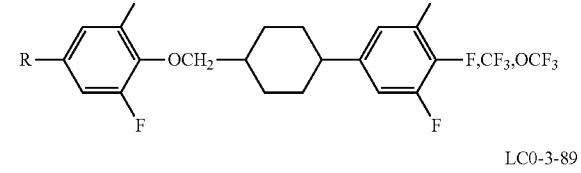
LC0-3-90
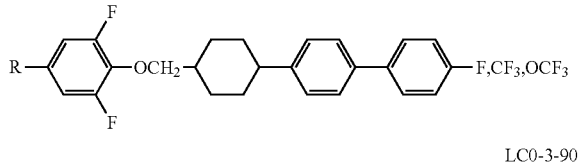

-continued

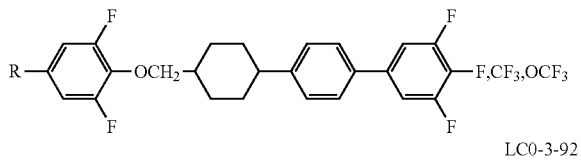
LC0-3-91

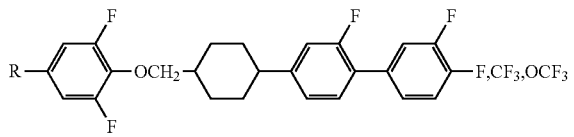
LC0-3-92

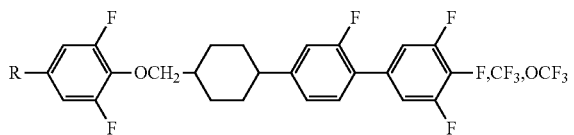
LC0-3-93

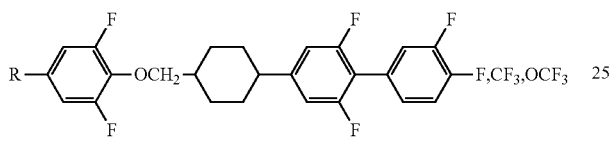
LC0-3-94

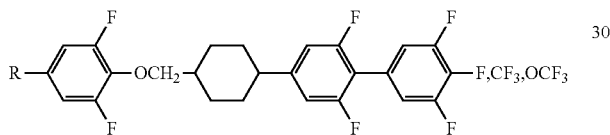
LC0-3-95

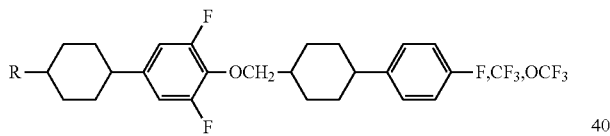
LC0-3-96

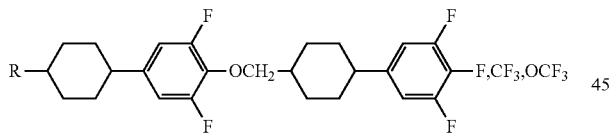
LC0-3-97

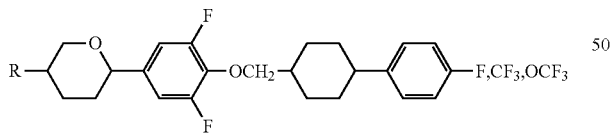
LC0-3-98

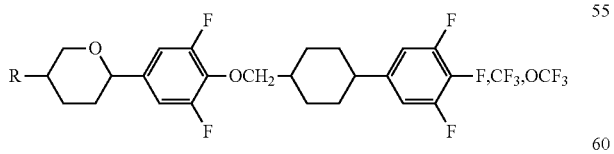
LC0-3-99

(In the formulae, $R^{01}$, $X^{01}$ and $Y^{01}$ each represent the same as those in Claim 1, R represents $R^{01}$, "F, $CF_3$, $OCF_3$" represents any of F, $CF_3$, and $OCF_3$, and (F) represents either H or F.)

The liquid crystal composition of the present invention contains compounds belonging to two or more groups selected from groups of compounds represented by general formulae (LC0-1) to (LC0-3). The total of the contents of the compounds is preferably in the range of 5% to 50% by mass, and more preferably in the range of 10% to 40% by mass.

The compounds represented by general formula (LC1) are more preferably compounds represented by general formulae (LC1-1) to (LC1-4) below:

[Chem. 12]

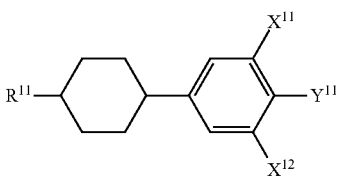
(LC1-1)

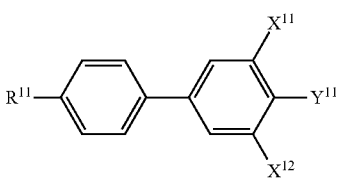
(LC1-2)

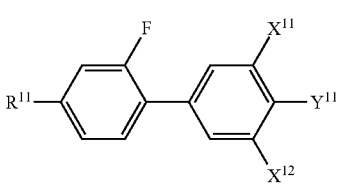
(LC1-3)

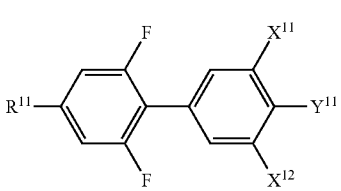
(LC1-4)

(In the formulae, $R^{11}$, $X^{11}$, $X^{12}$, and $Y^{11}$ represent the same as those in Claim 1.)

The compounds represented by general formula (LC2) are more preferably compounds represented by general formulae (LC2-1) to (LC2-14) below:

[Chem. 13]

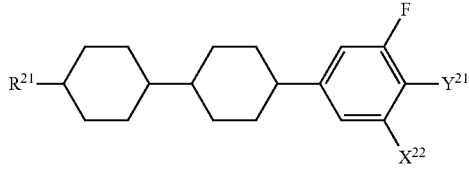
(LC2-1)

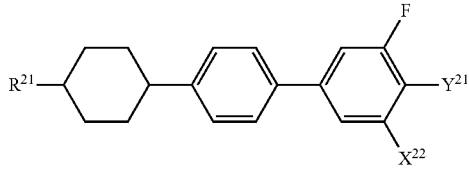
(LC2-2)

-continued
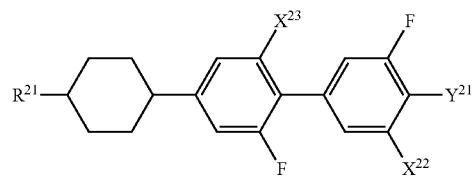
(LC2-3)
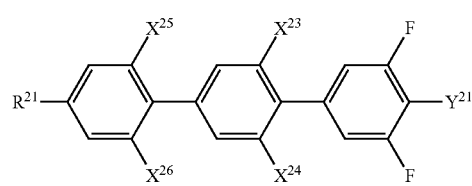
(LC2-4)
(LC2-5)
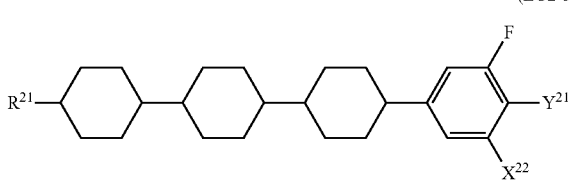
(LC2-6)
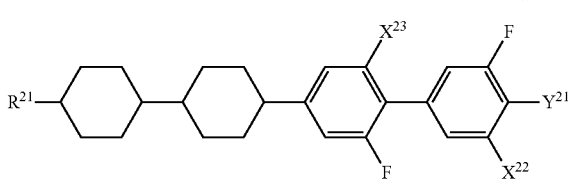
(LC2-7)
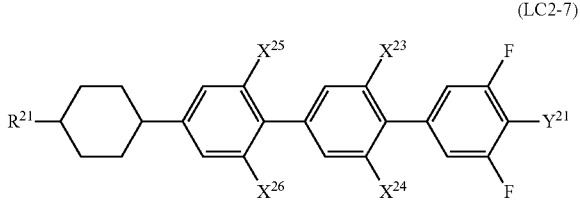
(LC2-8)
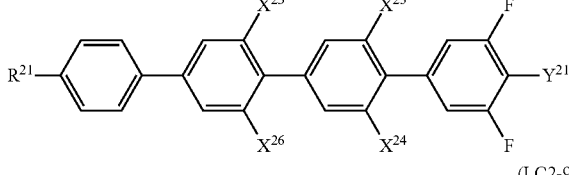
(LC2-9)
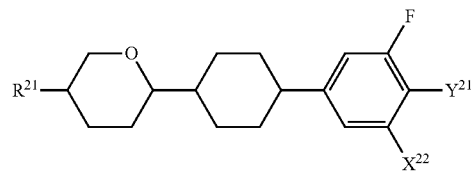
(LC2-10)
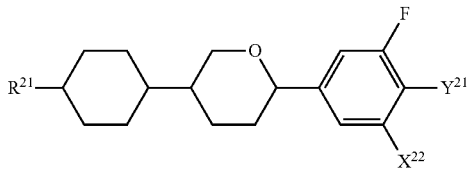
-continued
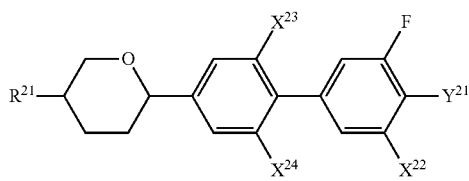
(LC2-11)
(LC2-12)
(LC2-13)
(LC2-14)
(In the formulae, $X^{23}$, $X^{24}$, $X^{25}$, and $X^{26}$ each independently represent a hydrogen atom, Cl, F, CF$_3$, or OCF$_3$, and $X^{22}$, $R^{21}$, and $Y^{21}$ represent the same as those in Claim 1.)
The compounds represented by general formula (LC3) are preferably compounds represented by general formulae (LC3-1) to (LC3-32) below:
[Chem. 14]
(LC3-1)
(LC3-2)
(LC3-3)

(LC3-4)
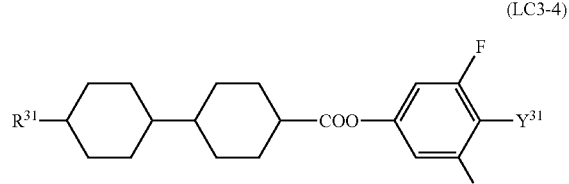
(LC3-5)
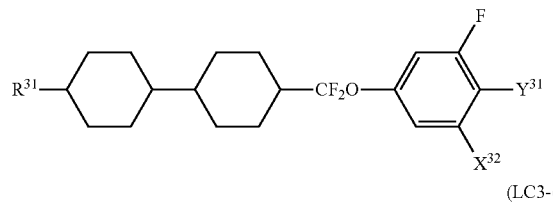
(LC3-6)
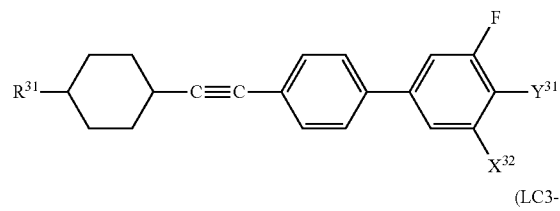
(LC3-7)
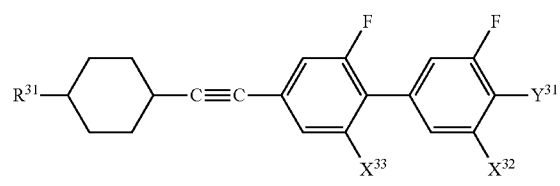
(LC3-8)
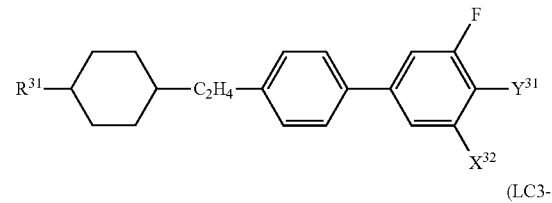
(LC3-9)
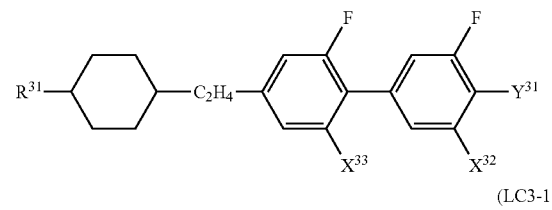
(LC3-10)
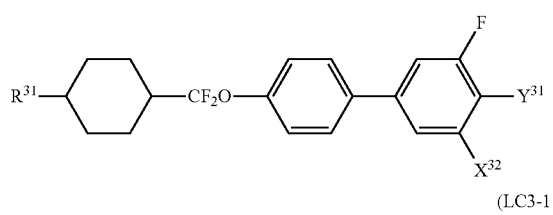
(LC3-11)
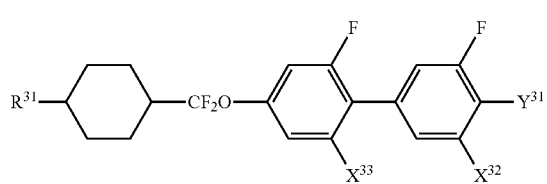
(LC3-12)
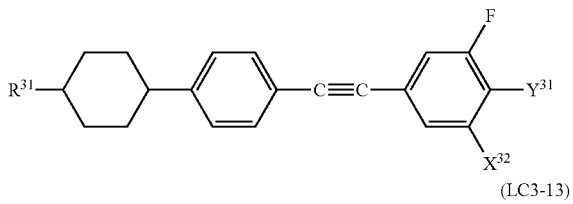
(LC3-13)
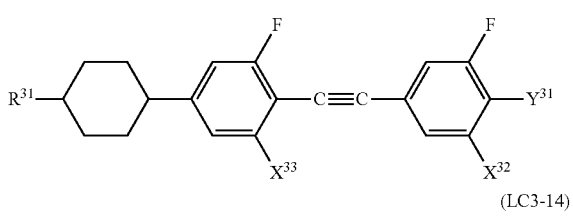
(LC3-14)
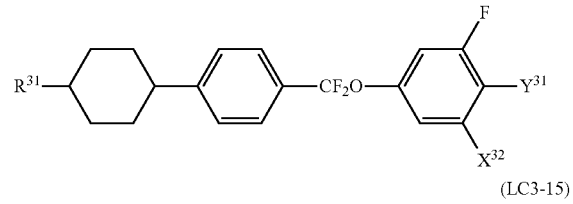
(LC3-15)
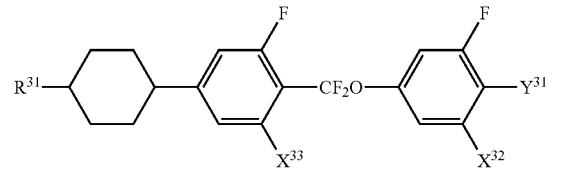
[Chem. 15]
(LC3-16)
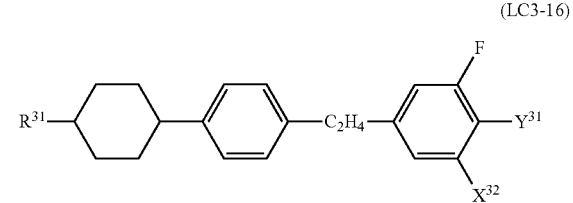
(LC3-17)
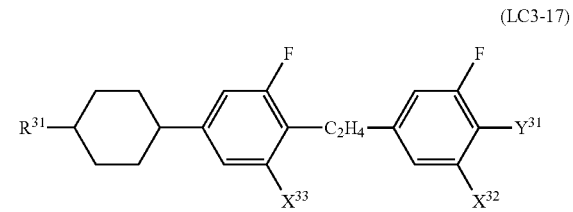
(LC3-18)
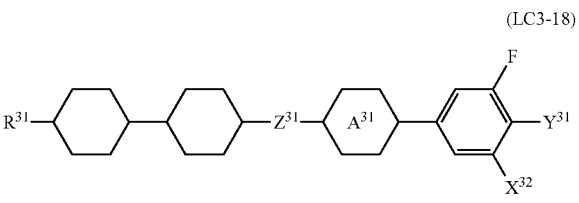
(LC3-19)
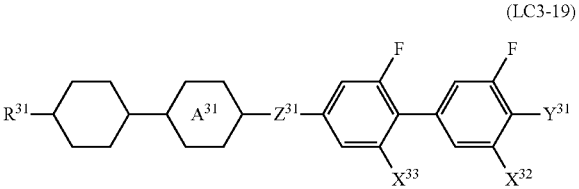

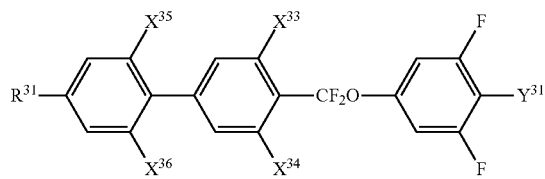 (LC3-20)
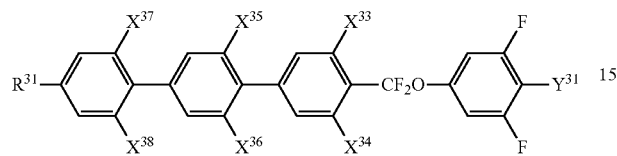 (LC3-21)
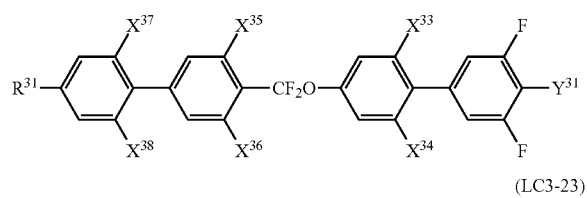 (LC3-22)
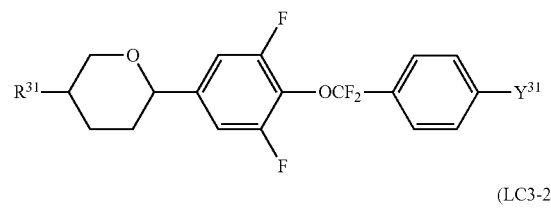 (LC3-23)
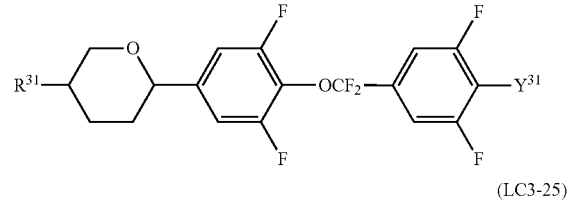 (LC3-24)
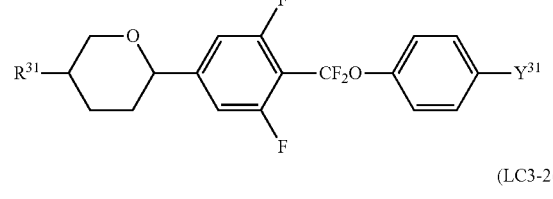 (LC3-25)
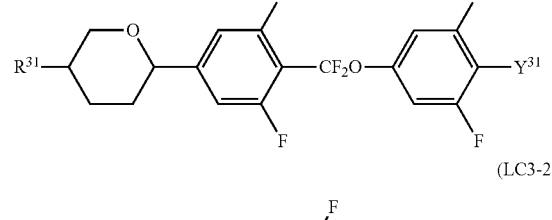 (LC3-26)
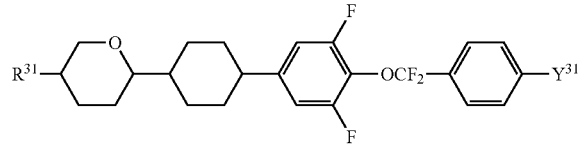 (LC3-27)
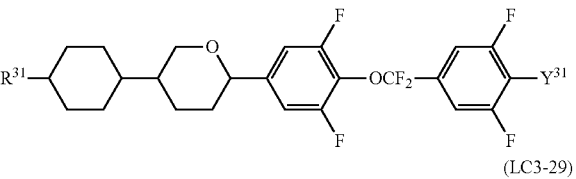 (LC3-28)
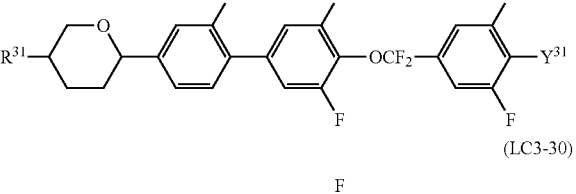 (LC3-29)
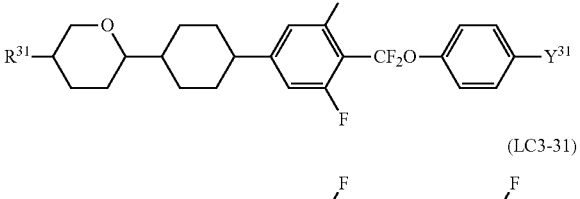 (LC3-30)
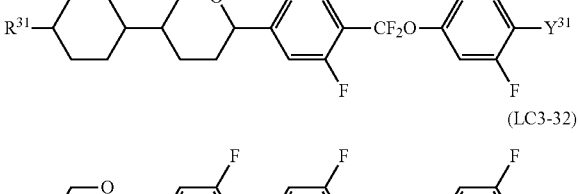 (LC3-31)
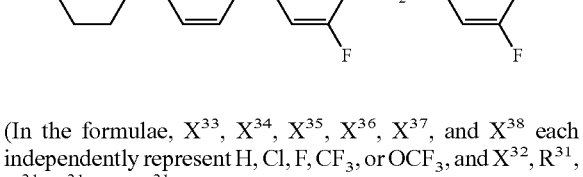 (LC3-32)
(In the formulae, $X^{33}$, $X^{34}$, $X^{35}$, $X^{36}$, $X^{37}$, and $X^{38}$ each independently represent H, Cl, F, $CF_3$, or $OCF_3$, and $X^{32}$, $R^{31}$, $A^{31}$, $Y^{31}$, and $Z^{31}$ represent the same as those in Claim 1.)
The compounds represented by general formula (LC4) are preferably compounds represented by general formulae (LC4-1) to (LC4-23) below:
[Chem. 16]
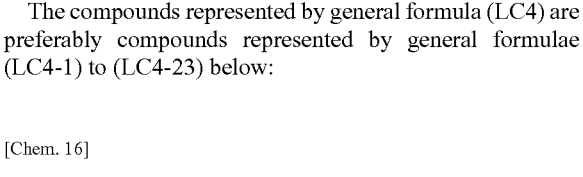 (LC4-1)
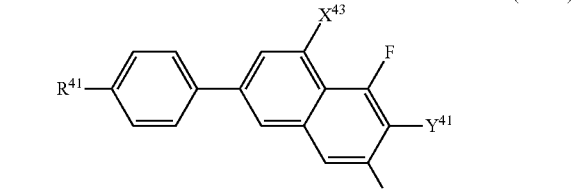 (LC4-2)

-continued
(LC4-3)
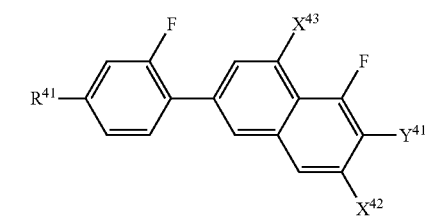
(LC4-4)
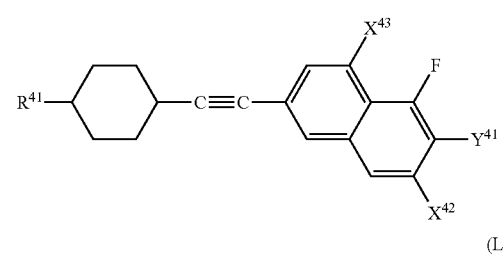
(LC4-5)
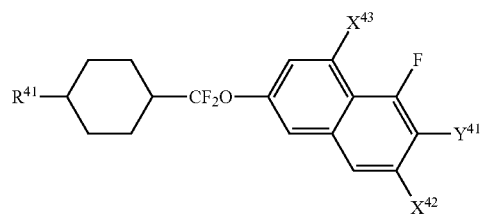
(LC4-6)
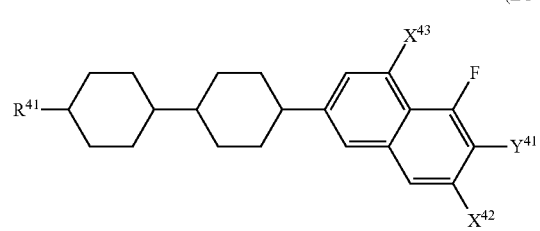
(LC4-7)
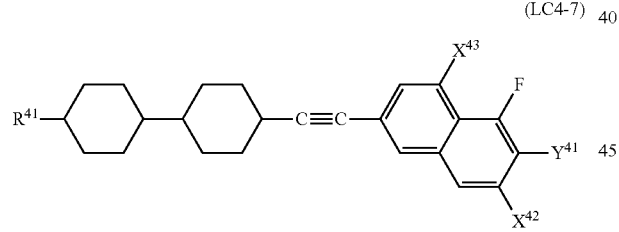
(LC4-8)
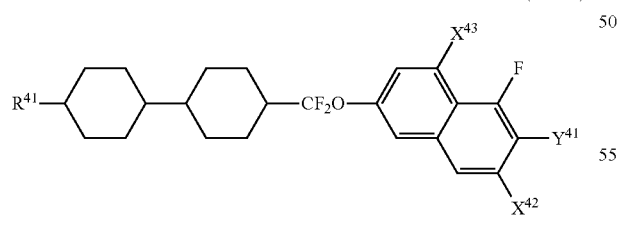
(LC4-9)
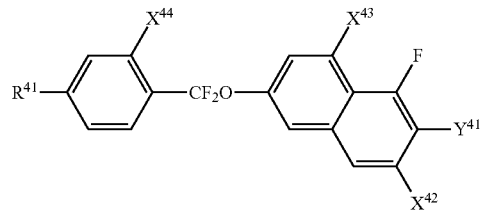
-continued
(LC4-10)
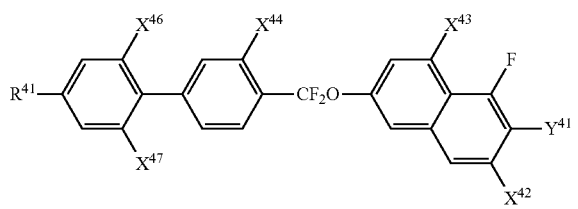
(LC4-11)
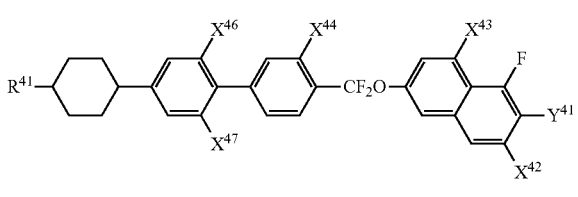
[Chem. 17]
(LC4-12)
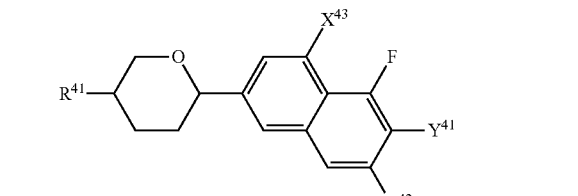
(LC4-13)
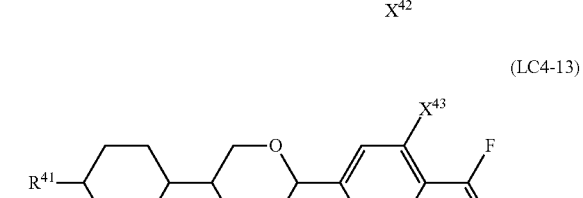
(LC4-14)
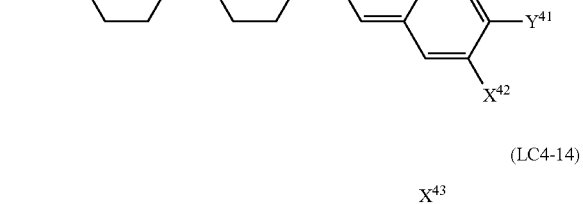
(LC4-15)
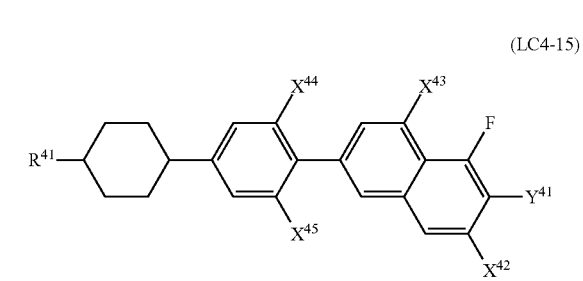

-continued
(LC4-16)
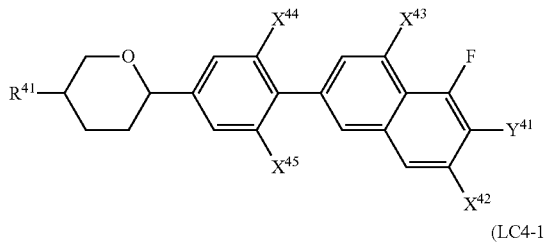
(LC4-17)
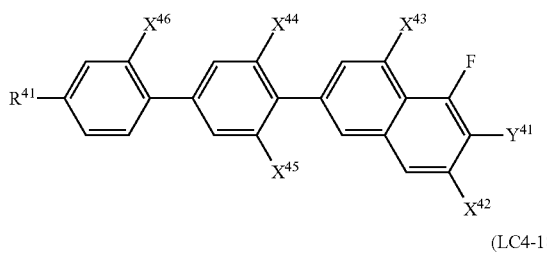
(LC4-18)
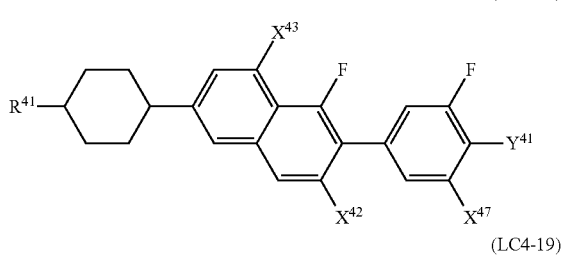
(LC4-19)
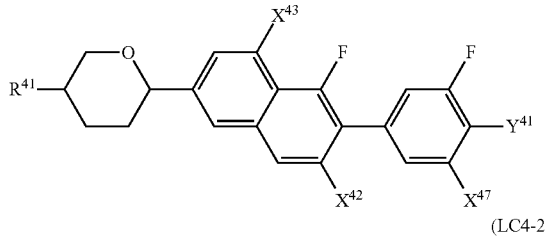
(LC4-20)
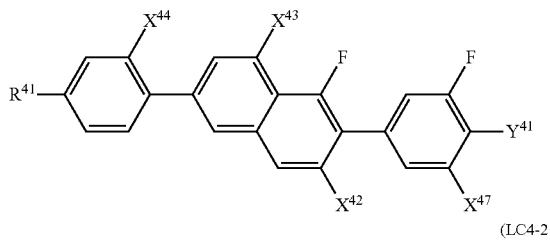
(LC4-21)
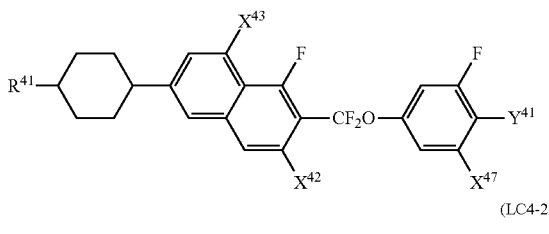
(LC4-22)
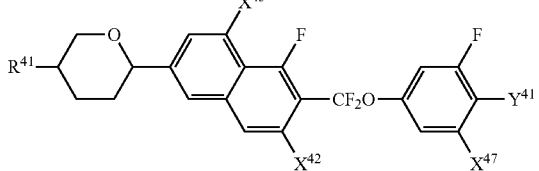
-continued
(LC4-23)
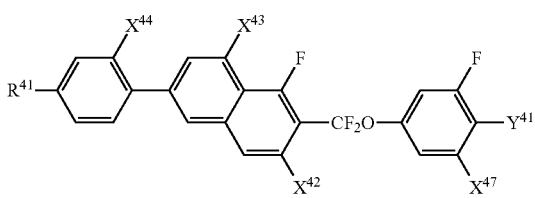
(In the formulae, $X^{44}$, $X^{46}$, $X^{47}$, $X^{71}$, and $X^{72}$ each independently represent H, Cl, F, CF$_3$, or OCF$_3$, and $X^{42}$, $X^{43}$, $R^{41}$, and $Y^{41}$ represent the same as those in Claim 1.)
The compounds represented by general formula (LC5) are preferably compounds represented by general formulae (LC5-1) to (LC5-14) below:
[Chem. 18]
(LC5-1)
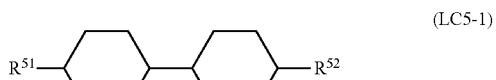
(LC5-2)
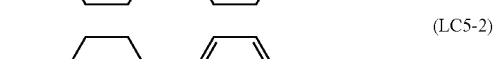
(LC5-3)
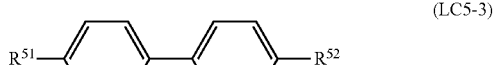
(LC5-4)
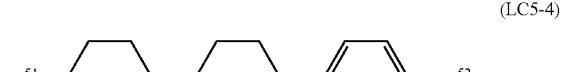
(LC5-5)
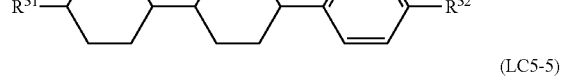
(LC5-6)
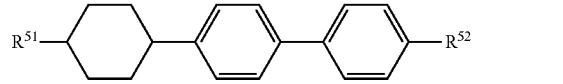
(LC5-7)
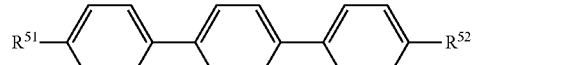
(LC5-8)
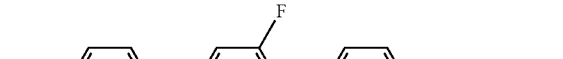
(LC5-9)
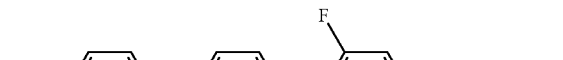

-continued (LC5-10)
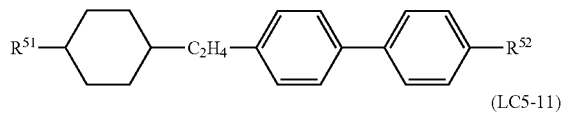

(LC5-11)
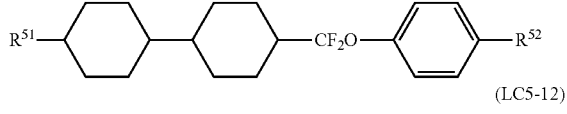

(LC5-12)
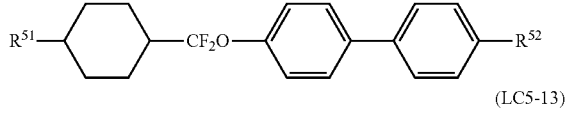

(LC5-13)
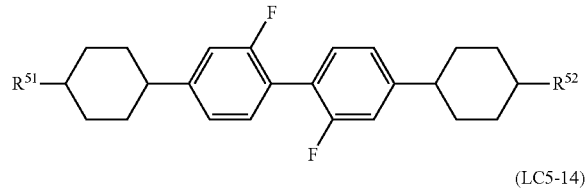

(LC5-14)
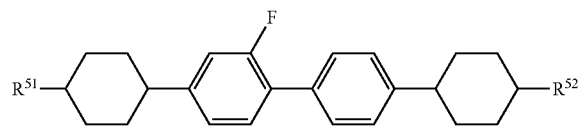

(In the formulae, $R^{51}$ and $R^{52}$ represent the same as those in Claim 1.)

The liquid crystal composition of the present invention preferably contains one or more compounds represented by general formula (LC5), and the content of the one or more compounds is preferably 20% to 70% by mass, and more preferably 30% to 70% by mass.

The liquid crystal composition of the present invention preferably has a viscosity η of 20 mPa·s or less at 20° C.

The liquid crystal composition of the present invention may contain one or more optically active compounds. Any optically active compound may be used as long as the compound can twist and align liquid crystal molecules. Since this twist usually changes with the temperature, a plurality of optically active compounds may be used in order to obtain desired temperature dependence. In order to prevent adverse effects on the temperature range of the nematic liquid crystal phase, the viscosity, and the like, optically active compounds having strong twisting effects are preferably selected and used. Examples of such optically active compounds preferably include liquid crystals such as cholesteric nonanoate and compounds represented by general formulae (Ch-1) to (Ch-6) below:

[Chem. 19]

(Ch-1)
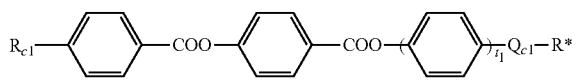

(Ch-2)
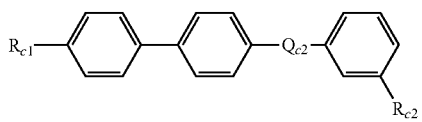

(Ch-3)
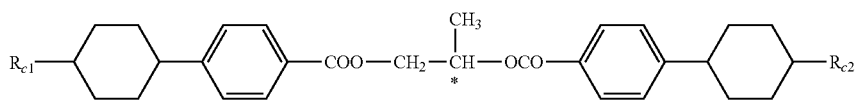

(Ch-4)
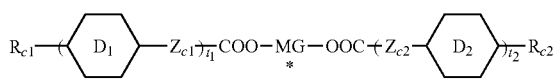

(Ch-5)
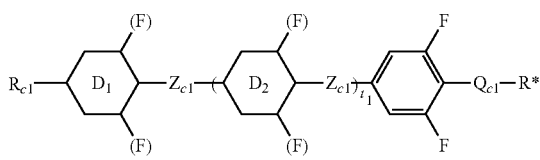

(Ch-6)
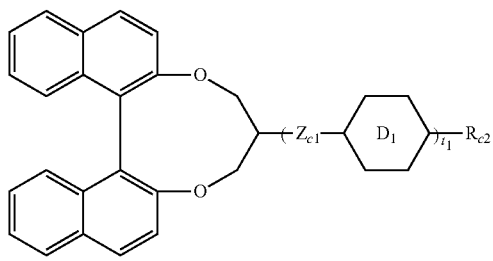

(In the formulae, $R_{c1}$, $R_{c2}$, and $R*$ each independently represent an alkyl group having 1 to 15 carbon atoms where one or more —$CH_2$— in the alkyl group may each be substituted with —O—, —CH=CH—, —CO—, —OCO—, —COO—, —C≡C—, —$CF_2O$—, or —$OCF_2$— as long as oxygen atoms are not directly adjacent to each other, one or more hydrogen atoms in the alkyl group may each be optionally substituted with a halogen, but $R*$ has at least one optically active branched chain group or a halogen substituent; $Z_{c1}$ and $Z_{c2}$ each independently represent a single bond, —CH=CH—, —C≡C—, —$CH_2CH_2$—, —$(CH_2)_4$—, —COO—, —OCO—, —$OCH_2$—, —$CH_2O$—, —$OCF_2$—, or —$CF_2O$—; $D_1$ and $D_2$ each represent a cyclohexane ring or a benzene ring where one or more —$CH_2$— in the cyclohexane ring may each be substituted with —O— as long as oxygen atoms are not directly adjacent to each other, one or more —$CH_2CH_2$— in the ring may each be substituted with —CH=CH—, —$CF_2O$—, or —$OCF_2$—, one or more —CH= in the benzene ring may each be substituted with —N= as long as nitrogen atoms are not directly adjacent to each other, and one or more hydrogen atoms in the ring may each be substituted with F, Cl, or $CH_3$; $t_1$ and $t_2$ each represent 0, 1, 2, or 3; and $MG*$, $Q_{c1}$, and $Q_{c2}$ represent the structures below:

[Chem. 20]

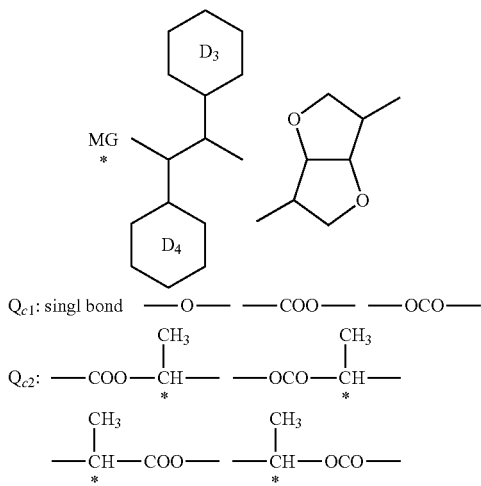

(In the formulae, $D_3$ and $D_4$ each represent a cyclohexane ring or a benzene ring where one or more —$CH_2$— in the cyclohexane ring may each be substituted with —O— as long as oxygen atoms are not directly adjacent to each other, one or more —$CH_2CH_2$— in the ring may each be substituted with —CH=CH—, —$CF_2O$—, or —$OCF_2$—, one or more —CH= in the benzene ring may each be substituted with —N= as long as nitrogen atoms are not directly adjacent to each other, and one or more hydrogen atoms in the ring may each be substituted with F, Cl, or $CH_3$.)

The liquid crystal composition of the present invention may contain one or more polymerizable compounds. Each of the polymerizable compounds is preferably a disk-shaped liquid crystal compound having a structure in which a mother nucleus at the center of the molecule is a benzene derivative, a triphenylene derivative, a truxene derivative, a phthalocyanine derivative, or a cyclohexane derivative and linear alkyl groups, linear alkoxy groups, or substituted benzoyloxy groups substitute the mother nucleus as side chains thereof in a radial manner.

Specifically, the polymerizable compound is preferably a polymerizable compound represented by general formula (PC):

[Chem. 21]

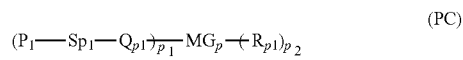

(In the formula, $P_1$ represents a polymerizable functional group, $Sp_1$ represents a spacer group having 0 to 20 carbon atoms, $Q_{p1}$ represents a single bond, —O—, —NH—, —NHCOO—, —OCONH—, —CH=CH—, —CO—, —COO—, —OCO—, —OCOO—, —OOCO—, —CH=CH—, —CH=CH—OCO—, —OCO—CH=CH—, or —C≡C—, $p_1$ and $p_2$ each independently represent 1, 2, or 3, $MG_p$ represents a mesogenic group or a mesogenic supporting group, $R_{p1}$ represents a halogen atom, a cyano group, or an alkyl group having 1 to 25 carbon atoms where one or more $CH_2$ groups in the alkyl group may each be substituted with —O—, —S—, —NH—, —N($CH_3$)—, —CO—, —COO—, —OCO—, —OCOO—, —SCO—, —COS—, or —C≡C— as long as oxygen atoms are not directly adjacent to each other, or $R_{p1}$ may be $P_2$-$Sp_2$-$Q_{p2}$- where $P_2$, $Sp_2$, and $Q_{p2}$ independently represent the same as $P_1$, $Sp_1$, and $Q_{p1}$, respectively.)

More preferably, the polymerizable compound is a compound in which $MG_p$ in general formula (PC) is represented by the following structure:

[Chem. 22]

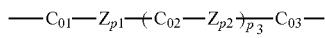

(In the formula, $C_{O1}$ to $C_{O3}$ each independently represent a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, 1,4-bicyclo(2.2.2)octylene group, a decahydronaphthalene-2,6-diyl group, a pyridine-2,5-diyl group, a pyrimidine-2,5-diyl group, a pyrazine-2,5-diyl group, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene-2,7-diyl group, or a fluorene-2,7-diyl group where the 1,4-phenylene group, 1,2,3,4-tetrahydronaphthalene-2,6-diyl group, 2,6-naphthylene group, phenanthrene-2,7-diyl group, 9,10-dihydrophenanthrene-2,7-diyl group, 1,2,3,4,4a,9,10a-octahydrophenanthrene-2,7-diyl group, and fluorene-2,7-diyl group may have one or more substituents selected from F, Cl, $CF_3$, $OCF_3$, a cyano group, an alkyl group, an alkoxy group, an alkanoyl group, and an alkanoyloxy group that have 1 to 8 carbon atoms, an alkenyl group, an alkenyloxy group, an alkenoyl group, an alkenoyloxy group that have 2 to 8 carbon atoms; $Z_{p1}$ and $Z_{p2}$ each independently represent —COO—, —OCO—, —$CH_2CH_2$—, —$OCH_2$—, —$CH_2O$—, —CH=CH—, —C≡C—, —CH=CHCOO—, —OCOCH=CH—, —$CH_2CH_2COO$—, —$CH_2CH_2OCO$—, —$COOCH_2CH_2$—, —$OCOCH_2CH_2$—, —CONH—, —NHCO—, or a single bond; and $p_3$ represents 0, 1, or 2.)

When $Sp_1$ and $Sp_2$ are each independently an alkylene group, the alkylene group may be substituted with one ore more halogen atoms or CN, and one or more $CH_2$ groups in this group may be substituted with —O—, —S—, —NH—, —N(CH₃)—, —CO—, —COO—, —OCO—, —OCOO—, —SCO—, —COS—, or —C≡C— as long as oxygen atoms are not directly adjacent to each other. $P_1$ and $P_2$ are each independently preferably any of structures represented by general formulae below:

[Chem. 23]

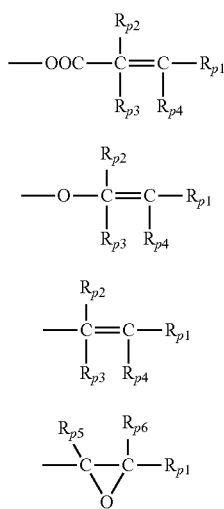

(In the formulae, $R_{p2}$ to $R_{p6}$ each independently represent a hydrogen atom, a halogen atom, or an alkyl group having 1 to 5 carbon atoms.)

More specifically, the polymerizable compound represented by general formula (PC) is preferably any of polymerizable compounds represented by general formulae (PC0-1) to (PC0-6):

[Chem. 24]

$$(P_1\!-\!Sp_1\!-\!Q_{p1}\!\overline{)_{p1}}\!MG_p\!\!\left(\!Q_{p2}\!-\!Sp_2\!-\!P_2\right)_{p4} \quad (PC0\text{-}1)$$

$$(P_1\!-\!Q_{p1}\!\overline{)_{p1}}\!MG_p\!\!\left(\!Q_{p2}\!-\!P_2\right)_{p4} \quad (PC0\text{-}2)$$

$$P_1\!-\!Sp_1\!-\!Q_{p1}\!-\!MG_p\!-\!Q_{p2}\!-\!Sp_2\!-\!P_2 \quad (PC0\text{-}3)$$

$$P_1\!-\!Q_{p1}\!-\!MG_p\!-\!Q_{p2}\!-\!P_2 \quad (PC0\text{-}4)$$

$$P_1\!-\!Sp_1\!-\!Q_{p1}\!-\!MG_p\!-\!R_{p1} \quad (PC0\text{-}5)$$

$$P_1\!-\!Q_{p1}\!-\!MG_p\!-\!R_{p1} \quad (PC0\text{-}6)$$

(In the formulae, $p_4$ each independently represent 1, 2, or 3.)

More specifically, polymerizable compounds represented by general formulae (PC1-1) to (PC1-9) are preferable:

[Chem. 25]

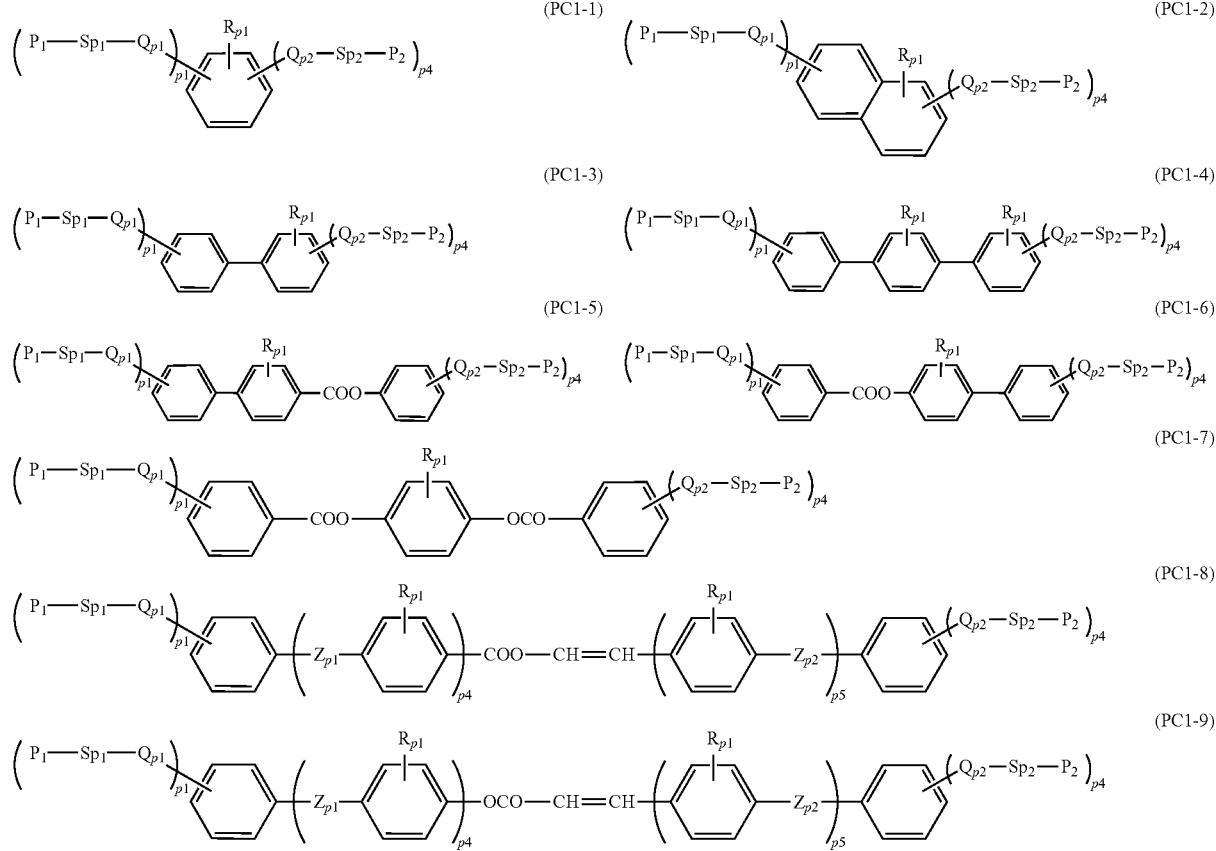

(In the formulae, $p_5$ represents 0, 1, 2, 3, or 4.) In particular, $Sp_1$, $Sp_2$, $Q_{p1}$, and $Q_{p2}$ are each preferably a single bond, $P_1$ and $P_2$ are each preferably a group represented by formula (PC0-a) and more preferably a acryloyloxy group or a methacryloyloxy group, $p_1+p_4$ is preferably 2, 3, or 4, and $R_{p1}$ is preferably H, F, $CF_3$, $OCF_3$, $CH_3$, or $OCH_3$. Furthermore, the compounds represented by general formulae (PC1-2), (PC1-3), (PC1-4), and (PC1-8) are preferable.

In addition, a disk-shaped liquid crystal compound represented by general formula (PC) where $MG_p$ is represented by general formula (PC1)-9 is also preferable.

[Chem. 26]

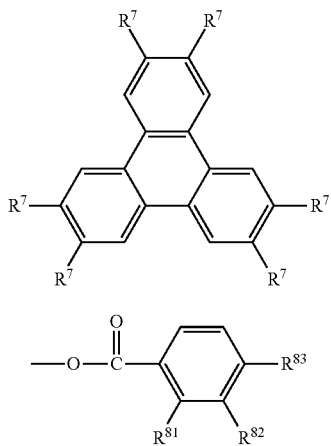

(In the formula, $R_7$ each independently represent $P_1$-$Sp_1$-$Q_{p1}$ or a substituent represented by general formula (PC1-e). $R_{81}$ and $R_{82}$ each independently represent a hydrogen atom, a halogen atom, or a methyl group, and $R_{83}$ represents an alkoxy group having 1 to 20 carbon atoms where at least one hydrogen atom in the alkoxy group is substituted with any of the substituents represented by general formulae (PC0-a) to (PC0-d) above.

The amount of polymerizable compound used is preferably 0.05% to 2.0% by mass.

In a liquid crystal composition containing a polymerizable compound of the present invention, a liquid crystal display element is prepared by polymerizing the polymerizable compound. In this case, it is desirable to reduce the amount of unpolymerized component to a certain amount or less. Accordingly, the liquid crystal composition preferably contains a polymerizable compound having a biphenyl group and/or a terphenyl group as a partial structure in general formula (LC0). More specifically, compounds represented by general formulae (LC0-4) to (LC0-6), general formulae (LC0-10) to (LC0-16), and general formulae (LC0-27) to (LC0-107) are preferable. Preferably, one or more compounds are selected from these compounds and incorporated in an amount of 0.1% to 40% by mass. These compounds are preferably used in combination with groups of polymerizable compounds represented by general formulae (PC1-1) to (PC1-3), general formula (PC1-8), or general formula (PC1-9).

The liquid crystal composition may further contain one or more antioxidants, and further contain one or more UV absorbers. The antioxidant is preferably selected from compounds represented by general formula (E-1) and/or general formula (E-2) below.

[Chem. 27]

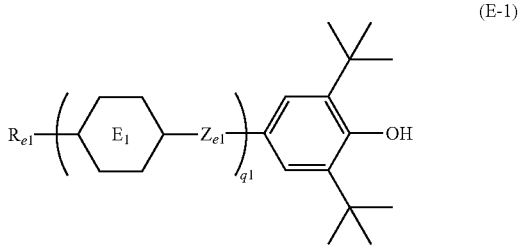

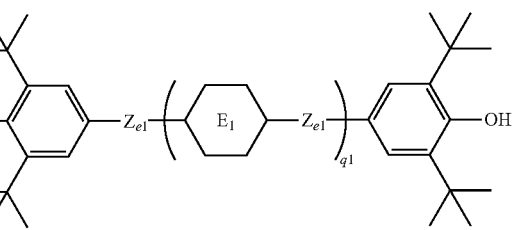

(In the formulae, $R_{e1}$ represents an alkyl group having 1 to 15 carbon atoms where one or more —$CH_2$— in the alkyl group may each be substituted with —O—, —CH=CH—, —CO—, —OCO—, —COO—, —C≡C—, —$CF_2$O—, or —$OCF_2$— as long as oxygen atoms are not directly adjacent to each other, and one or more hydrogen atoms in the alkyl group may each be optionally substituted with a halogen; $Z_{e1}$ and $Z_{e2}$ each independently represent a single bond, —CH=CH—, —C≡C—, —$CH_2CH_2$—, —$(CH_2)_4$—, —OCO—, —OCO—, —$OCH_2$—, —$CH_2O$—, —$OCF_2$—, or —$CF_2O$—, $E_1$ represents a cyclohexane ring or a benzene ring where one or more —$CH_2$— in the cyclohexane ring may each be substituted with —O— as long as oxygen atoms are not directly adjacent to each other, one or more —$CH_2CH_2$— in the ring may each be substituted with —CH=CH—, —$CF_2O$—, or —$OCF_2$—, one or more —CH= in the benzene ring may each be substituted with —N= as long as nitrogen atoms are not directly adjacent to each other, and one or more hydrogen atoms in the ring may each be substituted with F, Cl, or $CH_3$; and $q_1$ represents 0, 1, 2, or 3.)

The liquid crystal composition of the present invention can be used in a liquid crystal display element, in particular, an active matrix driving liquid crystal display element of, for example, a TN mode, an OCB (optically compensated bend) mode, an ECB (electrically controlled birefringence) mode, an IPS (including FFS electrodes) mode, or a VA-IPS mode (including FFS electrodes). Here, the VA-IPS mode is a mode in which a liquid crystal material having a positive dielectric anisotropy ($\Delta\epsilon > 0$) is aligned in the absence of applied voltage in a direction perpendicular to a substrate surface, and liquid crystal molecules are driven by pixel electrodes and a common electrode that are arranged on the same substrate surface. Since the liquid crystal molecules are aligned in the direction of a curved electric field generated in the pixel electrodes and the common electrode, pixels can be easily divided and a multi-domain can be easily formed. Thus, a good response is also advantageously achieved. According to non-patent literatures of Proc. 13th IDW, 97 (1997), Proc. 13th IDW, 175 (1997), SID Sym. Digest, 319 (1998), SID Sym. Digest, 838 (1998), SID Sym. Digest, 1085 (1998), SID Sym. Digest, 334 (2000), and Eurodisplay Proc., 142 (2009), various other names such as EOC and VA-IPS are used. However, in the present invention, this mode is hereinafter abbreviated as "VA-IPS".

In general, the threshold voltage (Vc) of the Freedericksz transition in the TN and ECB modes is expressed by the following formula:

$$V_C = \frac{\Pi d_{cell}}{d_{cell} + \langle r1 \rangle} \sqrt{\frac{K11}{\Delta \varepsilon}} \qquad \text{[Math. 1]}$$

In the STN mode, the threshold voltage (Vc) is expressed by the following formula:

$$V_C = \frac{\Pi d_{gap}}{d_{cell} + \langle r2 \rangle} \sqrt{\frac{K22}{\Delta \varepsilon}} \qquad \text{[Math. 2]}$$

In the VA mode, the threshold voltage (Vc) is expressed by the following formula:

$$V_C = \frac{\Pi d_{cell}}{d_{cell} - \langle r3 \rangle} \sqrt{\frac{K33}{|\Delta \varepsilon|}} \qquad \text{[Math. 3]}$$

(In the formulae, Vc represents Freedericksz transition (V), Π represents the circular constant, $d_{cell}$ represents a distance (μm) between a first substrate and a second substrate, $d_{gap}$ represents a distance (μm) between pixel electrodes and a common electrode, $d_{ITO}$ represents a width (μm) of the pixel electrodes and/or the common electrode, <r1>, <r2>, and <r3> represent an extrapolation length (μm), K11 represents a splay elastic constant (N), K22 represents a twist elastic constant (N), K33 represents a bend elastic constant (N), and Δ∈ represents dielectric anisotropy.)

The inventions etc. have found that Mathematical formula 4 below is applicable to the VA-IPS mode.

$$V_C \propto \frac{d_{gap} - \langle r' \rangle}{d_{ITO} + \langle r \rangle} \frac{\Pi d_{cell}}{d_{cell} - \langle r3 \rangle} \sqrt{\frac{K33}{|\Delta \varepsilon|}} \qquad \text{[Math. 4]}$$

(In the formula, Vc represents Freedericksz transition (V), Π represents the circular constant, $d_{cell}$ represents a distance (μm) between a first substrate and a second substrate, $d_{gap}$ represents a distance (μm) between pixel electrodes and a common electrode, $d_{ITO}$ represents a width (μm) of the pixel electrodes and/or the common electrode, <r>, <r'>, and <r3> represent an extrapolation length (μm), K33 represents a bend elastic constant (N), and Δ∈ represents dielectric anisotropy.) Mathematical formula 4 shows that the driving voltage can be lowered by minimizing $d_{gap}$ and maximizing $d_{ITO}$ in the cell structure and that the driving voltage can also be lowered by selecting a liquid crystal composition having a large absolute value of Δ∈ and small K33.

The liquid crystal composition of the present invention can be adjusted to have preferable Δ∈, K11, K33, and the like.

The product (Δn·d) of birefringence (Δn) of the liquid crystal composition and the distance (d) between the first substrate and the second substrate in the display device strongly relates to the viewing angle characteristics and the response speed. Therefore, the distance (d) tends to become as small as 3 to 4 μm. The product (Δn·d) is particularly preferably 0.31 to 0.33 in the TN, ECB, and IPS (in which liquid crystals are aligned substantially parallel to a substrate surface in the absence of applied voltage) modes. In the VA-IPS mode, the product (Δn·d) is preferably 0.20 to 0.59 and particularly preferably 0.30 to 0.40 in the case where liquid crystals are aligned vertically with respect to the two substrates. As described above, an optimum value of the product (Δn·d) differs according to the type of mode of the display element. Accordingly, the birefringence (Δn) of liquid crystal compositions suitable for various modes is in the range of 0.070 to 0.110, in the range of 0.100 to 0.140, or in the range of 0.130 to 0.180. Thus, liquid crystal compositions having these various ranges of the birefringence (Δn) can be produced.

The liquid crystal composition of the present invention that contains a compound represented by general formula (PC) as a polymerizable compound can provide polymer-stabilized liquid crystal display elements of the TN mode, OCB node, ECB mode, IPS mode, or VA-IPS mode prepared by polymerizing the polymerizable compound in the liquid crystal composition in the presence or absence of applied voltage. Specifically, such liquid crystal display elements can be produced by enclosing a liquid crystal composition containing a polymerizable compound between two substrates, and polymerizing the polymerizable compound in the liquid crystal composition by energy such as ultraviolet light in the presence or absence of applied voltage. In such a liquid crystal display element, the alignment state of liquid crystal molecules can be memorized by the polymerization of the polymerizable compound, and stability of the alignment state can be thereby improved. In addition, improvement in the response speed is also expected.

EXAMPLES

The present invention will now be described in more detail by using Examples, but the present invention is not limited by these Examples. In the compositions of Examples and Comparative Example described below, "%" means "% by mass".

Physical properties of liquid crystal compositions are represented as follows.

$T_{N-I}$: nematic phase-isotropic liquid phase transition temperature (° C.)
$T_{-n}$: lower limit temperature (° C.) of nematic phase
∈⊥: dielectric constant at 25° C. in direction perpendicular to major axis of molecule
Δ∈: dielectric anisotropy at 25° C.
$n_o$: refractive index of ordinary ray at 25° C.
Δn: birefringence at 25° C.
$V_{th}$: voltage (V) which is applied to a cell with a thickness of 6 μm and at which transmittance is changed by 10% when a rectangular wave having a frequency of 1 KHz at 25° C. is applied
$η_{20}$: bulk viscosity (mPa·s) at 20° C.
$γ_1$: rotational viscosity (mPa·s)

The following abbreviations are used to describe compounds.

TABLE 1

| n (numeral) at end | $C_nH_{2n+1}$— |
|---|---|
| -2- | —$CH_2CH_2$— |
| —1O— | —$CH_2O$— |
| —O1— | —$OCH_2$— |
| —V— | —CO— |
| —VO— | —COO— |
| —CFFO— | —$CF_2O$— |

TABLE 1-continued

| | |
|---|---|
| —F | —F |
| —Cl | —Cl |
| —CN | —C≡N |
| —OCFFF | —OCF$_3$ |
| —CFFF | 0 |
| —OCFF | —OCHF$_2$ |
| —On | —OC$_n$H$_{2n+1}$ |
| -T- | —C≡C— |
| ndm- | C$_n$H$_{2n+1}$—HC=CH—(CH$_2$)$_{m-1}$— |
| -ndm | —(CH$_2$)$_{n-1}$—HC=CH—C$_m$H$_{2m+1}$ |
| ndmO— | C$_n$H$_{2n+1}$—HC=CH—(CH$_2$)$_{m-1}$—O— |
| —Ondm | —O—(CH$_2$)$_{n-1}$—HC=CH—C$_m$H$_{2m+1}$ |

[Chem. 28]

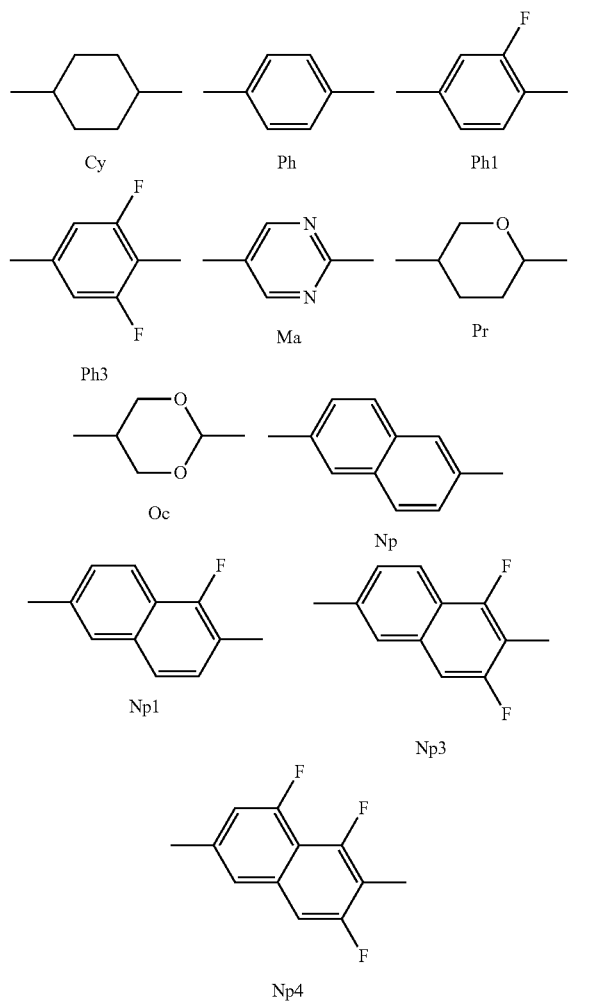

Example 1

A liquid crystal composition that was prepared and physical properties thereof are shown below.

TABLE 2

| | |
|---|---|
| 0d3-Cy—Cy-3 | 5% |
| 1d1-Cy—Cy-2 | 7% |
| 1d1-Cy—Cy-3 | 10% |

TABLE 2-continued

| | |
|---|---|
| 0d1-Cy—Cy-1d1 | 5% |
| 0d1-Cy—Cy—Ph-1 | 10% |
| 3-Cy—Cy—Ph-1 | 10% |
| 1-Ph—Ph1—Ph-3d0 | 5% |
| 3-Ph—Ph3—CFFO—Np3—F | 15% |
| 3-Ph—Ph3—O1—Ph3—F | 20% |
| 3-Cy—Cy—Ph3—OCFFF | 8% |
| 3-Cy—Ph—Ph3—OCFFF | 5% |
| Tni | 70.9 |
| T-n | −36 |
| Vth | 1.32 V |
| γ$_1$ | 90 mPa·s |
| ε⊥ | 3.5 |
| Δε | 10.4 |
| no | 1.491 |
| Δn | 0.114 |
| η 20 | 17.9 mPa·s |

Example 2

A liquid crystal composition that was prepared and physical properties thereof are shown below.

TABLE 3

| | |
|---|---|
| 0d3-Cy—Cy-3 | 5% |
| 1d1-Cy—Cy-2 | 7% |
| 1d1-Cy—Cy-3 | 10% |
| 0d1-Cy—Cy-1d1 | 5% |
| 0d1-Cy—Cy—Ph-1 | 10% |
| 3-Cy—Cy—Ph-1 | 10% |
| 1-Ph—Ph1—Ph-3d0 | 5% |
| 3-Ph3—O1—Ph—Np3—F | 15% |
| 3-Ph—Ph3—O1—Ph3—F | 20% |
| 3-Cy—Cy—Ph3—OCFFF | 8% |
| 3-Cy—Ph—Ph3—OCFFF | 5% |
| Tni | 70.8 |
| T-n | −38 |
| Vth | 1.36 V |
| γ$_1$ | 90 mPa·s |
| ε⊥ | 3.7 |
| Δε | 9.8 |
| no | 1.492 |
| Δn | 0.116 |
| η 20 | 17.7 mPa·s |

Comparative Example 1

A liquid crystal composition that was prepared and physical properties thereof are shown below.

TABLE 4

| | |
|---|---|
| 0d3-Cy—Cy-3 | 5% |
| 1d1-Cy—Cy-2 | 7% |
| 1d1-Cy—Cy-3 | 10% |
| 0d1-Cy—Cy-1d1 | 5% |
| 0d1-Cy—Cy—Ph-1 | 10% |
| 3-Cy—Cy—Ph-1 | 10% |
| 1-Ph—Ph1—Ph-3d0 | 5% |
| 3-Ph—Ph1—Np3—F | 15% |
| 3-Ph—Ph3—1O—Ph3—F | 20% |
| 3-Cy—Cy—Ph3—OCFFF | 8% |
| 3-Cy—Ph—Ph3—OCFFF | 5% |
| Tni | 70.5 |
| T-n | −30 |
| Vth | 1.40 V |
| γ$_1$ | 112 mPa·s |
| ε⊥ | 3.5 |
| Δε | 9.2 |
| no | 1.495 |
| Δn | 0.122 |
| η 20 | 23.6 mPa·s |

This liquid crystal composition is a liquid crystal composition that does not contain compounds represented by general formula (LC0-1) to general formula (LC0-3). The viscosity of each of the liquid crystal compositions of Examples 1 and 2 was significantly lower than that of this liquid crystal composition. The rotational viscosity $\gamma_1$ of each of the liquid crystal compositions of Examples 1 and 2 was also smaller than that of this liquid crystal composition. These results show that combinations of compounds of the present invention are excellent.

Example 3

A liquid crystal composition that was prepared and physical properties thereof are shown below.

TABLE 5

| | |
|---|---|
| 1d1-Cy—Cy-3 | 17% |
| 0d1-Cy—Cy-1d1 | 13% |
| 3-Cy—Cy-2 | 2% |
| 3-Cy—Cy—O1 | 2% |
| 3-Cy—Ph—O2 | 2% |
| 0d1-Cy—Ph—O4 | 2% |
| 5-Ph—Ph-1 | 2% |
| 3-Ph—Ph3—CFFO—Np3—F | 10% |
| 3-Ph—Ph3—O1—Ph3—F | 10% |
| 3-Pr—Ph3—O1—Ph—OCFFF | 7% |
| 1d1-Cy—Ph3—O1—Ph—OCFFF | 8% |
| 3-Cy—Cy—Ph3—O1—Ph3—F | 10% |
| 3-Ph—Ph—Ph3—O1—Ph3—F | 10% |
| 3-Ph—O1—Cy—Ph—Ph3—Ph1—F | 5% |
| Tni | 70.0 |
| T-n | −34 |
| Vth | 1.26 V |
| $\gamma_1$ | 83 mPa·s |
| $\epsilon\perp$ | 4.6 |
| $\Delta\epsilon$ | 11.8 |
| no | 1.489 |
| $\Delta n$ | 0.110 |
| $\eta$ 20 | 13.9 mPa·s |

Example 4

A liquid crystal composition that was prepared and physical properties thereof are shown below.

TABLE 6

| | |
|---|---|
| 1d1-Cy—Cy-3 | 17% |
| 0d1-Cy—Cy-1d1 | 13% |
| 3-Cy—Cy-2 | 2% |
| 3-Cy—Cy—O1 | 2% |
| 3-Cy—Ph—O2 | 2% |
| 0d1-Cy—Ph—O4 | 2% |
| 5-Ph—Ph-1 | 2% |
| 3-Ph—Ph3—CFFO—Np3—F | 5% |
| 3-Ph—Ph3—O1—Ph3—F | 5% |
| 3-Cy—Cy—Ph3—OCFFF | 7% |
| 3-Cy—Ph—Ph3—OCFFF | 8% |
| 3-Pr—Ph3—O1—Ph—OCFFF | 7% |
| 1d1-Cy—Ph3—O1—Ph—OCFFF | 8% |
| 3-Cy—Cy—Ph3—O1—Ph3—F | 10% |
| 3-Ph—Ph—Ph3—O1—Ph3—F | 10% |
| Tni | 71.4 |
| T-n | −35 |
| Vth | 1.42 V |
| $\gamma_1$ | 78 mPa·s |
| $\epsilon\perp$ | 3.5 |
| $\Delta\epsilon$ | 9.4 |
| no | 1.485 |
| $\Delta n$ | 0.100 |
| $\eta$ 20 | 12.9 mPa·s |

Example 5

A liquid crystal composition that was prepared and physical properties thereof are shown below.

TABLE 7

| | |
|---|---|
| 1d1-Cy—Cy-2 | 10% |
| 1d1-Cy—Cy-3 | 20% |
| 0d1-Cy—Cy-1d1 | 10% |
| 0d1-Cy—Cy-Ph-1 | 3% |
| 3-Cy—Cy—Ph-1 | 4% |
| 1-Ph—Ph1—Ph-3d0 | 3% |
| 3-Ph—Ph3—CFFO—Np3—F | 7% |
| 3-Ph—Ph3—O1—Ph3—F | 8% |
| 3-Cy—Cy—Ph3—OCFFF | 5% |
| 3-Cy—Ph—Ph3—OCFFF | 5% |
| 3-Pr—Ph3—O1—Ph—OCFFF | 5% |
| 3-Cy—Cy—Ph3—O1—Ph3—F | 10% |
| 3-Ph—Ph—Ph3—O1—Ph3—F | 10% |
| Tni | 88.0 |
| T-n | −34 |
| Vth | 1.41 V |
| $\gamma_1$ | 88 mPa·s |
| $\epsilon\perp$ | 3.6 |
| $\Delta\epsilon$ | 9.4 |
| no | 1.488 |
| $\Delta n$ | 0.109 |
| $\eta$ 20 | 15.6 mPa·s |

Example 6

A liquid crystal composition that was prepared and physical properties thereof are shown below.

TABLE 8

| | |
|---|---|
| 1d1-Cy—Cy-2 | 10% |
| 1d1-Cy—Cy-3 | 15% |
| 0d1-Cy—Cy-1d1 | 10% |
| 0d1-Cy—Cy—Ph-1 | 5% |
| 3-Cy—Cy—Ph-1 | 5% |
| 3-Ph—Ph3—CFFO—Np3—F | 10% |
| 3-Ph—Ph3—O1—Ph3—F | 5% |
| 3-Cy—Cy—Ph3—OCFFF | 5% |
| 1d1-Cy—Ph3—O1—Ph—OCFFF | 15% |
| 3-Cy—Cy—Ph3—O1—Ph3—F | 10% |
| 3-Ph—Ph—Ph3—O1—Ph3—F | 10% |
| Tni | 85.7 |
| T-n | −35 |
| Vth | 1.51 V |
| $\gamma_1$ | 75 mPa·s |
| $\epsilon\perp$ | 3.2 |
| $\Delta\epsilon$ | 8.4 |
| no | 1.487 |
| $\Delta n$ | 0.103 |
| $\eta$ 20 | 12.4 mPa·s |

Example 7

A liquid crystal composition that was prepared and physical properties thereof are shown below.

TABLE 9

| | |
|---|---|
| 1d1-Cy—Cy-2 | 10% |
| 1d1-Cy—Cy-3 | 15% |
| 0d1-Cy—Cy-1d1 | 10% |
| 3-Cy—Cy—Ph-1 | 8% |
| 1-Ph—Ph1—Ph-3d0 | 2% |
| 3-Ph—Ph3—OCFFO—Np3—F | 10% |
| 3-Cy—Cy—Ph3—OCFFF | 5% |
| 3-Cy—Ph—Ph3—OCFFF | 5% |
| 3-Pr—Ph3—O1—Ph—OCFFF | 15% |
| 3-Cy—Cy—Ph3—O1—Ph3—F | 10% |
| 3-Ph—O1—Cy—Ph—Ph3—Ph1—F | 10% |
| Tni | 78.5 |
| T-n | −33 |
| Vth | 1.33 V |
| $\gamma_1$ | 83 mPa·s |

TABLE 9-continued

| ε⊥ | 3.6 |
|---|---|
| Δε | 10.1 |
| no | 1.481 |
| Δn | 0.093 |
| η 20 | 14.0 mPa·s |

Example 8

A liquid crystal composition that was prepared and physical properties thereof are shown below.

TABLE 10

| 0d3-Cy—Cy-3 | 10% |
|---|---|
| 1d1-Cy—Cy-2 | 10% |
| 1d1-Cy—Cy-3 | 10% |
| 0d1-Cy—Cy-1d1 | 10% |
| 0d1-Cy—Cy—Ph-1 | 10% |
| 3-Cy—Cy—CFFO—Np3—F | 5% |
| 3-Ph—Ph3—CFFO—Np3—F | 5% |
| 3-Ph3—O1—Ph—Np3—F | 5% |
| 3-Ph1—Np3—F | 2% |
| 3-Ph—Ph1—Np3—F | 3% |
| 3-Cy—Ph3—O1—Ph3—F | 5% |
| 3-Cy—Cy—Ph3—O1—Ph3—OCFFF | 5% |
| 3-Pr—Ph3—O1—Ph3—F | 5% |
| 3-Cy—Pr—Ph3—O1—Ph3—F | 5% |
| 3-Cy—Cy—CFFO—Ph3—F | 5% |
| 3-Cy—Ph1—Ph3—CFFO—Ph3—F | 5% |
| Tni | 77.3 |
| T-n | −35 |
| Vth | 1.42 V |
| γ₁ | 70 mPa·s |
| ε⊥ | 3.5 |
| Δε | 9.5 |
| no | 1.481 |
| Δn | 0.093 |
| η 20 | 10.5 mPa·s |

Example 9

A liquid crystal composition that was prepared and physical properties thereof are shown below.

TABLE 11

| 0d3-Cy—Cy-3 | 10% |
|---|---|
| 1d1-Cy—Cy-2 | 10% |
| 1d1-Cy—Cy-3 | 10% |
| 0d1-Cy—Cy-1d1 | 10% |
| 0d1-Cy—Cy—Ph-1 | 10% |
| 2-Cy—Cy—Ph-1 | 2% |
| 3-Cy—Cy—Ph-1 | 3% |
| 3-Cy—Cy—CFFO—Np3—F | 5% |
| 3-Ph—Ph3—CFFO—Np3—F | 5% |
| 3-Ph3—O1—Ph—Np3—F | 5% |
| 3-Cy—Ph3—O1—Ph3—F | 5% |
| 3-Cy—Cy—Ph3—O1—Ph3—OCFFF | 5% |
| 3-Pr—Ph3—O1—Ph3—F | 5% |
| 3-Cy—Pr—Ph3—O1—Ph3—F | 5% |
| 3-Cy—Ph—Ph3—F | 5% |
| 3-Cy—Cy—Ph3—OCFFF | 5% |
| Tni | 80.8 |
| T-n | −34 |
| Vth | 1.43 V |
| γ₁ | 68 mPa·s |
| ε⊥ | 3.4 |
| Δε | 9.5 |
| no | 1.478 |
| Δn | 0.085 |
| η 20 | 9.7 mPa·s |

Example 10

A liquid crystal composition that was prepared and physical properties thereof are shown below.

TABLE 12

| 0d3-Cy—Cy-3 | 10% |
|---|---|
| 1d1-Cy—Cy-2 | 10% |
| 1d1-Cy—Cy-3 | 10% |
| 0d1-Cy—Cy-1d1 | 10% |
| 0d1-Cy—Cy—Ph-1 | 10% |
| 1-Ph—Ph1—Ph-3d0 | 2% |
| 2-Ph—Ph1—Ph-3d0 | 3% |
| 3-Cy—Cy—CFFO—Np3—F | 5% |
| 3-Ph3—O1—Ph—Np3—F | 5% |
| 3-Cy—Cy—Ph3—O1—Ph3—OCFFF | 7% |
| 3-Cy—Pr—Ph3—O1—Ph3—F | 8% |
| 3-Cy—Cy—CFFO—Ph3—F | 10% |
| 3-Cy—Cy—Ph3—OCFFF | 10% |
| Tni | 99.0 |
| T-n | −33 |
| Vth | 2.11 V |
| γ₁ | 66 mPa·s |
| ε⊥ | 2.9 |
| Δε | 6.1 |
| no | 1.478 |
| Δn | 0.086 |
| η 20 | 9.8 mPa·s |

Example 11

A liquid crystal composition that was prepared and physical properties thereof are shown below.

TABLE 13

| 0d3-Cy—Cy-3 | 10% |
|---|---|
| 1d1-Cy—Cy-2 | 10% |
| 1d1-Cy—Cy-3 | 10% |
| 0d1-Cy—Cy-1d1 | 10% |
| 0d1-Cy—Cy—Ph-1 | 10% |
| 3-Cy—Cy—CFFO—Np3—F | 5% |
| 3-Ph3—O1—Ph—Np3—F | 5% |
| 3-Cy—Ph3—O1—Ph3—F | 5% |
| 3-Cy—Cy—Ph3—O1—Ph3—OCFFF | 7% |
| 3-Pr—Ph3—O1—Ph3—F | 5% |
| 3-Cy—Pr—Ph3—O1—Ph3—F | 8% |
| 3-Cy—Cy—CFFO—Ph3—F | 5% |
| 3-Cy—Ph1—Ph3—CFFO—Ph3—F | 5% |
| 3-Cy—Cy—Ph3—OCFFF | 5% |
| Tni | 84.1 |
| T-n | −34 |
| Vth | 1.58 V |
| γ₁ | 70 mPa·s |
| ε⊥ | 3.4 |
| Δε | 8.1 |
| no | 1.478 |
| Δn | 0.079 |
| η 20 | 10.0 mPa·s |

Example 12

A liquid crystal composition that was prepared and physical properties thereof are shown below.

TABLE 14

| 0d3-Cy—Cy-3 | 10% |
|---|---|
| 1d1-Cy—Cy-2 | 10% |
| 1d1-Cy—Cy-3 | 10% |
| 0d1-Cy—Cy-1d1 | 10% |
| 0d1-Cy—Cy—Ph-1 | 10% |
| 2-Cy—Cy—Ph-1 | 5% |

TABLE 14-continued

| | |
|---|---|
| 3-Ph3—O1—Ph—Np3—F | 5% |
| 3-Cy—Ph3—O1—Ph3—F | 5% |
| 3-Pr—Ph3—O1—Ph3—F | 5% |
| 3-Cy—Pr—Ph3—O1—Ph3—F | 15% |
| 3-Cy—Cy—CFFO—Ph3—F | 5% |
| 3-Cy—Cy—Ph3—OCFFF | 10% |
| Tni | 80.2 |
| T-n | −35 |
| Vth | 1.87 V |
| γ₁ | 66 mPa·s |
| ε⊥ | 3.1 |
| Δε | 7.0 |
| no | 1.476 |
| Δn | 0.071 |
| η 20 | 9.7 mPa·s |

Example 13

A liquid crystal composition that was prepared and physical properties thereof are shown below.

TABLE 15

| | |
|---|---|
| 0d3-Cy—Cy-3 | 10% |
| 1d1-Cy—Cy-2 | 10% |
| 1d1-Cy—Cy-3 | 10% |
| 0d1-Cy—Cy-1d1 | 10% |
| 0d1-Cy—Cy—Ph-1 | 10% |
| 2-Cy—Cy—Ph-1 | 5% |
| 3-Cy—Cy—Ph-1 | 5% |
| 1-Ph—Ph1—Ph-3d0 | 5% |
| 3-Cy—Cy—CFFO—Np3—F | 2% |
| 3-Ph—Ph3—CFFO—Np3—F | 3% |
| 3-Ph3—Np3—F | 2% |
| 3-Ph—Ph3—Np3—F | 3% |
| 3-Pr—Ph3—O1—Ph3—F | 5% |
| 3-Cy—Pr—Ph3—O1—Ph3—F | 5% |
| 3-Cy—Cy—CFFO—Ph3—F | 5% |
| 3-Cy—Ph1—Ph3—CFFO—Ph3—F | 5% |
| 3-Cy—Ph—Ph3—F | 2% |
| 3-Cy—Cy—Ph3—OCFFF | 3% |
| Tni | 86.6 |
| T-n | −34 |
| Vth | 2.01 V |
| γ₁ | 65 mPa·s |
| ε⊥ | 3.2 |
| Δε | 6.7 |
| no | 1.481 |
| Δn | 0.095 |
| η 20 | 7.4 mPa·s |

Example 14

A liquid crystal composition that was prepared and physical properties thereof are shown below.

TABLE 16

| | |
|---|---|
| 0d3-Cy—Cy-3 | 15% |
| 1d1-Cy—Cy-2 | 15% |
| 3-Cy—Cy—CFFO—Np3—F | 5% |
| 3-Ph—Ph3—CFFO—Np3—F | 5% |
| 3-Cy—Ph3—O1—Ph3—F | 10% |
| 3-Cy—Cy—Ph3—O1—Ph3—OCFFF | 13% |
| 3-Pr—Ph3—O1—Ph3—F | 10% |
| 3-Cy—Pr—Ph3—O1—Ph3—F | 12% |
| 3-Cy—Ph1—Ph3—CFFO—Ph3—F | 15% |
| Tni | 71.9 |
| T-n | −35 |
| Vth | 1.21 V |
| γ₁ | 72 mPa·s |
| ε⊥ | 5.1 |
| Δε | 12.8 |

TABLE 16-continued

| | |
|---|---|
| no | 1.478 |
| Δn | 0.085 |
| η 20 | 11.1 mPa·s |

Example 15

A liquid crystal composition that was prepared and physical properties thereof are shown below.

TABLE 17

| | |
|---|---|
| 0d3-Cy—Cy-3 | 10% |
| 1d1-Cy—Cy-2 | 10% |
| 1d1-Cy—Cy-3 | 10% |
| 0d1-Cy—Cy-1d1 | 10% |
| 3-Cy—Cy—CFFO—Np3—F | 7% |
| 3-Cy—Ph3—O1—Ph3—F | 9% |
| 3-Cy—Cy—Ph3—O1—Ph3—OCFFF | 10% |
| 3-Pr—Ph3—O1—Ph3—F | 9% |
| 3-Cy—Pr—Ph3—O1—Ph3—F | 5% |
| 3-Cy—Cy—CFFO—Ph3—F | 10% |
| 3-Cy—Cy—Ph3—OCFFF | 10% |
| Tni | 73.2 |
| T-n | −33 |
| Vth | 1.87 V |
| γ₁ | 79 mPa·s |
| ε⊥ | 3.3 |
| Δε | 7.7 |
| no | 1.472 |
| Δn | 0.065 |
| η20 | 12.8 mPa·s |

Example 16

A liquid crystal composition that was prepared and physical properties thereof are shown below.

TABLE 18

| | |
|---|---|
| 0d3-Cy—Cy-3 | 10% |
| 1d1-Cy—Cy-2 | 10% |
| 1d1-Cy—Cy-3 | 10% |
| 0d1-Cy—Cy-1d1 | 10% |
| 3-Cy—Cy—CFFO—Np3—F | 7% |
| 3-Ph—Ph3—CFFO—Np3—F | 8% |
| 3-Ph3—O1—Ph—Np3—F | 5% |
| 3-Ph—Ph3—O1—Ph3—F | 5% |
| 3-Cy—Ph1—Ph3—O1—Ph3—F | 5% |
| 3-Ph—Ph1—Ph3—O1—Ph3—OCFFF | 5% |
| 3-Pr—Ph1—Ph3—O1—Ph3—F | 5% |
| 3-Cy—Ph1—CFFO—Ph3—F | 5% |
| 3-Cy—Ph—Ph3—F | 5% |
| 3-Ph—Ph1—Ph3—OCFFF | 5% |
| 0d3-Ph—Ph—Ph3—F | 5% |
| Tni | 72.0 |
| T-n | −34 |
| Vth | 1.22 V |
| γ₁ | 68 mPa·s |
| ε⊥ | 4.8 |
| Δε | 12.6 |
| no | 1.486 |
| Δn | 0.117 |
| η 20 | 10.2 mPa·s |

Example 17

A liquid crystal composition that was prepared and physical properties thereof are shown below.

TABLE 19

| | |
|---|---|
| 0d3-Cy—Cy-3 | 10% |
| 1d1-Cy—Cy-2 | 10% |
| 1d1-Cy—Cy-3 | 15% |
| 0d1-Cy—Cy-1d1 | 10% |
| 3-Ph—Ph3—CFFO—Np3—F | 5% |
| 3-Ph3—O1—Ph—Np3—F | 7% |
| 3-Ph—Ph1—Np3—F | 8% |
| 3-Cy-Ph1—Ph3—O1—Ph3—F | 5% |
| 3-Ph—Ph1—Ph3—O1—Ph3—OCFFF | 5% |
| 3-Pr—Ph1—Ph3—O1—Ph3—F | 5% |
| 3-Cy—Ph1—CFFO—Ph3—F | 5% |
| 3-Cy—Ph—Ph3—F | 5% |
| 3-Ph—Ph1—Ph3—OCFFF | 5% |
| 0d3-Ph—Ph—Ph3—F | 5% |
| Tni | 73.9 |
| T-n | −33 |
| Vth | 1.25 V |
| γ1 | 71 mPa·s |
| ε⊥ | 4.8 |
| Δε | 11.9 |
| no | 1.489 |
| Δn | 0.127 |
| η 20 | 10.7 mPa·s |

Example 18

A liquid crystal composition that was prepared and physical properties thereof are shown below.

TABLE 20

| | |
|---|---|
| 0d3-Cy—Cy-3 | 10% |
| 1d1-Cy—Cy-2 | 10% |
| 1d1-Cy—Cy-3 | 5% |
| 0d1-Cy—Cy—Ph-1 | 5% |
| 2-Cy—Cy—Ph-1 | 5% |
| 3-Cy—Cy—Ph-1 | 5% |
| 1-Ph—Ph1—Ph-3d0 | 5% |
| 2-Ph—Ph1—Ph-3d0 | 5% |
| 3-Ph—Ph3—CFFO—Np3—F | 5% |
| 3-Ph3—O1—Ph—Np3—F | 5% |
| 3-Ph—Ph3—O1—Ph3—F | 5% |
| 3-Cy—Ph1—Ph3—O1—Ph3—F | 5% |
| 3-Ph—Ph1—Ph3—O1—Ph3—OCFFF | 5% |
| 3-Pr—Ph1—Ph3—O1—Ph3—F | 5% |
| 3-Cy—Ph1—CFFO—Ph3—F | 5% |
| 3-Cy—Ph—Ph3—F | 5% |
| 3-Ph—Ph1—Ph3—OCFFF | 5% |
| 0d3-Ph—Ph—Ph3—F | 5% |
| Tni | 85.2 |
| T-n | −32 |
| Vth | 1.33 V |
| γ1 | 66 mPa·s |
| ε⊥ | 4.6 |
| Δε | 10.8 |
| no | 1.490 |
| Δn | 0.139 |
| η 20 | 9.5 mPa·s |

Example 19

A liquid crystal composition that was prepared and physical properties thereof are shown below.

TABLE 21

| | |
|---|---|
| 0d3-Cy—Cy-3 | 10% |
| 1d1-Cy—Cy-2 | 10% |
| 1d1-Cy—Cy-3 | 10% |
| 1-Ph—Ph1—Ph-3d0 | 7% |
| 2-Ph—Ph1—Ph-3d0 | 8% |
| 3-Ph—Ph3—CFFO—Np3—F | 5% |
| 3-Ph3—O1—Ph—Np3—F | 5% |

TABLE 21-continued

| | |
|---|---|
| 3-Ph—Ph1—Np3—F | 5% |
| 3-Cy—Ph1—Ph3—O1—Ph3—F | 5% |
| 3-Ph—Ph1—Ph3—O1—Ph3—OCFFF | 10% |
| 3-Cy—Ph1—CFFO—Ph3—F | 10% |
| 3-Ph—Ph1—Ph3—OCFFF | 7% |
| 0d3-Ph—Ph—Ph3—F | 8% |
| Tni | 86.5 |
| T-n | −33 |
| Vth | 1.26 V |
| γ1 | 72 mPa·s |
| ε⊥ | 5.1 |
| Δε | 12.0 |
| no | 1.501 |
| Δn | 0.165 |
| η20 | 11.0 mPa·s |

Example 20

A liquid crystal composition that was prepared and physical properties thereof are shown below.

TABLE 22

| | |
|---|---|
| 0d3-Cy—Cy-3 | 10% |
| 1d1-Cy—Cy-2 | 10% |
| 1d1-Cy—Cy-3 | 10% |
| 0d1-Cy—Cy-1d1 | 5% |
| 1-Ph—Ph1—Ph-3d0 | 5% |
| 2-Ph—Ph1—Ph-3d0 | 5% |
| 3-Ph—Ph3—CFFO—Np3—F | 5% |
| 3-Ph3—O1—Ph—Np3—F | 5% |
| 3-Ph—Ph1—Np3—F | 5% |
| 3-Cy—Ph1—Ph3—O1—Ph3—F | 5% |
| 3-Ph—Ph1—Ph3—O1—Ph3—OCFFF | 5% |
| 3-Pr—Ph1—Ph3—O1—Ph3—F | 5% |
| 3-Cy—Ph1—CFFO—Ph3—F | 10% |
| 3-Cy—Ph—Ph3—F | 5% |
| 3-Ph—Ph1—Ph3—OCFFF | 5% |
| Tni | 75.6 |
| T-n | −34 |
| Vth | 1.21 V |
| γ1 | 75 mPa·s |
| ε⊥ | 5.2 |
| Δε | 12.5 |
| no | 1.491 |
| Δn | 0.138 |
| η 20 | 12.1 mPa·s |

Example 21

A liquid crystal composition that was prepared and physical properties thereof are shown below.

TABLE 23

| | |
|---|---|
| 0d3-Cy—Cy-3 | 10% |
| 1d1-Cy—Cy-2 | 15% |
| 1d1-Cy—Cy-3 | 15% |
| 0d1-Cy—Cy-1d1 | 10% |
| 0d1-Cy—Cy—Ph-1 | 5% |
| 3-Cy—Cy—Ph-1 | 5% |
| 3-Cy—Cy—CFFO—Np3—F | 5% |
| 3-Ph—Ph3—CFFO—Np3—F | 5% |
| 3-Ph—Ph3—O1—Ph3—F | 10% |
| 3-Cy—Ph1—Ph3—O1—Ph3—F | 5% |
| 3-Ph—Ph1—Ph3—O1—Ph3—OCFFF | 5% |
| 3-Pr—Ph1—Ph3—O1—Ph3—F | 5% |
| 3-Cy—Ph1—CFFO—Ph3—F | 5% |
| Tni | 75.4 |
| T-n | −34 |
| Vth | 1.52 V |
| γ1 | 75 mPa·s |

TABLE 23-continued

| | |
|---|---|
| $\epsilon\perp$ | 3.5 |
| $\Delta\epsilon$ | 8.8 |
| no | 1.476 |
| $\Delta n$ | 0.093 |
| $\eta\ 20$ | 11.5 mPa·s |

As shown above, the liquid crystal compositions of Examples 3 to 21 have low viscosities and small $\gamma_1$. These results show that combinations of compounds of the present invention are excellent.

The invention claimed is:

1. A liquid crystal composition having a positive dielectric anisotropy, the liquid crystal composition comprising compounds belonging to two or more groups selected from groups of compounds represented by general formula (LC0-1) to general formula (LC0-3); and one or more compounds selected from groups of compounds represented by general formula (LC1) to general formula (LC5):

(LC0-1)

(LC0-2)

(LC0-3)

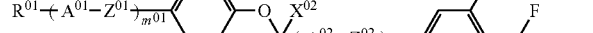
(LC1)

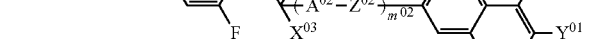
(LC2)

(LC3)

(LC4)

(LC5)

(In the formulae, $R^{01}$ to $R^{41}$ each independently represent an alkyl group having 1 to 15 carbon atoms where one or more —$CH_2$— in the alkyl group may each be substituted with —O—, —CH=CH—, —CO—, —OCO—, —COO—, —C≡C—, —$CF_2$O—, or —O$CF_2$— as long as oxygen atoms are not directly adjacent to each other, and one or more hydrogen atoms in the alkyl group may each be optionally substituted with a halogen; $R^{51}$ and $R^{52}$ each independently represent an alkyl group having 1 to 15 carbon atoms where one or more —$CH_2$— in the alkyl group may each be substituted with —O—, —CH=CH—, —CO—, —OCO—, —COO—, or —C≡C— as long as oxygen atoms are not directly adjacent to each other; $A^{01}$ to $A^{42}$ each independently represent any of the structures below:

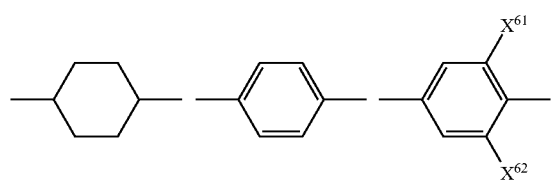

(where one or more —$CH_2$— in a cyclohexane ring in the structure may each be substituted with —O— as long as oxygen atoms are not directly adjacent to each other, one or more —CH= in a benzene ring in the structure may each be substituted with —N= as long as nitrogen atoms are not directly adjacent to each other, and $X^{61}$ and $X^{62}$ each independently represent —H, —Cl, —F, —$CF_3$, or —O$CF_3$); $A^{51}$ to $A^{53}$ each independently represent any of the structures below:

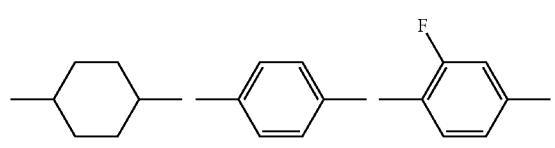

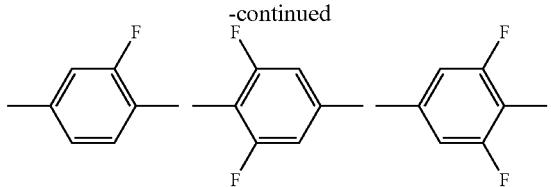

(In the formulae, one or more —CH$_2$CH$_2$— in a cyclohexane ring may each be substituted with —CH=CH—, —CF$_2$O—, or —OCF$_2$—, and one or more —CH= in a benzene ring may each be substituted with —N= as long as nitrogen atoms are not directly adjacent to each other); $X^{01}$ to $X^{03}$ each represent a hydrogen atom or a fluorine atom; $X^{11}$ to $X^{43}$ each independently represent —H, —Cl, —F, —CF$_3$, or —OCF$_3$; $Y^{01}$ to $Y^{41}$ each represent —Cl, —F, —CF$_3$, or —OCF$_3$; $Z^{01}$ and $Z^{02}$ each independently represent a single bond, —CH=CH—, —CC—, —CH$_2$CH$_2$—, —(CH$_2$)$_4$—, —OCH$_2$—, —CH$_2$O—, —OCF$_2$—, or —CF$_2$O—; $Z^{31}$ to $Z^{42}$ each independently represent a single bond, —CH=CH—, —CC—, —CH$_2$CH$_2$—, or —(CH$_2$)$_4$—, but $Z^{31}$ and $Z^{32}$ may each be independently —OCF$_2$— or —CF$_2$O—; when m$^{42}$ is 0, $Z^{41}$ and $Z^{42}$ may each be independently —OCH$_2$—, —OCF$_2$—, or —CF$_2$O—; and at least one of $Z^{31}$ and $Z^{32}$ that are present is not a single bond; $Z^{51}$ and $Z^{52}$ each independently represent a single bond, —CH=CH—, —C≡C—, —CH$_2$CH$_2$—, —(CH$_2$)$_4$—, —OCH$_2$—, —CH$_2$O—, —OCF$_2$—, or —CF$_2$O—; m$^{01}$ to m$^{51}$ each independently represent an integer of 0 to 3; m$^{31}$+m$^{32}$ and m$^{41}$+m$^{42}$ each independently represent 1, 2, 3, or 4; and when a plurality of $A^{01}$, $A^{02}$, $A^{03}$, $A^{23}$, $A^{31}$, $A^{32}$, $A^{41}$, $A^{42}$, $A^{52}$, $Z^{01}$, $Z^{02}$, $Z^{31}$, $Z^{32}$, $Z^{41}$, $Z^{42}$, and/or $Z^{52}$ are present, they may be the same of different).

2. The liquid crystal composition according to claim 1, comprising compounds belonging to two or more groups selected from groups of compounds represented by general formula (LC0-1) to general formula (LC0-3); one or more compounds selected from groups of compounds represented by general formula (LC1) to general formula (LC4); and one or more compounds selected from a group of compounds represented by general formula (LC5).

3. The liquid crystal composition according to claim 1, wherein the compounds represented by general formula (LC0-1) are selected from groups of compounds represented by general formula (LC0-1-1) to general formula (LC0-1-8), the compounds represented by general formula (LC0-2) are selected from groups of compounds represented by general formula (LC0-2-1) to general formula (LC0-2-4), and the compounds represented by general formula (LC0-3) are selected from groups of compounds represented by general formula (LC0-3-1) to general formula (LC0-3-99):

(LC0-1-1)

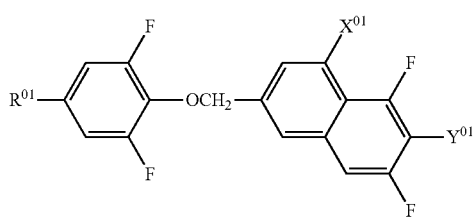

(LC0-1-2)

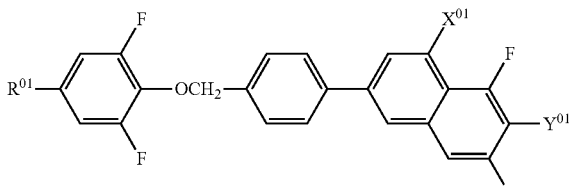

(LC0-1-3)

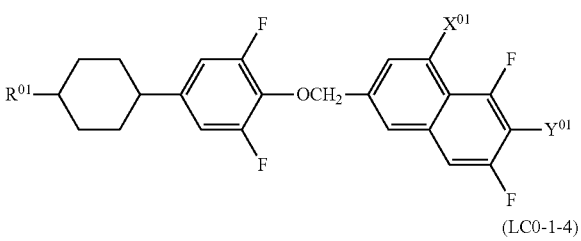

(LC0-1-4)

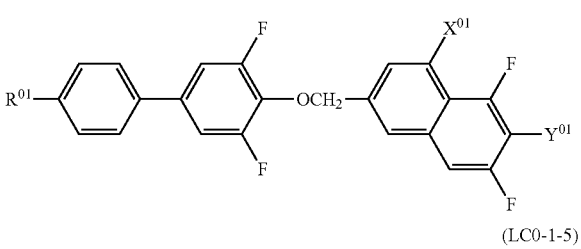

(LC0-1-5)

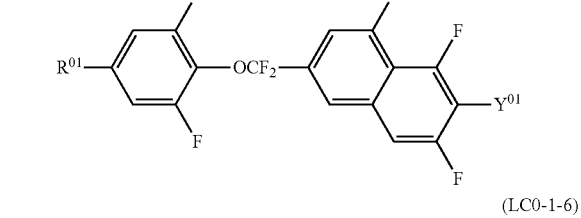

(LC0-1-6)

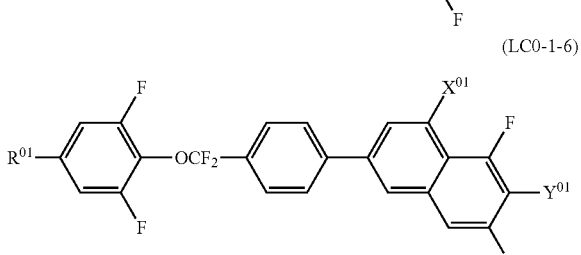

(LC0-1-7)

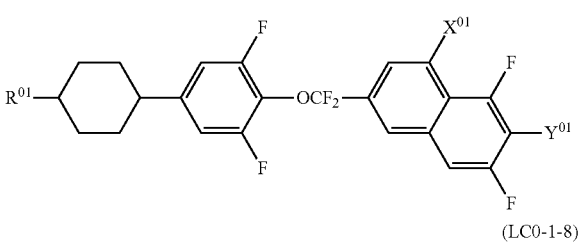

(LC0-1-8)

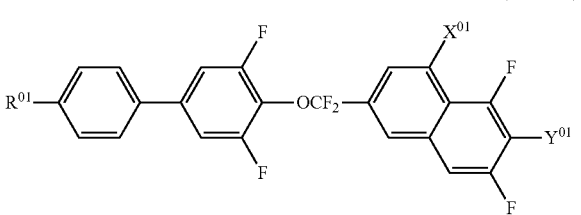

-continued
(LC0-2-1)
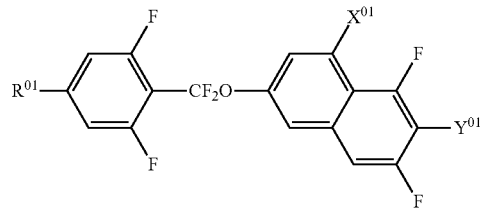
(LC0-2-2)
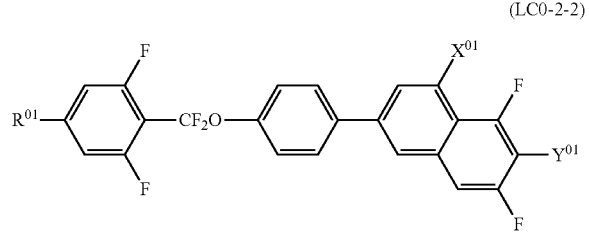
(LC0-2-3)
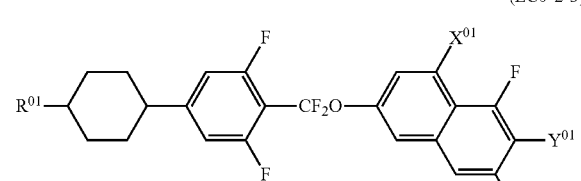
(LC0-2-4)
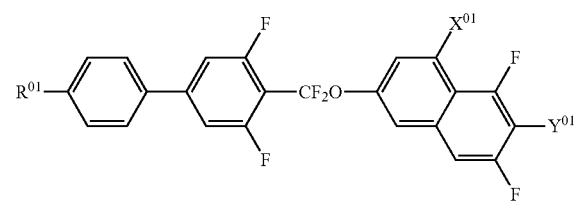
LC0-3-1
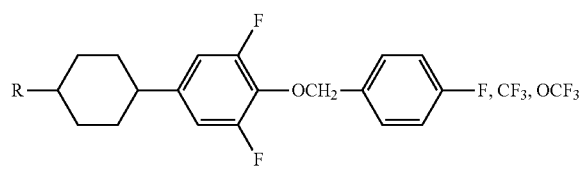
LC0-3-2
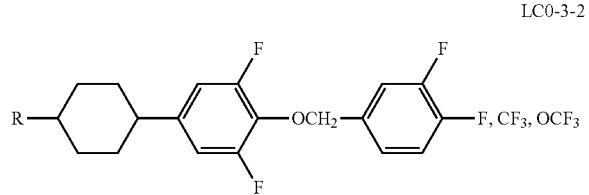
LC0-3-3
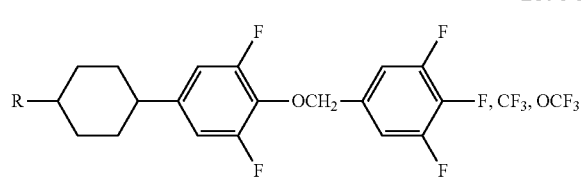
-continued
LC0-3-4
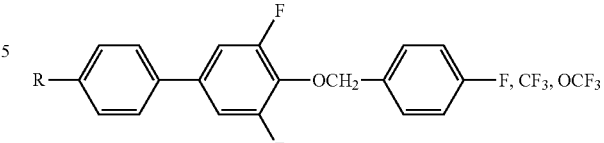
LC0-3-5
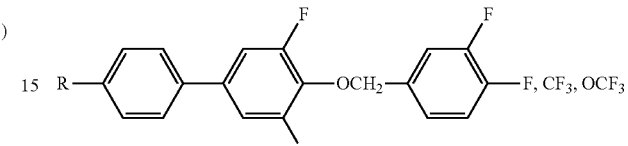
LC0-3-6
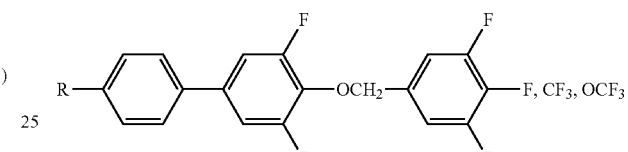
LC0-3-7
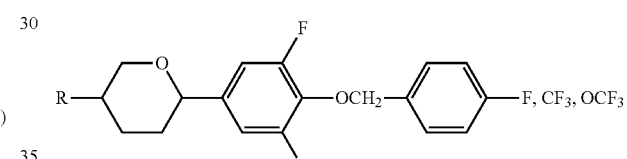
LC0-3-8
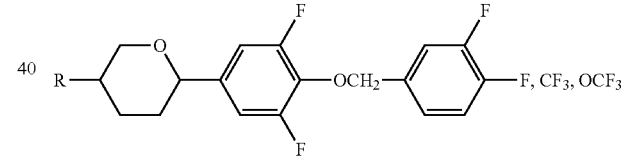
LC0-3-9
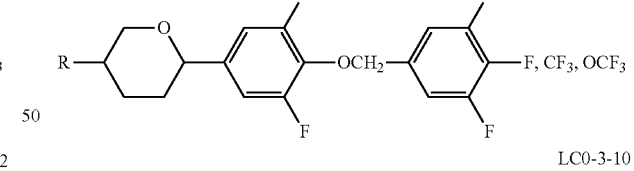
LC0-3-10
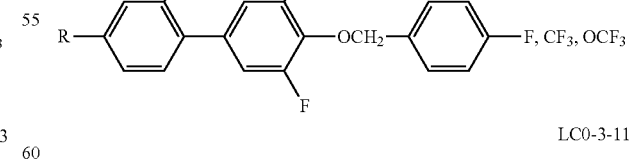
LC0-3-11
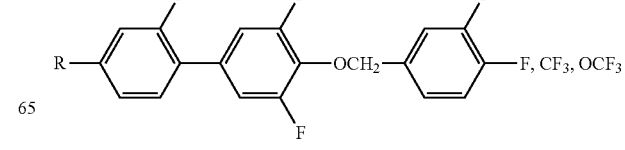

LC0-3-12
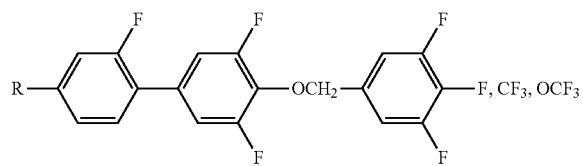
LC0-3-13
LC0-3-14
LC0-3-15
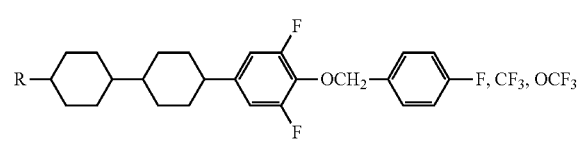
LC0-3-16
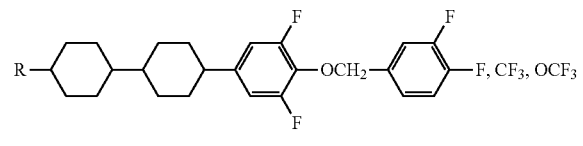
LC0-3-17
LC0-3-18
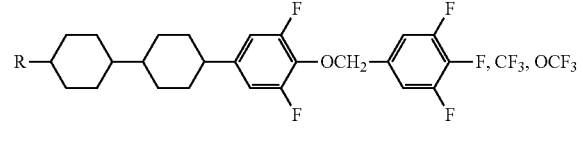
LC0-3-19
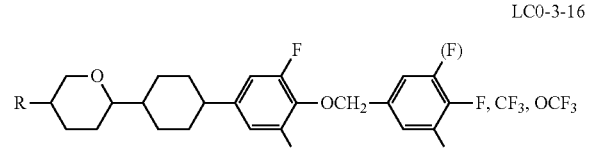
LC0-3-20
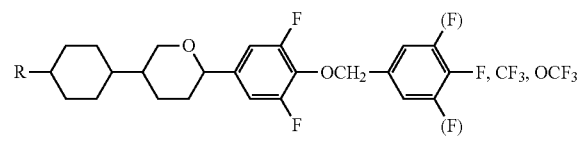
LC0-3-21
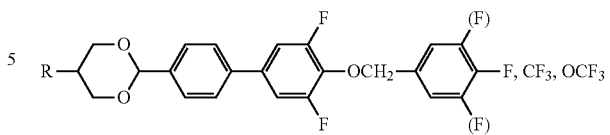
LC0-3-22
LC0-3-23
LC0-3-24
LC0-3-25
LC0-3-26
LC0-3-27
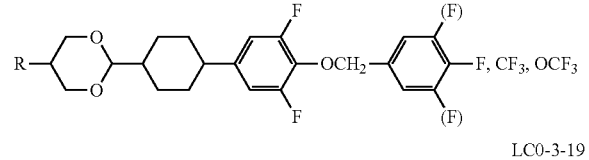
LC0-3-28
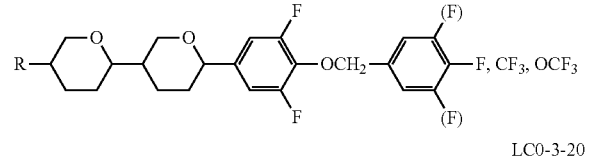
LC0-3-29
LC0-3-30
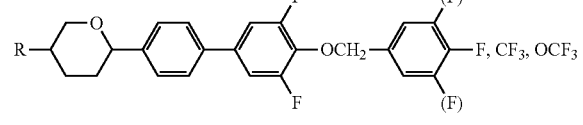

LC0-3-31
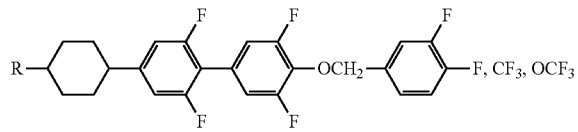
LC0-3-32
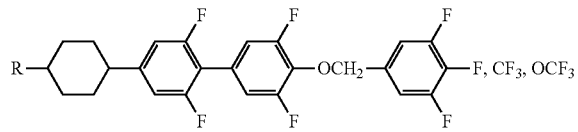
LC0-3-33
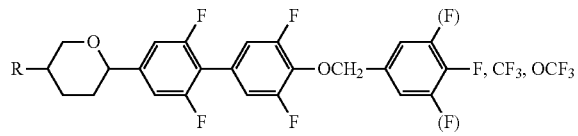
LC0-3-34
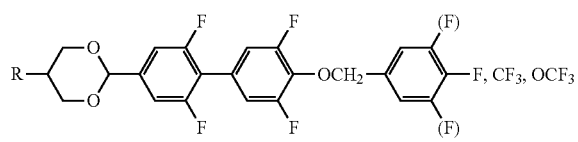
LC0-3-35
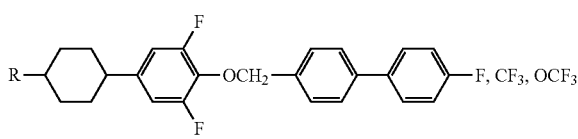
LC0-3-36
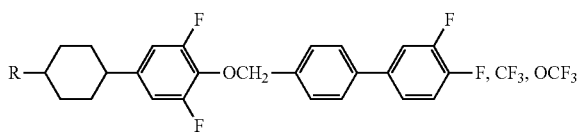
LC0-3-37
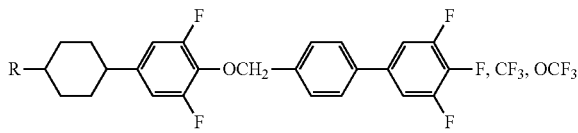
LC0-3-38
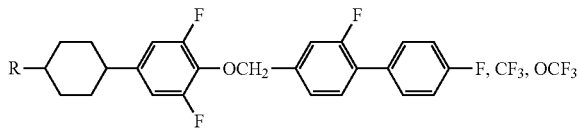
LC0-3-39
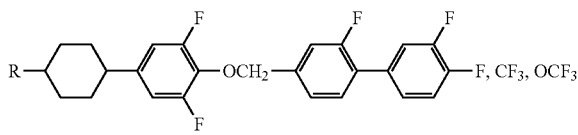
LC0-3-40
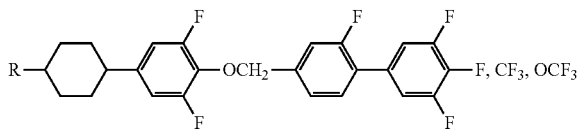
LC0-3-41
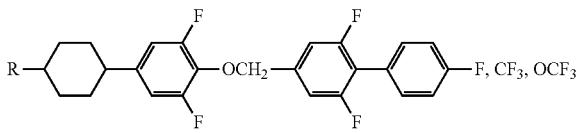
LC0-3-42
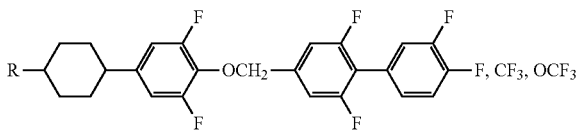
LC0-3-43
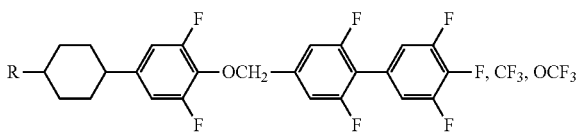
LC0-3-44
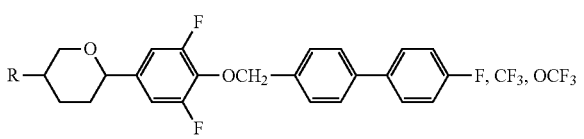
LC0-3-45
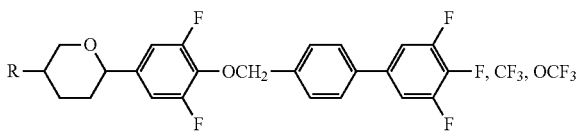
LC0-3-46
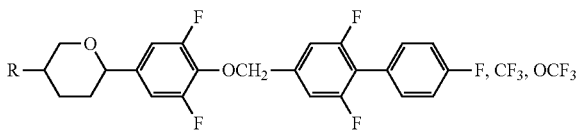
LC0-3-47
LC0-3-48
LC0-3-49
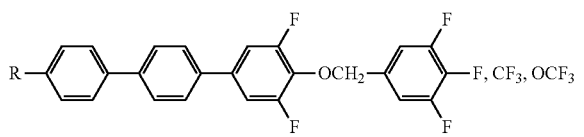
LC0-3-50

LC0-3-51
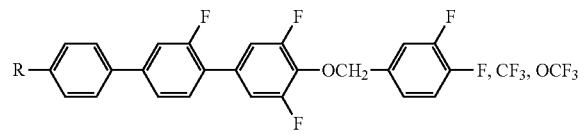
LC0-3-52
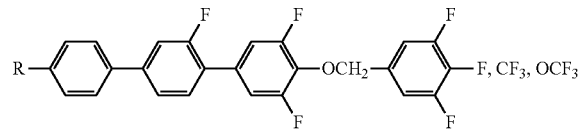
LC0-3-53
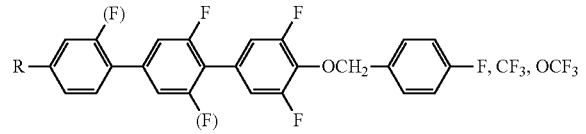
LC0-3-54
LC0-3-55
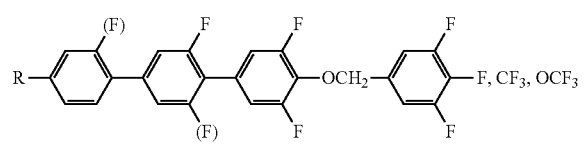
LC0-3-56
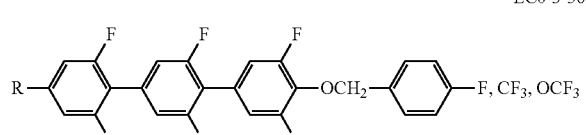
LC0-3-57
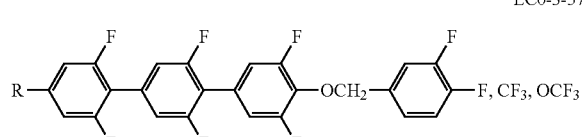
LC0-3-58
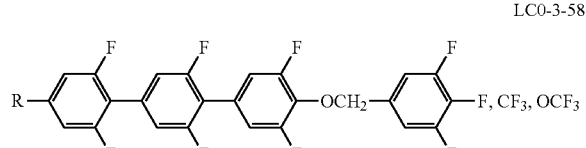
LC0-3-59
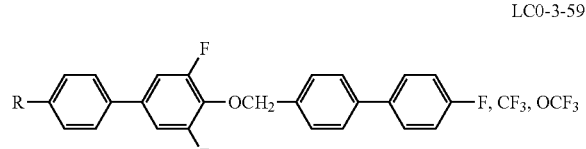
LC0-3-60
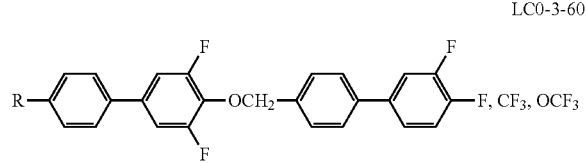
LC0-3-61
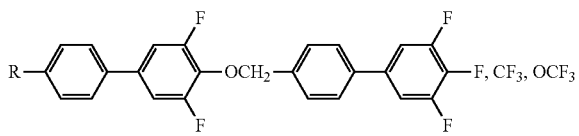
LC0-3-62
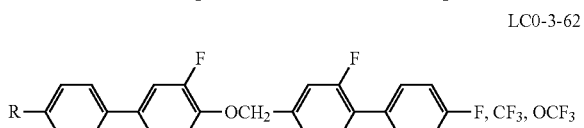
LC0-3-63
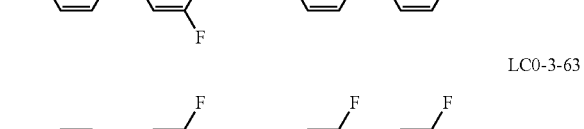
LC0-3-64
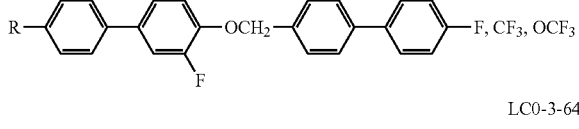
LC0-3-65
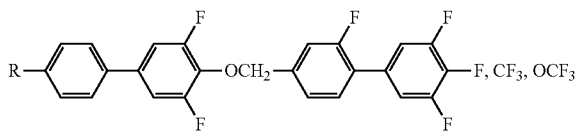
LC0-3-66
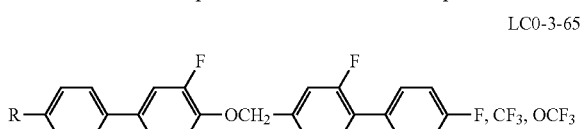
LC0-3-67
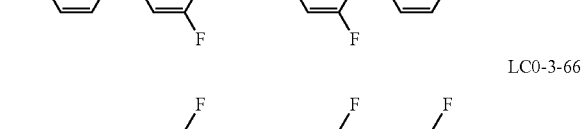
LC0-3-68
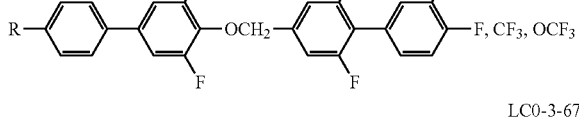
LC0-3-69
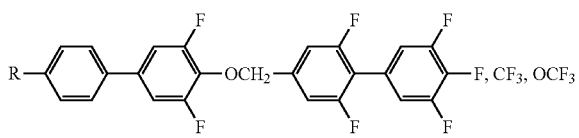
LC0-3-70
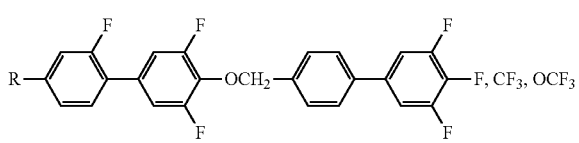

LC0-3-71
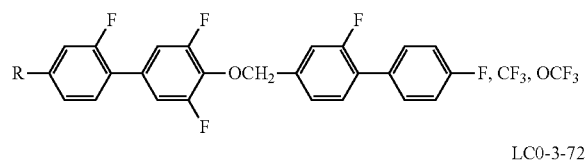
LC0-3-72
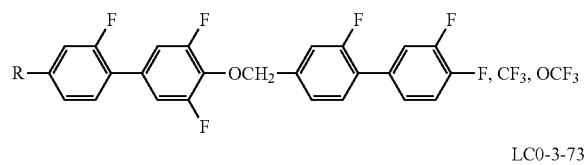
LC0-3-73
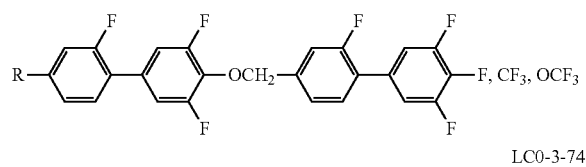
LC0-3-74
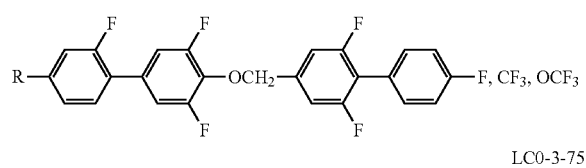
LC0-3-75
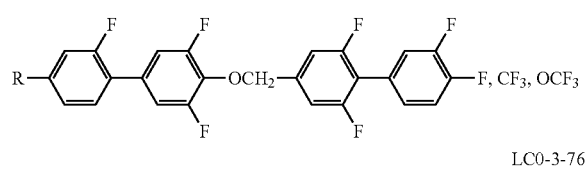
LC0-3-76
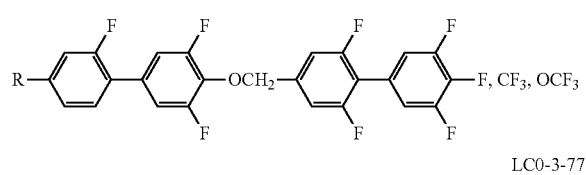
LC0-3-77
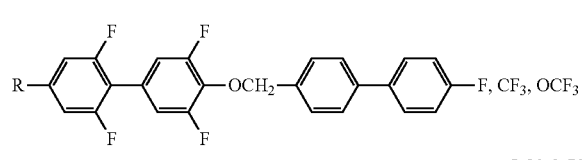
LC0-3-78
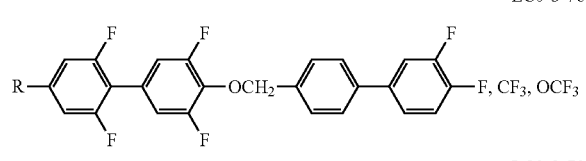
LC0-3-79
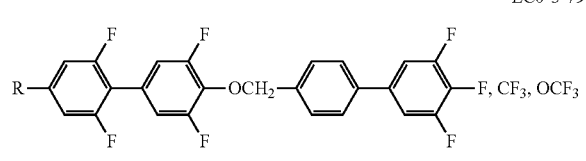
LC0-3-80
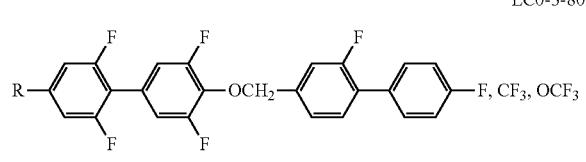
LC0-3-81
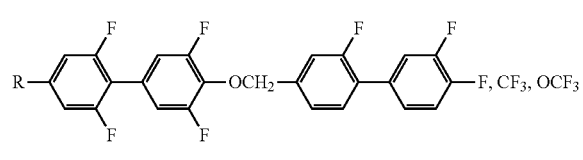
LC0-3-82
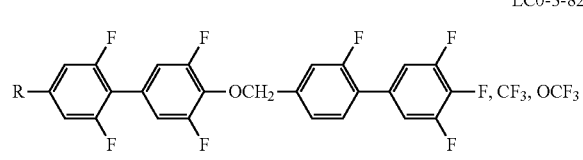
LC0-3-83
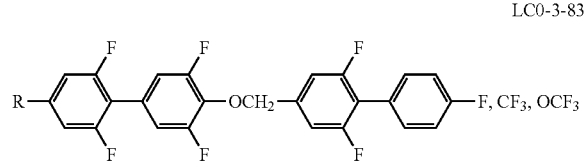
LC0-3-84
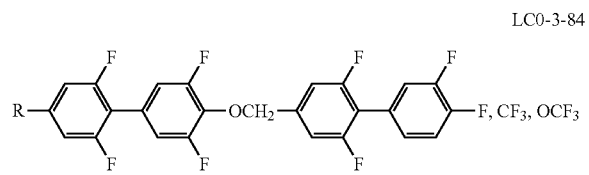
LC0-3-85
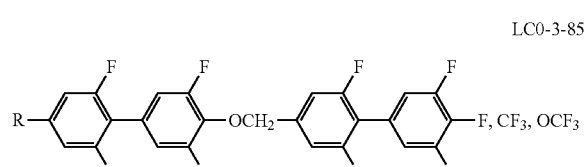
LC0-3-86
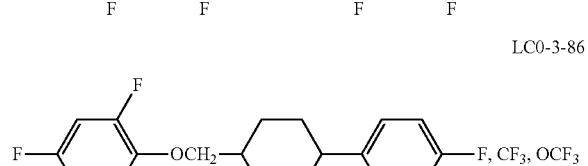
LC0-3-87
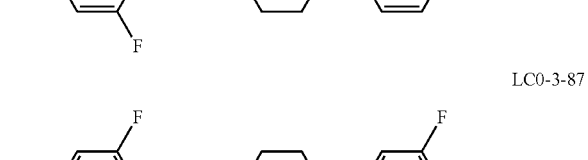
LC0-3-88
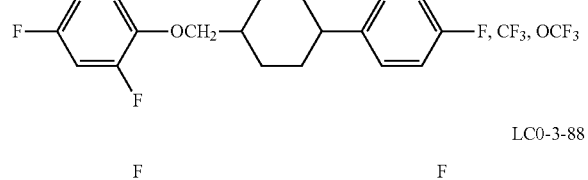
LC0-3-89
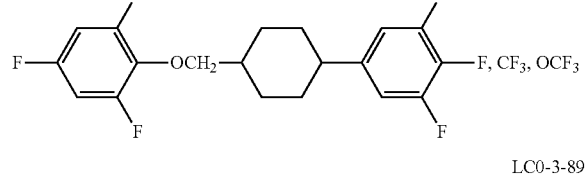
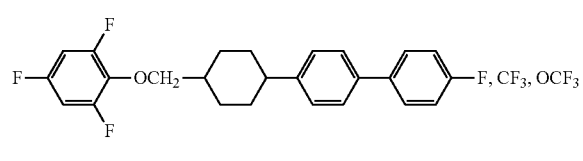

-continued

LC0-3-90
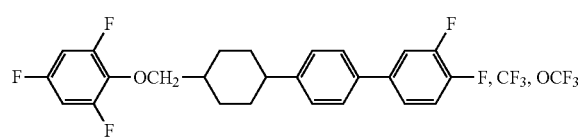

LC0-3-91
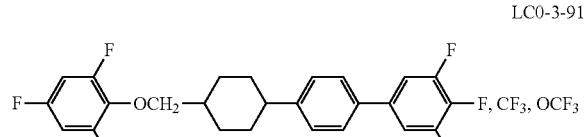

LC0-3-92
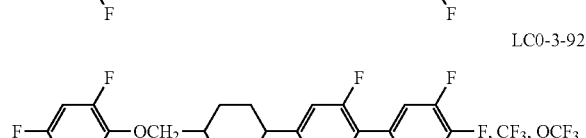

LC0-3-93
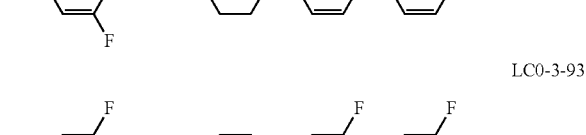

LC0-3-94
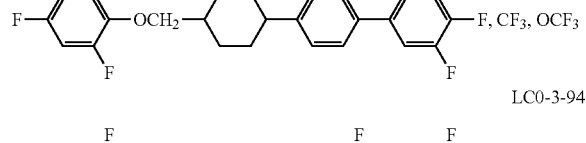

LC0-3-95
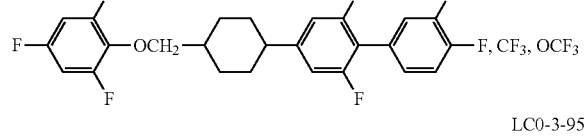

LC0-3-96
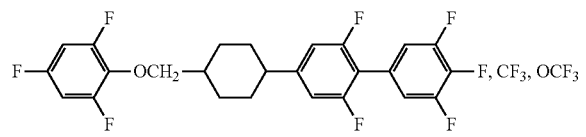

LC0-3-97
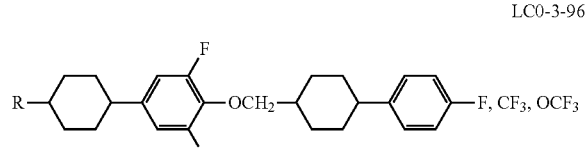

LC0-3-98
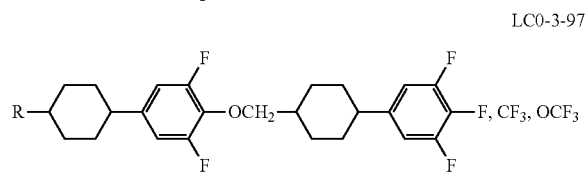

LC0-3-99

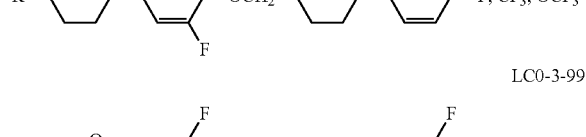

(In the formulae, $R^{01}$, $X^{01}$, and $Y^{01}$ represent the same as those in claim 1, R represents $R^{01}$, "F, $CF_3$, $OCF_3$" represents any of F, $CF_3$, and $OCF_3$, and (F) represents either H or F).

4. The liquid crystal composition according to claim 1, wherein the compounds represented by general formula (LC2) are compounds selected from groups of compounds represented by general formula (LC2-1) to general formula (LC2-14):

(LC2-1)
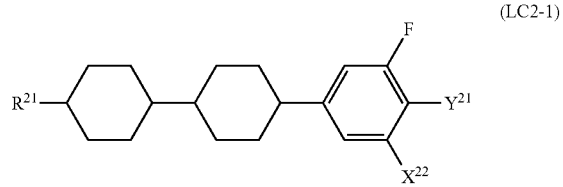

(LC2-2)
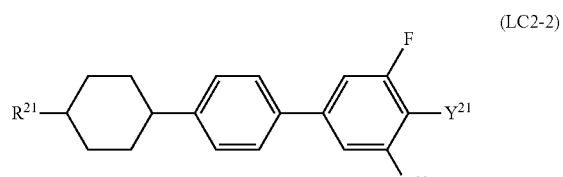

(LC2-3)
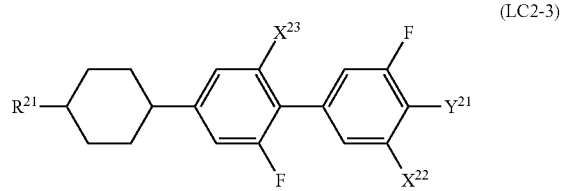

(LC2-4)
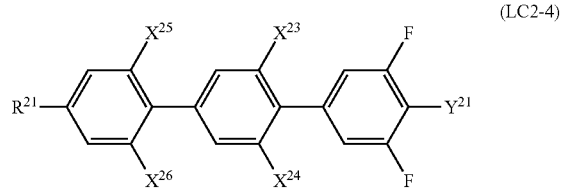

(LC2-5)
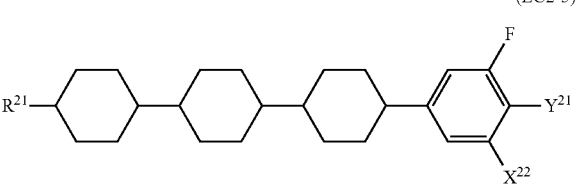

(LC2-6)
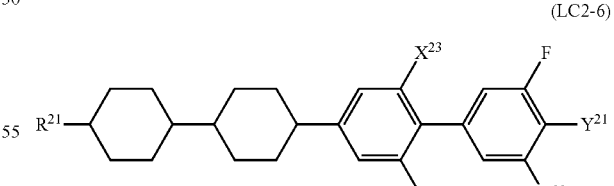

(LC2-7)
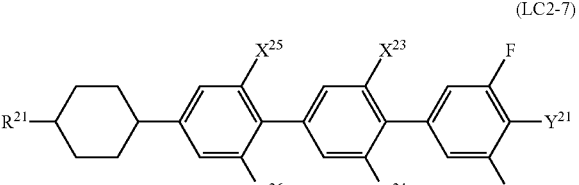

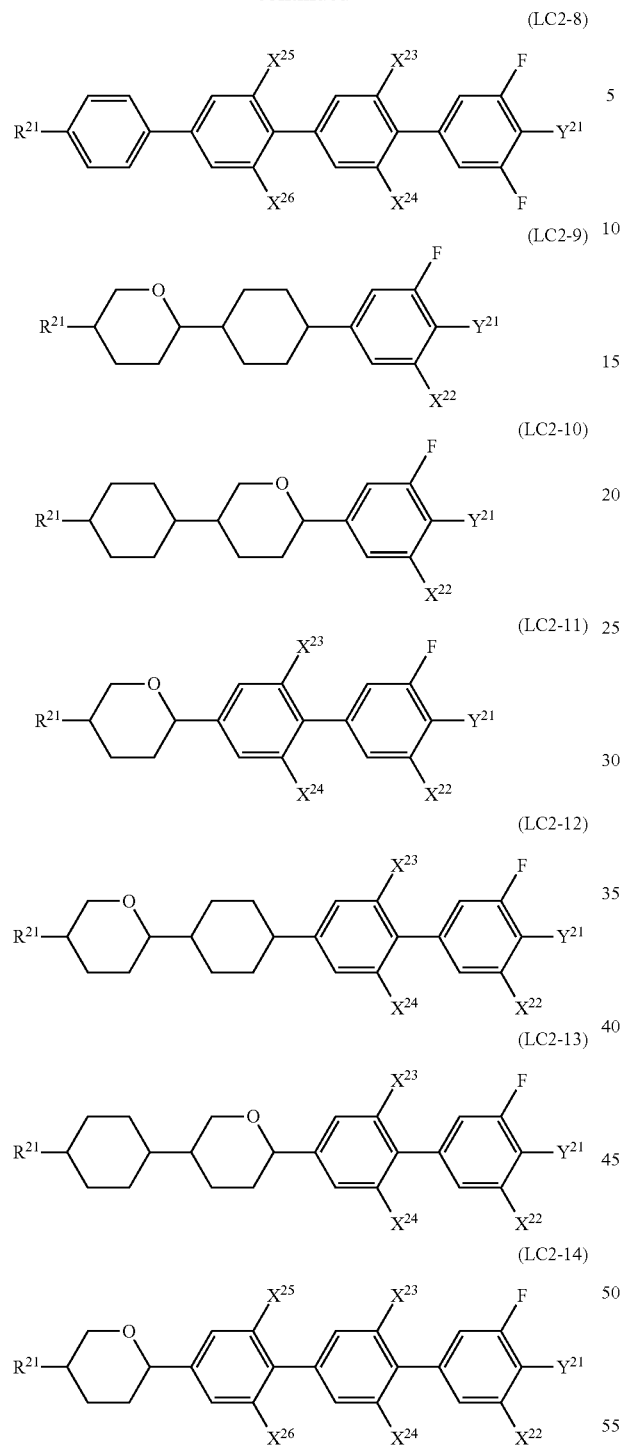
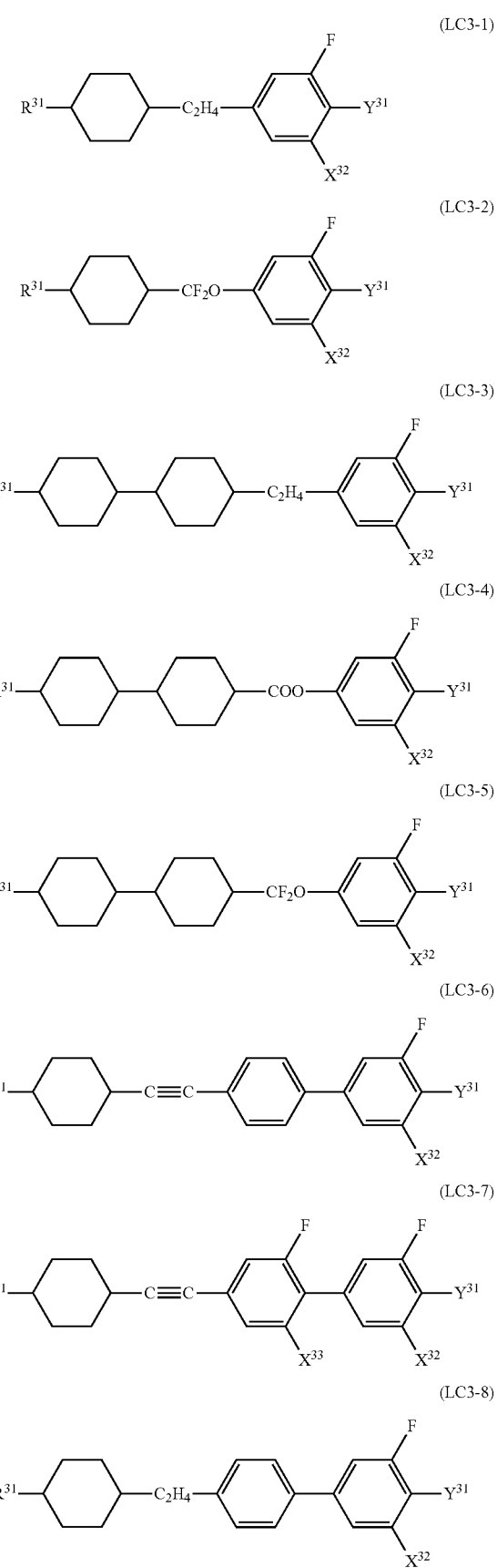

(In the formulae, $X^{23}$, $X^{24}$, $X^{25}$, and $X^{26}$ each independently represent a hydrogen atom, Cl, F, $CF_3$, or $OCF_3$, and $X^{22}$, $R^{21}$, and Y represent the same as those in claim 1).

5. The liquid crystal composition according to claim 1, wherein the compounds represented by general formula (LC3) are compounds selected from groups of compounds represented by general formula (LC3-1) to general formula (LC3-32):

-continued
(LC3-9)
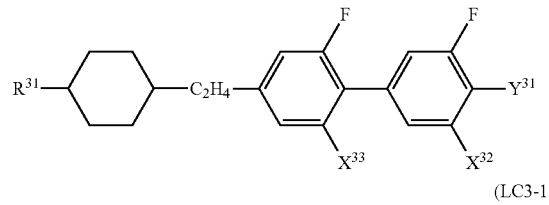
(LC3-10)
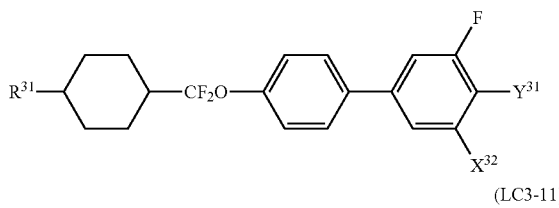
(LC3-11)
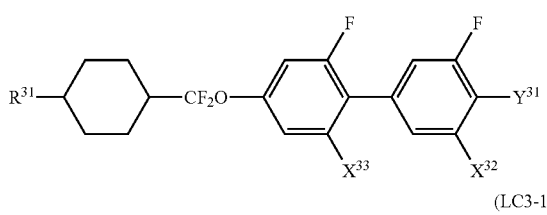
(LC3-12)
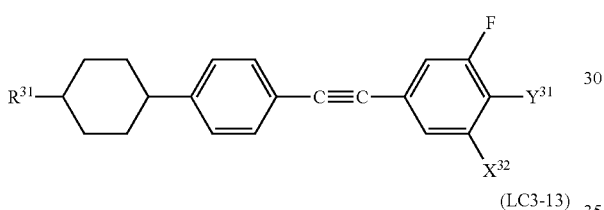
(LC3-13)
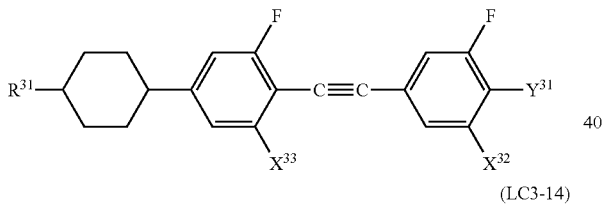
(LC3-14)
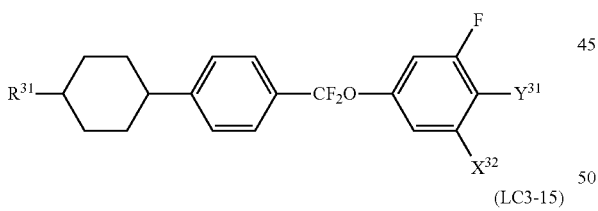
(LC3-15)
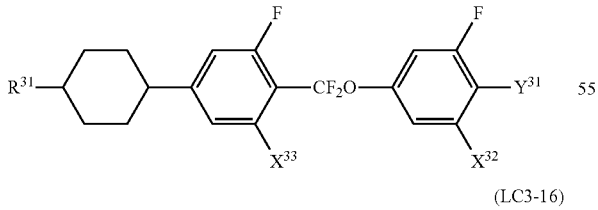
(LC3-16)
-continued
(LC3-17)
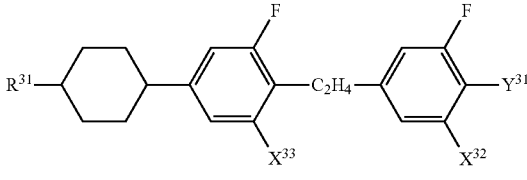
(LC3-18)
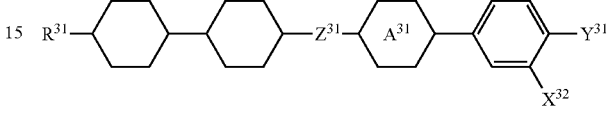
(LC3-19)
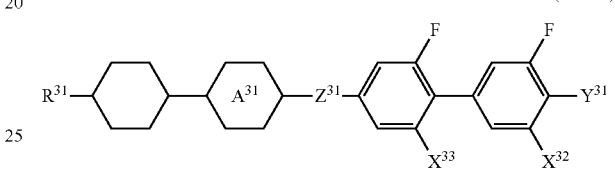
(LC3-20)
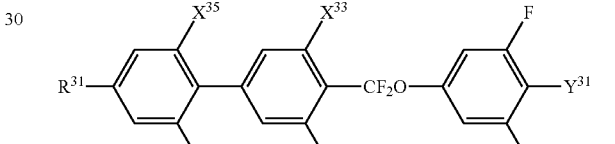
(LC3-21)
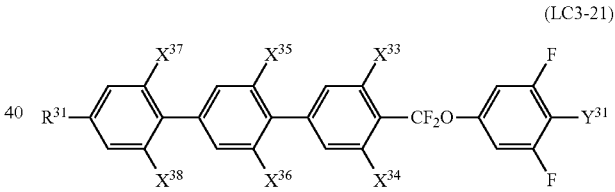
(LC3-22)
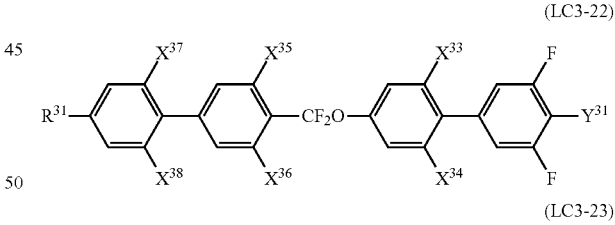
(LC3-23)
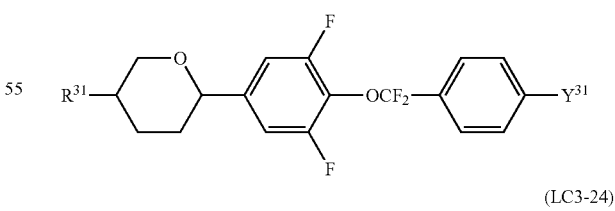
(LC3-24)
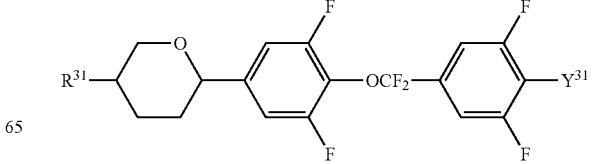

-continued

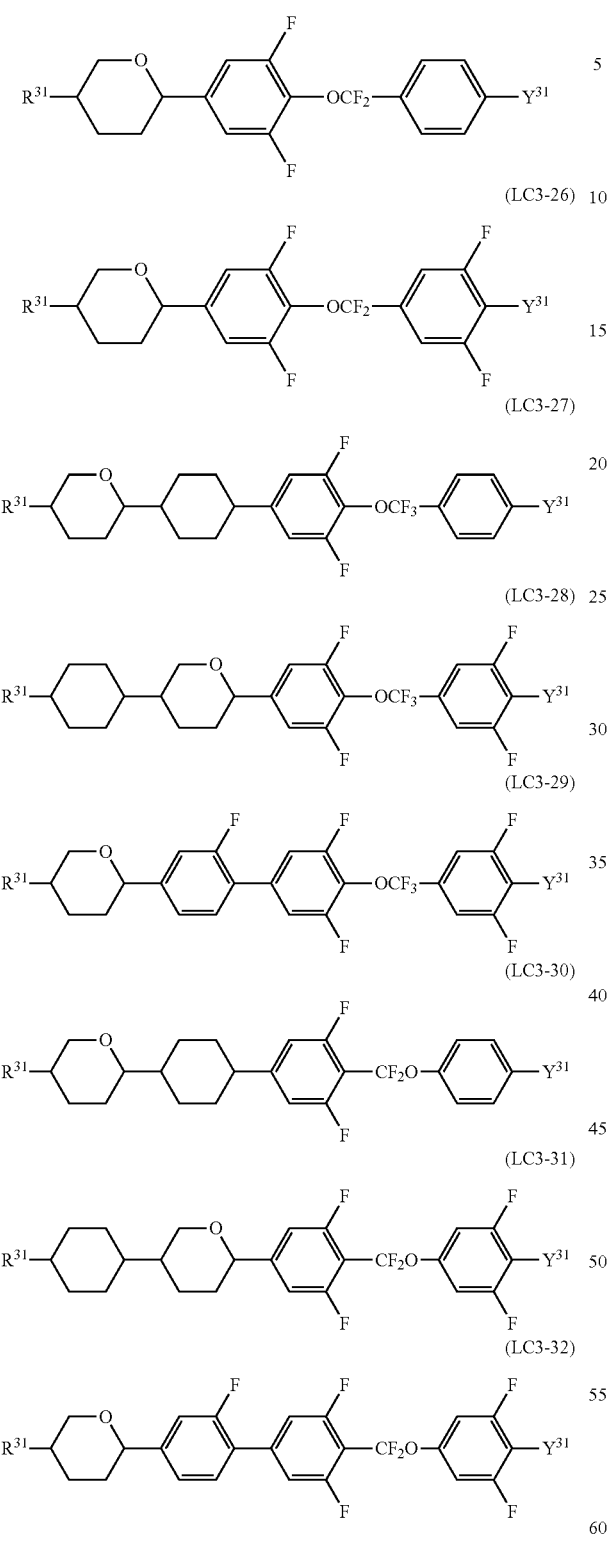

(In the formulae, $X^{33}$, $X^{34}$, $X^{35}$, $X^{36}$, $X^{37}$, and $X^{38}$ each independently represent H, Cl, F, $CF_3$, or $OCF_3$, and $X^{32}$, $R^{31}$, $A^{31}$, $Y^{31}$, and $Z^{31}$ represent the same as those in claim 1).

6. The liquid crystal composition according to claim 1, wherein the compounds represented by general formula (LC4) are compounds selected from groups of compounds represented by general formula (LC4-1) to general formula (LC4-23):

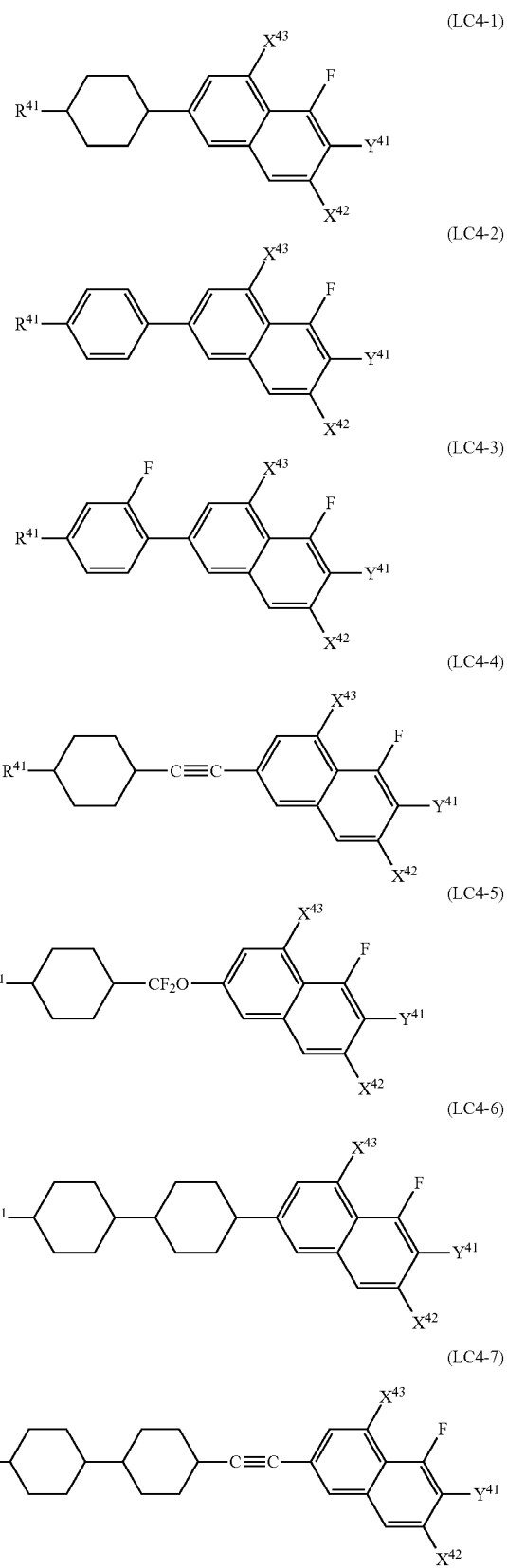

(LC4-8)
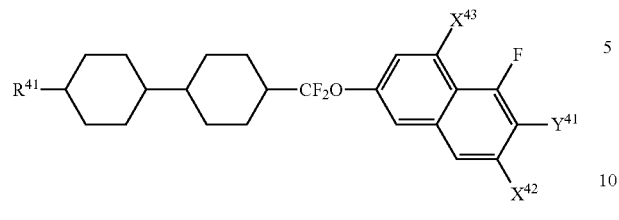
(LC4-9)
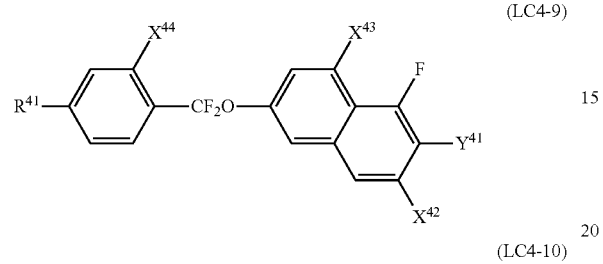
(LC4-10)
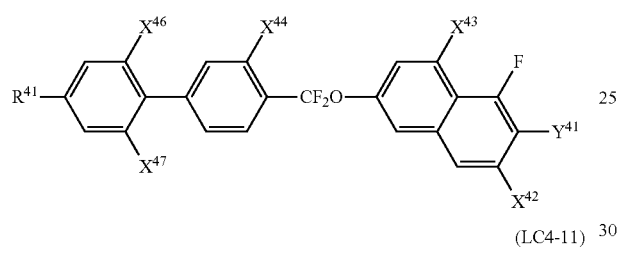
(LC4-11)
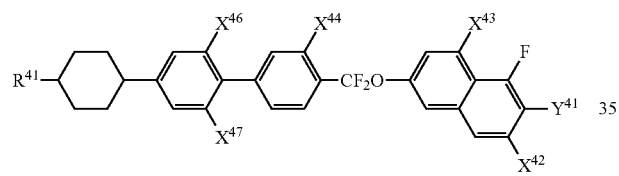
(LC4-12)
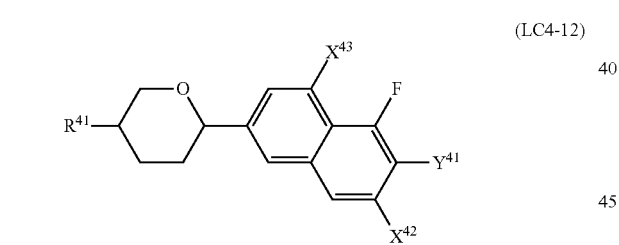
(LC4-13)
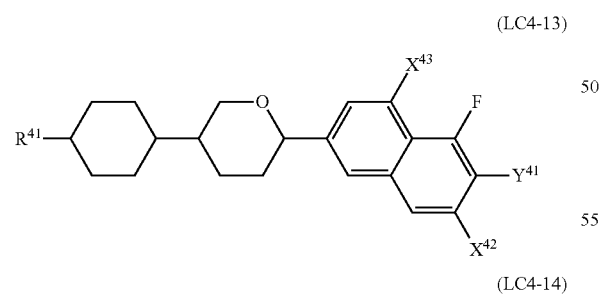
(LC4-14)
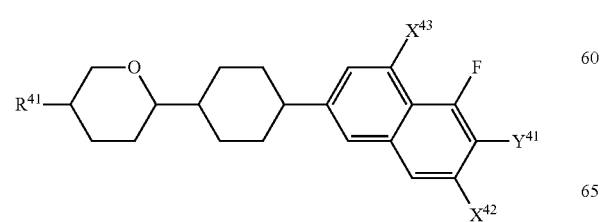
(LC4-15)
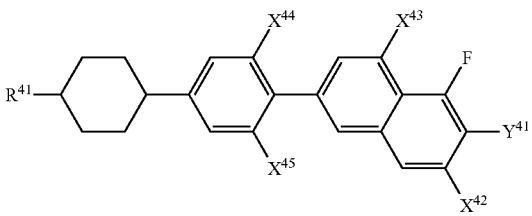
(LC4-16)
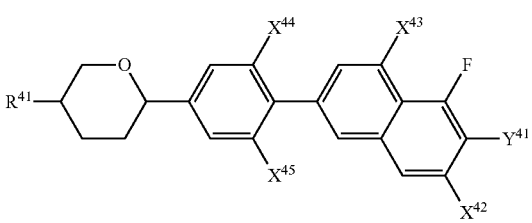
(LC4-17)
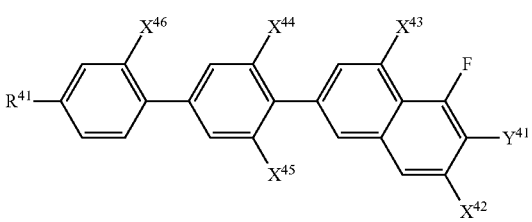
(LC4-18)
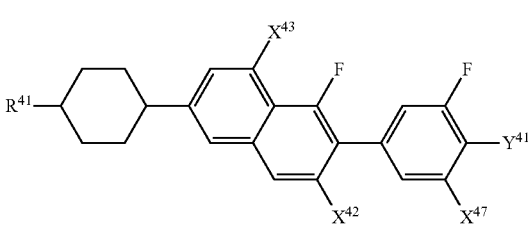
(LC4-19)
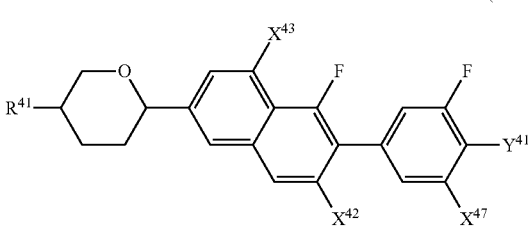
(LC4-20)
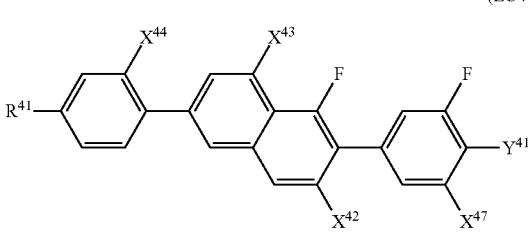

-continued (LC4-21)
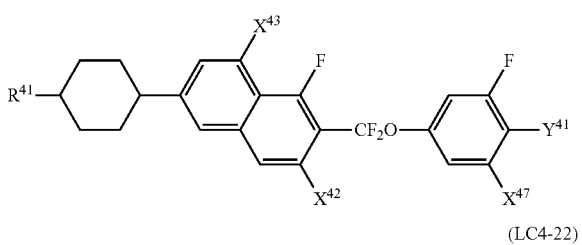

(LC4-22)
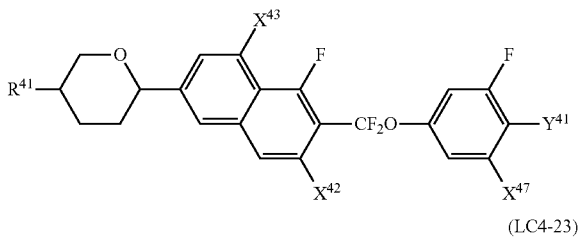

(LC4-23)
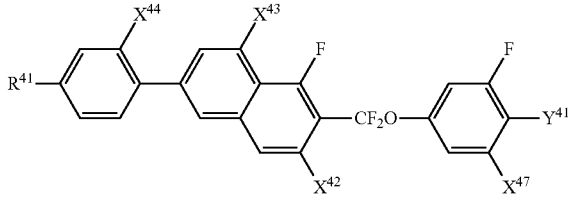

(In the formulae, $X^{44}$, $X^{46}$, $X^{47}$, $X^{71}$, and $X^{72}$ each independently represent H, Cl, F, $CF_3$, or $OCF_3$, and $X^{42}$, $X^{43}$, $R^{41}$, and $Y^{41}$ represent the same as those in claim 1).

7. The liquid crystal composition according to claim 1, wherein the compounds represented by general formula (LC5) are compounds selected from groups of compounds represented by general formula (LC5-1) to general formula (LC5-14):

(LC5-1)
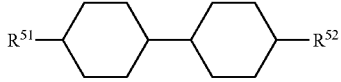

(LC5-2)
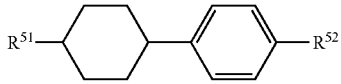

(LC5-3)
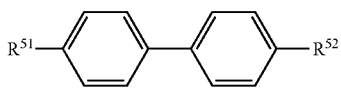

(LC5-4)

(LC5-5)
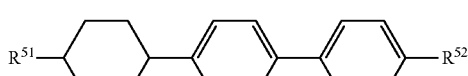

(LC5-6)
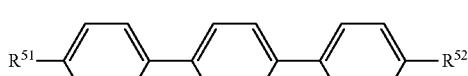

-continued (LC5-7)
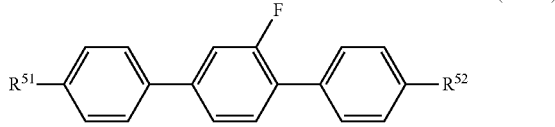

(LC5-8)
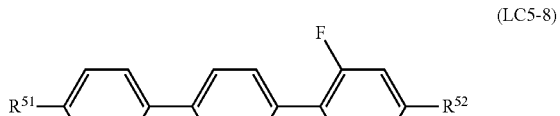

(LC5-9)
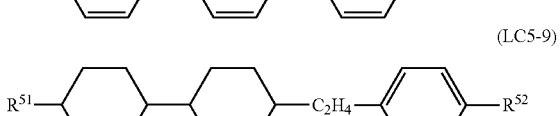

(LC5-10)
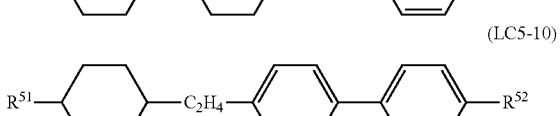

(LC5-11)
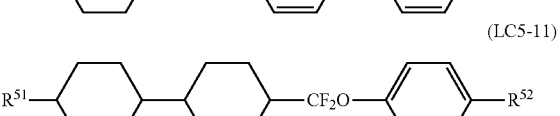

(LC5-12)
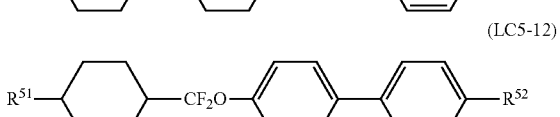

(LC5-13)
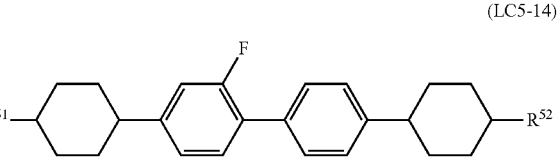

(LC5-14)
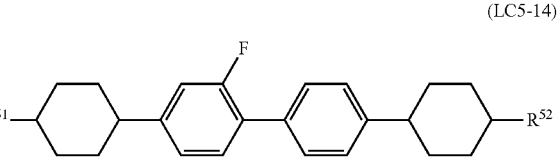

In the formulae, $R^{51}$ and $R^{52}$ represent the same as those in claim 1).

8. The liquid crystal composition according to claim 1, further comprising one or more polymerizable compounds.

9. The liquid crystal composition according to claim 1, further comprising one or more antioxidants.

10. The liquid crystal composition according to claim 1, further comprising one or more UV absorbers.

11. A liquid crystal display element using the liquid crystal composition according to claim 1.

12. An active matrix driving liquid crystal display element using the liquid crystal composition according to claim 1.

13. A liquid crystal display element of a TN mode, an OCB mode, an IPS mode, or a VA-IPS mode, using the liquid crystal composition according to claim 1.

14. A polymer-stabilized liquid crystal display element of a TN mode, an OCB mode, an IPS mode, or a VA-IPS mode, produced by using the liquid crystal composition according to claim 8, and polymerizing the polymerizable compounds in the liquid crystal composition in the presence or absence of an applied voltage.

\* \* \* \* \*